US012632935B2

(12) United States Patent
Novikov et al.

(10) Patent No.: US 12,632,935 B2
(45) Date of Patent: May 19, 2026

(54) SYSTEM, METHOD AND COMPUTER-ACCESSIBLE MEDIUM FOR DECORRELATING AND REMOVING NOISE, AND/OR REMOVING PARTIAL FOURIER-INDUCED GIBBS (RPG) RINGING ARTIFACTS FROM AT LEAST ONE IMAGE

(71) Applicant: New York University, New York, NY (US)

(72) Inventors: Dmitry Novikov, New York, NY (US); Els Fieremans, New York, NY (US); Hong-Hsi Lee, Boston, MA (US)

(73) Assignee: New York University, New York, NY (US)

( * ) Notice: Subject to any disclaimer, the term of this patent is extended or adjusted under 35 U.S.C. 154(b) by 97 days.

(21) Appl. No.: 18/288,900

(22) PCT Filed: May 2, 2022

(86) PCT No.: PCT/US2022/027298
§ 371 (c)(1),
(2) Date: Oct. 30, 2023

(87) PCT Pub. No.: WO2022/232688
PCT Pub. Date: Nov. 3, 2022

(65) Prior Publication Data
US 2024/0233093 A1     Jul. 11, 2024

Related U.S. Application Data

(60) Provisional application No. 63/182,690, filed on Apr. 30, 2021.

(51) Int. Cl.
*G06T 5/70* (2024.01)
*G06T 5/50* (2006.01)

(52) U.S. Cl.
CPC ................. *G06T 5/70* (2024.01); *G06T 5/50* (2013.01); *G06T 2207/10081* (2013.01);
(Continued)

(58) Field of Classification Search
CPC ... G06T 5/70; G06T 5/50; G06T 2207/10081; G06T 2207/10088; G06T 2207/10104; G06T 2207/20182; G06T 2207/20221
See application file for complete search history.

(56) References Cited

U.S. PATENT DOCUMENTS

2005/0226484 A1    10/2005    Basu et al.
2018/0120404 A1*    5/2018    Novikov ............... G06T 7/0016
(Continued)

OTHER PUBLICATIONS

International Search Report and Written Opinion mailed on Sep. 26, 2022 for International Patent Application No. PCT/US2022/027298.
(Continued)

*Primary Examiner* — Yassin Alata
(74) *Attorney, Agent, or Firm* — HUNTON ANDREWS KURTH LLP

(57) ABSTRACT

Exemplary systems, methods and computer arrangement for decorrelating and removing noise, and/or for removing Gibbs ringing data from at least one image can be provided. In one example, there can be a procedure for receiving information related to the at least one image; a procedure for producing the at least one image based on the determination if the noise is decorrelated; a procedure to remove the noise from the at least one image; a procedure for detecting an oscillation pattern from at least one edge of a measured portion of k-space associated with the information; and a procedure for removing the Gibbs ringing artifact from the information based on the detected oscillation pattern.

20 Claims, 38 Drawing Sheets

(52) U.S. Cl.
CPC .............. *G06T 2207/10088* (2013.01); *G06T 2207/10104* (2013.01); *G06T 2207/20182* (2013.01); *G06T 2207/20221* (2013.01)

(56) References Cited

U.S. PATENT DOCUMENTS

| | | |
|---|---|---|
| 2019/0355114 A1 | 11/2019 | Muehlberg et al. |
| 2021/0076972 A1 | 3/2021 | Novikov et al. |

OTHER PUBLICATIONS

Pierpaoli C, Basser PJ. Toward a quantitative assessment of diffusion anisotropy. Magnetic resonance in Medicine 1996;36:893-906.

Pruessmann KP, Weiger M, Börnert P, Boesiger P. Advances in sensitivity encoding with arbitrary k-space trajectories. Magnetic Resonance in Medicine: an Official Journal of the International Society for Magnetic Resonance in Medicine 2001;46:638-651.

Pruessmann KP, Weiger M, Scheidegger MB, Boesiger P. SENSE: sensitivity encoding for fast MRI. Magnetic Resonance in Medicine: an Official Journal of the International Society for Magnetic Resonance in Medicine 1999;42:952-962.

Roemer PB, Edelstein WA, Hayes CE, Souza SP, Mueller OM. The NMR phased array. Magnetic resonance in medicine 1990;16:192-225.

Sarra SA. Digital total variation filtering as postprocessing for Chebyshev pseudospectral methods for conservation laws. Numerical Algorithms 2006;41:17-33.

Sengupta AM, Mitra PP. Distributions of singular values for some random matrices. Physical Review E 1999;60:3389.

Setsompop K, Gagoski BA, Polimeni JR, Witzel T, Wedeen VJ, Wald LL. Blipped-controlled aliasing in parallel imaging for simultaneous multislice echo planar imaging with reduced g-factor penalty. Magnetic resonance in medicine 2012;67:1210-1224.

Sotiropoulos SN, Jbabdi S, Xu J, et al. Advances in diffusion MRI acquisition and processing in the Human Connectome Project. Neuroimage 2013;80:125-143.

Veraart J, Fieremans E, Jelescu IO, Knoll F, Novikov DS. Gibbs ringing in diffusion MRI. Magnetic resonance in medicine 2016;76:301-314.

Veraart J, Fieremans E, Novikov DS. Diffusion MRI noise mapping using random matrix theory . . Magnetic Resonance in Medicine 2016;76:1582-1593.

Veraart J, Novikov DS, Christiaens D, Ades-aron B, Sijbers J, Fieremans E. Denoising of diffusion MRI using random matrix theory. NeuroImage 2016;142:394-406.

Veraart J, Sijbers J, Sunaert S, Leemans A, Jeurissen B. Weighted linear least squares estimation of diffusion MRI parameters: Strengths, limitations, and pitfalls. NeuroImage 2013;81:335-346.

Vizioli L, Moeller S, Dowdle L, et al. Lowering the thermal noise barrier in functional brain mapping with magnetic resonance imaging. Nature Communications 2021;12:5181 doi: 10.1038/s41467-021-25431-8.

Vu CT, Phan TD, Chandler Dm. S3: A Spectral and Spatial Measure of Local Perceived Sharpness in Natural Images. IEEE transactions on image processing 2011;21:934-945.

Walsh DO, Gmitro AF, Marcellin MW. Adaptive reconstruction of phased array MR imagery. Magnetic Resonance in Medicine: an Official Journal of the International Society for Magnetic Resonance in Medicine 2000;43:682-690.

Wang F, Dong Z, Reese TG, et al. Echo planar time-resolved imaging (EPTI). Magnetic resonance in medicine 2019;81:3599-3615.

Weigel M. Extended phase graphs: dephasing, RF pulses, and echoes-pure and simple. Journal of Magnetic Resonance Imaging 2015;41:266-295.

Wilbraham H. On a certain periodic function. The Cambridge and Dublin Mathematical Journal 1848;3:198-201.

Wilm BJ, Hennel F, Roesler MB, Weiger M, Pruessmann KP. Minimizing the echo time in diffusion imaging using spiral readouts and a head gradient system. Magnetic Resonance in Medicine 2020;84:3117-3127.

Wang, Y, Reduction of Gibbs artifacts in magnetic resonance imaging based on Convolutional Neural Network. In: 2017 10th international congress on image and signal processing, biomedical engineering and informatics (CISP-BMEI). IEEE; 2017. pp. 1-5.

Ades-Aron B, Lemberskiy G, Veraart J, et al. Improved task-based functional MRI language mapping in patients with brain tumors through marchenko-pastur principal component analysis denoising. Radiology 2021;298:365-373.

Ades-Aron B, Veraart J, Kochunov P, McGuire S, Sherman P, Kellner E, Novikov DS, and Fieremans E. Evaluation of the accuracy and precision of the diffusion parameter estimation with gibbs and noise removal pipeline. NeuroImage, 183:532-543, 2018.

Aja-Fernández S, Vegas-Sánchez-Ferrero G, Tristán-Vega A. Noise estimation in parallel MRI: GRAPPA and SENSE. Magnetic resonance imaging 2014;32:281-290.

Alfaro-Almagro F, Jenkinson M, Bangerter NK, et al. Image processing and Quality Control for the first 10,000 brain imaging datasets from UK Biobank. Neuroimage 2018;166:400-424.

Altbach MI, Outwater EK, Trouard TP, et al. Radial fast spin-echo method for T2-weighted imaging and T2 mapping of the liver. Journal of Magnetic Resonance Imaging 2002;16:179-189.

Andersson JLR, Jenkinson M, Smith S, others. Non-linear registration aka Spatial normalisation FMRIB Technical Report TR07JA2. FMRIB Analysis Group of the University of Oxford 2007.

Andersson JLR, Skare S, Ashburner J. How to correct susceptibility distortions in spin-echo echo-planar images: application to diffusion tensor imaging. Neuroimage 2003;20:870-888.

Andersson JLR, Sotiropoulos SN. An integrated approach to correction for off-resonance effects and subject movement in diffusion MR imaging. Neuroimage 2016;125:1063-1078.

Bammer R, Holdsworth SJ, Aksoy M, Skare ST. Phase errors in diffusion-weighted imaging. In: Jones DK, editor. Diffusion MRI. Oxford University Press; 2010. pp. 218-249.

Basser PJ, Mattiello J, LeBihan D. MR diffusion tensor spectroscopy and imaging. Biophysical journal 1994;66:259-267.

Block KT, Chandarana H, Milla S, et al. Towards routine clinical use of radial stack-of-stars 3D gradient-echo sequences for reducing motion sensitivity. Journal of the Korean Society of Magnetic Resonance in Medicine 2014;18:87-106.,.

Block KT, Uecker M, Frahm J. Suppression of MRI truncation artifacts using total variation constrained data extrapolation. International journal of biomedical imaging 2008;2008.

Campbell-Washburn AE, Ramasawmy R, Restivo MC, et al. Opportunities in interventional and diagnostic imaging by using high-performance low-field-strength MRI. Radiology 2019;293:384-393.

Casey BJ, Cannonier T, Conley MI, et al. The adolescent brain cognitive development (ABCD) study: imaging acquisition across 21 sites. Developmental cognitive neuroscience 2018;32:43-54.

Chiew M. Partial Fourier. https://users.fmrib.ox.ac.uk/~mchiew/docs/PartialFourier.html.

Cordero-Grande L, Christiaens D, Hutter J, Price AN, Hajnal JV. Complex diffusion-weighted image estimation via matrix recovery under general noise models. Neuroimage 2019;200:391-404.

Does MD, Olesen JL, Harkins KD, et al. Evaluation of principal component analysis image denoising on multi-exponential MRI relaxometry. Magnetic resonance in medicine 2019;81:3503-3514.

Dong Z, Wang F, Reese TG, et al. Tilted-CAIPI for highly accelerated distortion-free EPI with point spread function (PSF) encoding. Magnetic resonance in medicine 2019;81:377-392.

Du YP, Chu R, Tregellas JR. Enhancing the detection of BOLD signal in fMRI by reducing the partial volume effect. Computational and mathematical methods in medicine 2014;2014.

Du YP, Parker DL, Davis WL, Cao G. Reduction of partial-volume artifacts with zero-filled interpolation in three-dimensional MR angiography. Journal of Magnetic Resonance Imaging 1994;4:733-741.

Feng L, Grimm R, Block KT, et al. Golden-angle radial sparse parallel MRI: combination of compressed sensing, parallel imaging,

(56) References Cited

OTHER PUBLICATIONS and golden-angle radial sampling for fast and flexible dynamic volumetric MRI. Magnetic resonance in medicine 2014;72:707-717.

Ferreira P, Gatehouse P, Kellman P, Bucciarelli-Ducci C, Firmin D. Variability of myocardial perfusion dark rim Gibbs artifacts due to sub-pixel shifts. Journal of Cardiovascular Magnetic Resonance 2009;11:1-10.

Fessler JA. On NUFFT-based gridding for non-Cartesian MRI. Journal of magnetic resonance 2007;188:191-195.

Gavish M, Donoho DL. Optimal shrinkage of singular values. IEEE Transactions on Information Theory 2017;63:2137-2152.

Gibbs JW. Fourier's series. Nature 1898;59:200.

Griswold MA, Walsh D, Heidemann RM, Haase A, Jakob PM. The use of an adaptive reconstruction for array coil sensitivity mapping and intensity normalization. Proceedings of the International Society for Magnetic Resonance in Medicine 2002;2410.

Jackson JI, Meyer CH, Nishimura DG, Macovski A. Selection of a convolution function for Fourier inversion using gridding (computerised tomography application). IEEE transactions on medical imaging 1991;10:473-478.

Jelescu IO, Veraart J, Adisetiyo V, Milla SS, Novikov DS, Fieremans E. One diffusion acquisition and different white matter models: how does microstructure change in human early development based on WMTI and NODDI?. Neuroimage 2015;107:242-256.

Jenkinson M, Smith S. A global optimisation method for robust affine registration of brain images. Medical image analysis 2001;5:143-156.

Jerri AJ. Lanczos-like σ-factors for reducing the Gibbs phenomenon in general orthogonal expansions and other representations. Journal of Computational Analysis and Applications 2000;2:111-127.

Jones DK. Diffusion MRI. Oxford University Press; 2010.

Kellman P, McVeigh ER. Image reconstruction in SNR units: a general method for SNR measurement. Magnetic resonance in medicine 2005;54:1439-1447.

Kellner E, Dhital B, Kiselev VG, Reisert M. Gibbs-ringing artifact removal based on local subvoxel-shifts. Magnetic resonance in medicine 2016;76:1574-1581.

Koay CG, Basser PJ. Analytically exact correction scheme for signal extraction from noisy magnitude MR signals. Journal of magnetic resonance 2006;179:317-322.

Lebel RM, Wilman AH. Transverse relaxometry with stimulated echo compensation. Magnetic resonance in medicine 2010;64:1005-1014.

Lemberskiy G, Veraart J, Ades-aron B, Fieremans E, Novikov DS. Marchenko-Pastur Virtual Coil Compression (MP-VCC). In: ISMRM 29th annual meeting, Proceedings of the ISMRM annual meeting. vol. 29.; 2021. p. 1155.

Marchenko VA, Pastur LA. Distribution of eigenvalues for some sets of random matrices. Matematicheskii Sbornik 1967;114:507-536.

McGibney G, Smith MR, Nichols ST, Crawley A. Quantitative evaluation of several partial Fourier reconstruction algorithms used in MRI. Magnetic resonance in medicine 1993;30:51-59.

Moeller S, Pisharady PK, Ramanna S, et al. NOise Reduction with Distribution Corrected (NORDIC) PCA in dMRI with complex-valued parameter-free locally low-rank processing. NeuroImage 2021;226:117539.

Mori S, Wakana S, Zijl PCM van, Nagae-Poetscher Lm. Mri Atlas of Human White Matter. Elsevier Science; 2005.

Muckley MJ, Ades-Aron B, Papaioannou A, et al. Training a neural network for Gibbs and noise removal in diffusion MRI. Magnetic Resonance in Medicine doi: 10.1002/mrm.28395.

Novikov DS, Fieremans E, Jespersen SN, Kiselev VG. Quantifying brain microstructure with diffusion MRI: Theory and parameter estimation. NMR in Biomedicine 2019;32:e3998.

Novikov DS, Veraart J, Jelescu IO, Fieremans E. Rotationally-invariant mapping of scalar and orientational metrics of neuronal microstructure with diffusion MRI. NeuroImage 2018;174:518-538.

Pauly JM, Conolly SI, Nishimura D, Macovski A. Slice-selective excitation for very short T2 species. In: SMRM 8th annual meeting, Amsterdam, Netherlands, Proceedings of the SMRM annual meeting. vol. 8.; 1989. p. 28.

Perrone D, Aelterman J, Pižurica A, Jeurissen B, Philips W, Leemans A. The effect of Gibbs ringing artifacts on measures derived from diffusion MRI. Neuroimage 2015;120:441-455.

Archibald R, Gelb A. A method to reduce the Gibbs ringing artifact in MRI scans while keeping tissue boundary integrity. IEEE Transactions on Medical Imaging 2002;21:305-319.

Breuer, et al., General formulation for quantitative G-factor calculation in GRAPPA reconstructions. Magnetic Resonance in Medicine: an Official Journal of the International Society for Magnetic Resonance in Medicine 2009;62:739-746.

Jensen, et al., Diffusional kurtosis imaging: the quantification of non-gaussian water diffusion by means of magnetic resonance imaging. Magnetic Resonance in Medicine: an Official Journal of the International Society for Magnetic Resonance in Medicine 2005;53:1432-1440.

Lemberskiy, et al., Achieving sub-mm clinical diffusion mri resolution by removing noise during reconstruction using random matrix theory. In: ISMRM 27th annual meeting, Montreal, Canada, Proceedings of the ISMRM annual meeting. vol. 27.; 2019. p. 0770.

Robson, et al., "Comprehensive quantification of signal-to-noise ratio and g-factor for image-based and k-space-based parallel imaging reconstructions.", Magnetic Resonance in Medicine: an Official Journal of the International Society for Magnetic Resonance in Medicine 2008;60:895-907.

* cited by examiner

(A)

$\Psi$ $k^C$ $k^C$

(B)

$\Psi$ -1/2

$k^C$ $k^C$ (C)
$$\hat{\sigma}(x)$$
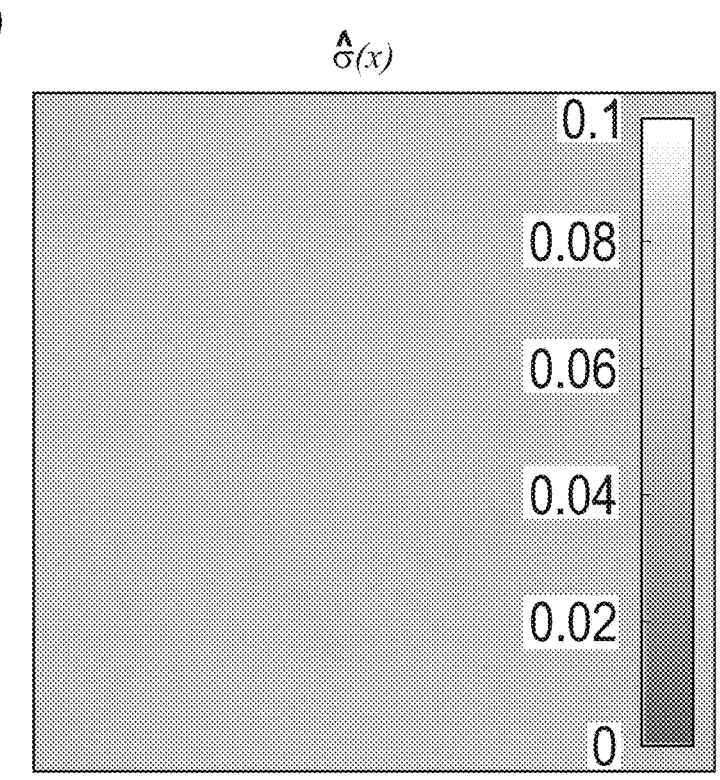
(D)
$$\sigma(x)$$
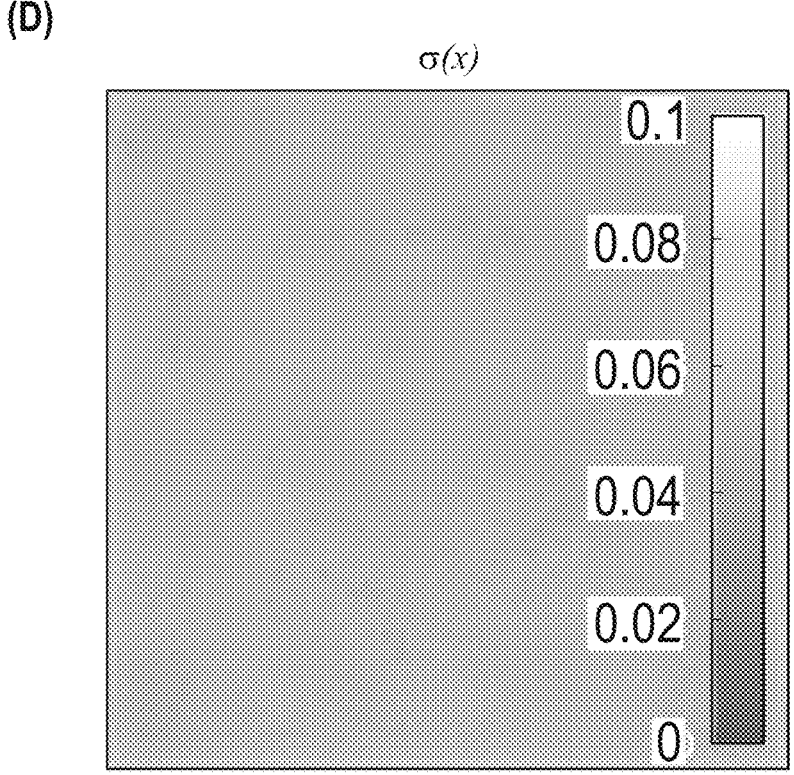
Figure 3(Cont...)

(E)
$P(x)$
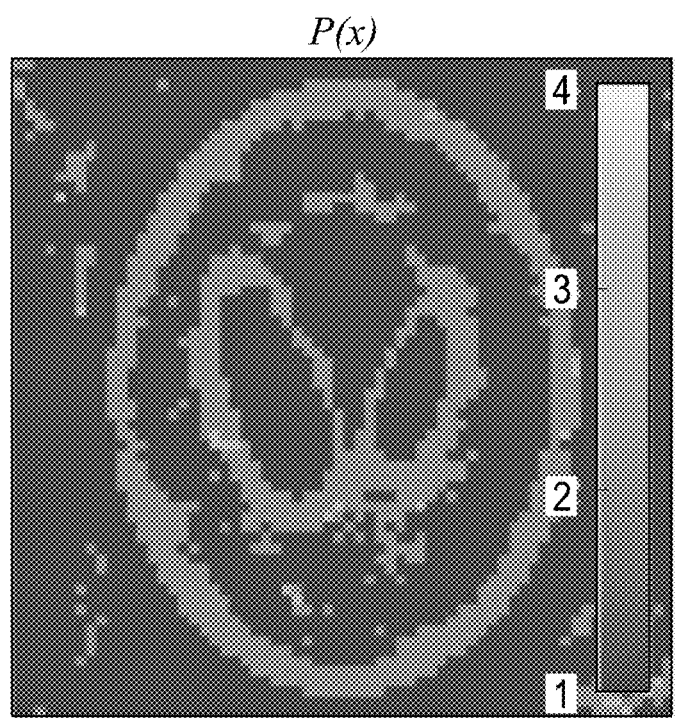
(F)
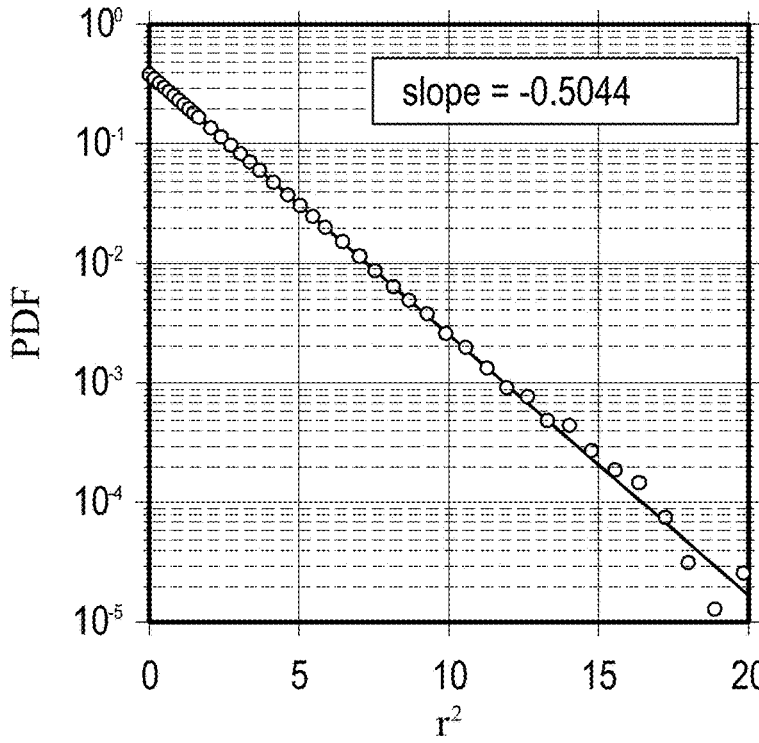
Figure 3(Cont...)

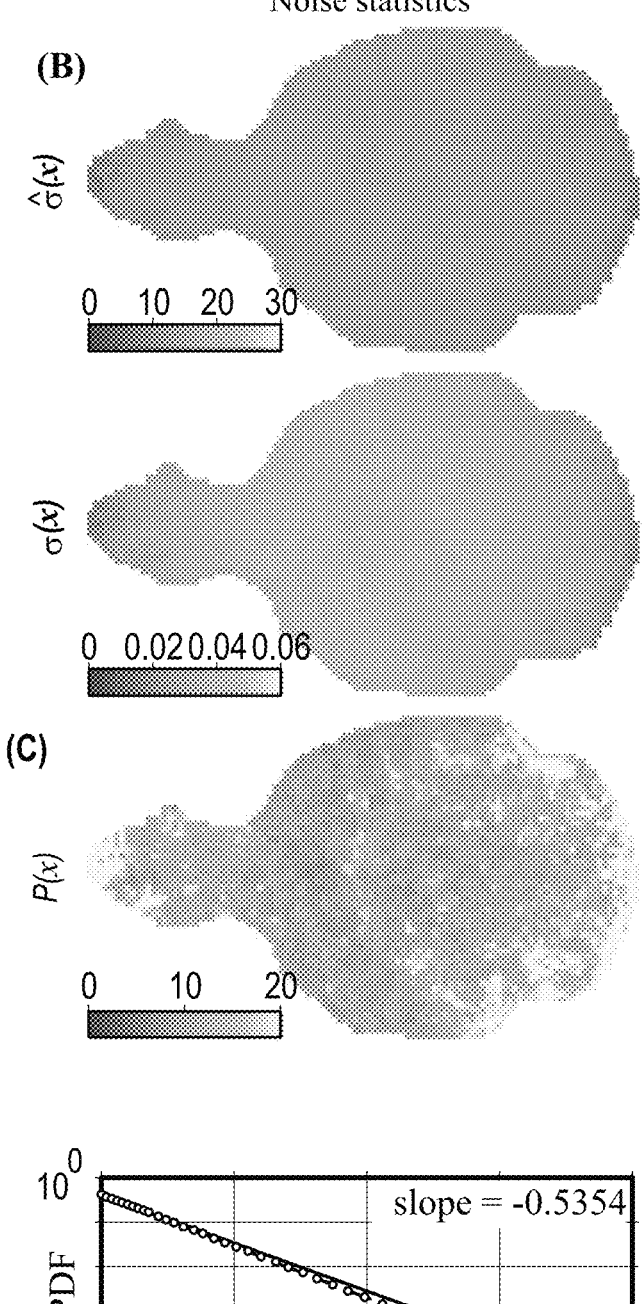
Figure 5(Cont...)

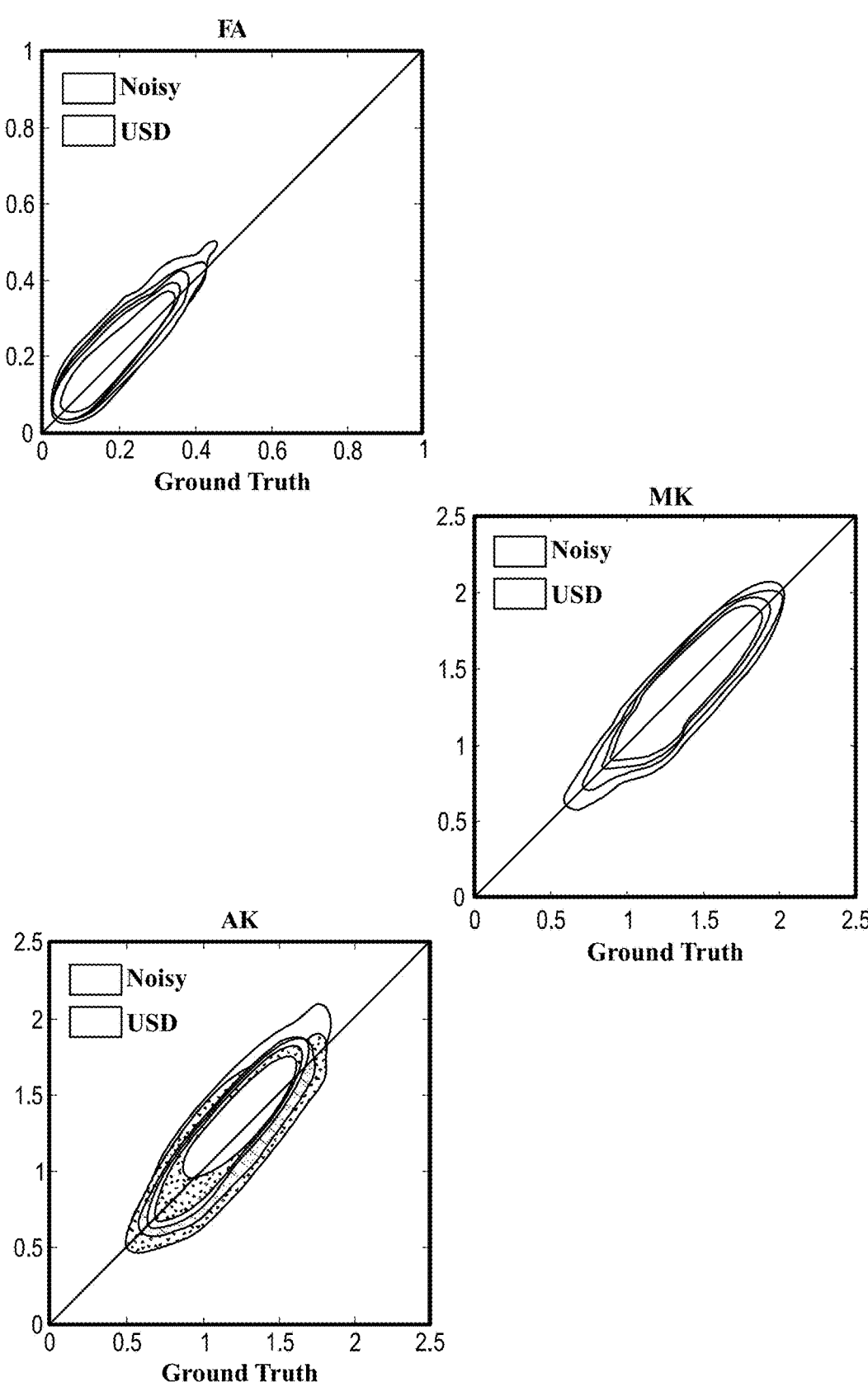
Figure 8(Cont...)

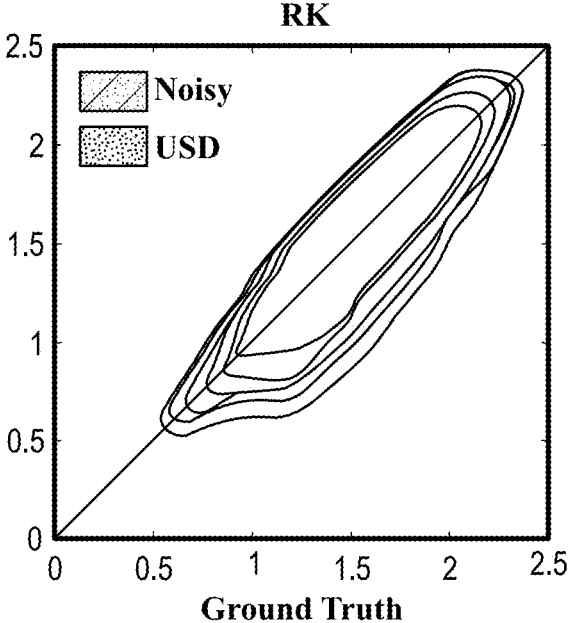
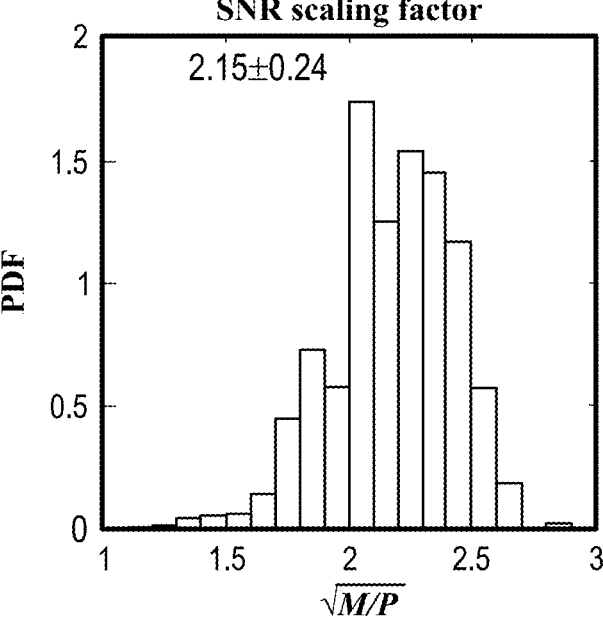
Figure 8(Cont...)

(B)
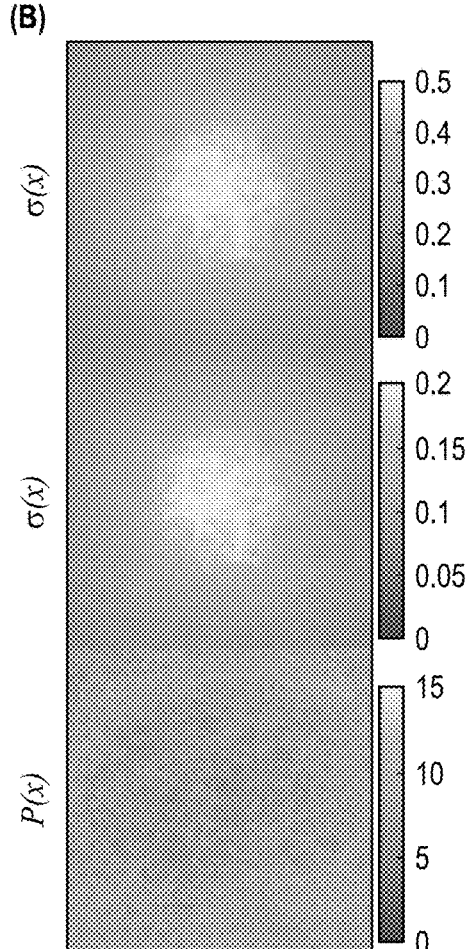
(C)
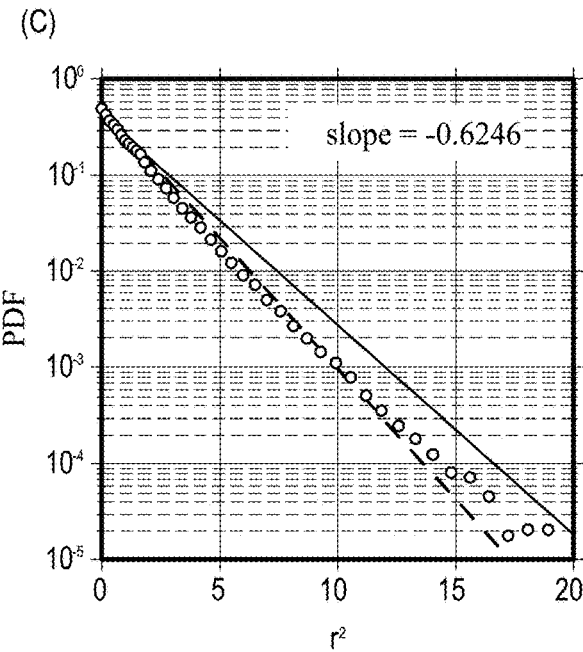
slope = -0.6246
Figure 9(Cont...)

(A)

(B)

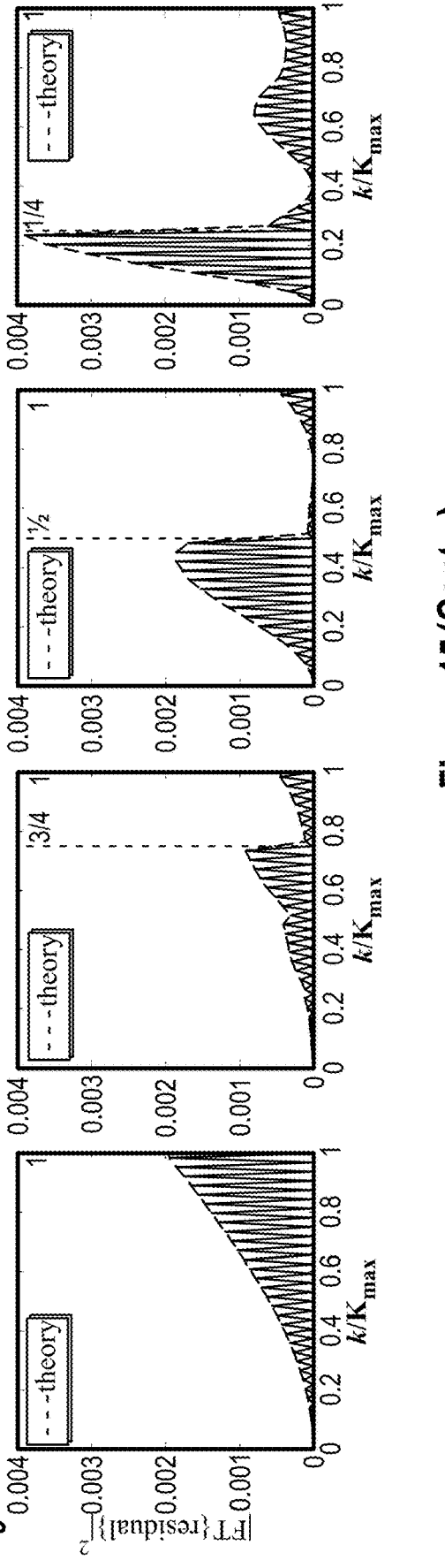
Figure 15(Cont...)

Figure 16

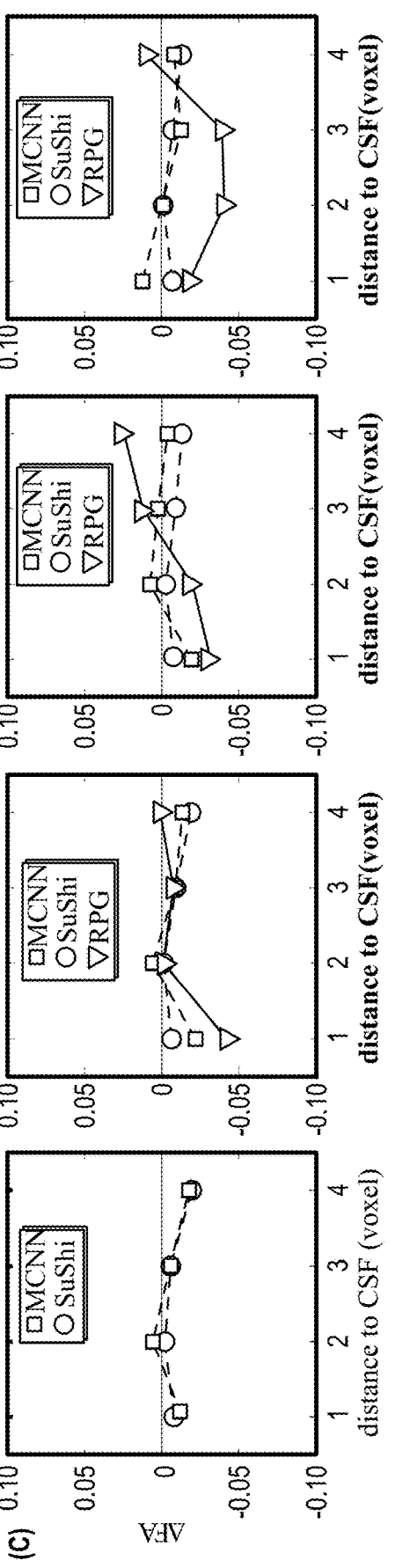
Figure 20(Cont...)

Figure 21

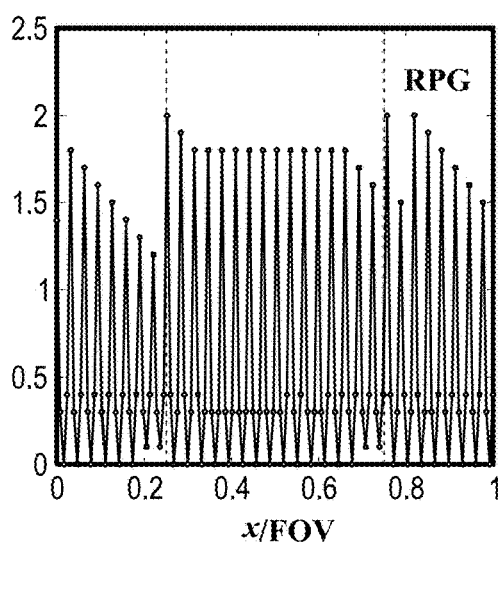
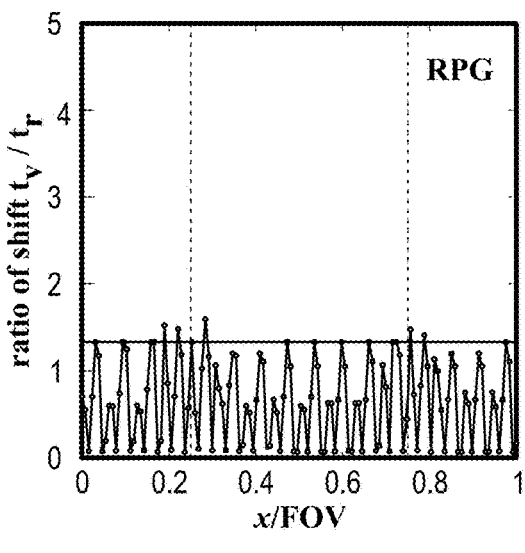
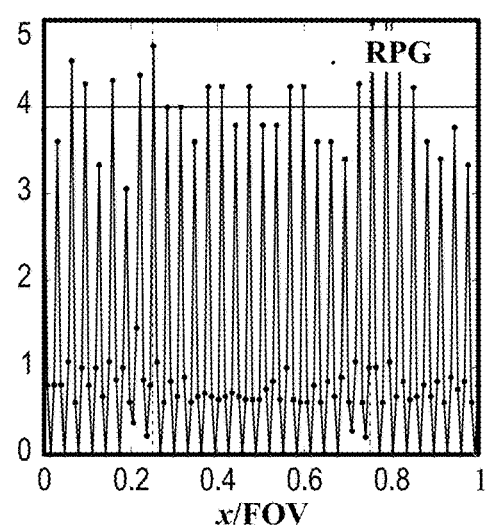
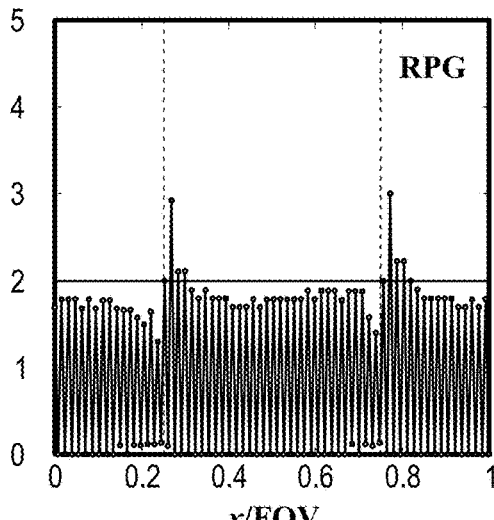
Figure 21(Cont...)

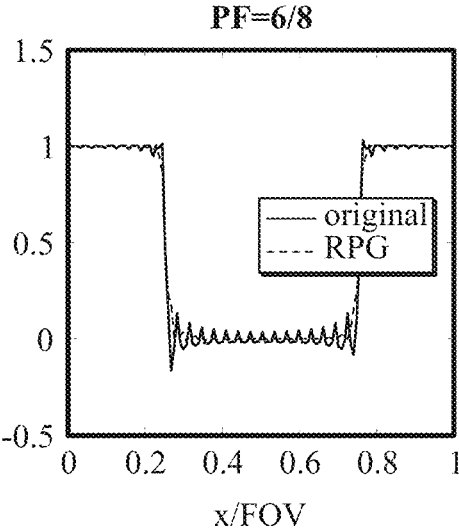
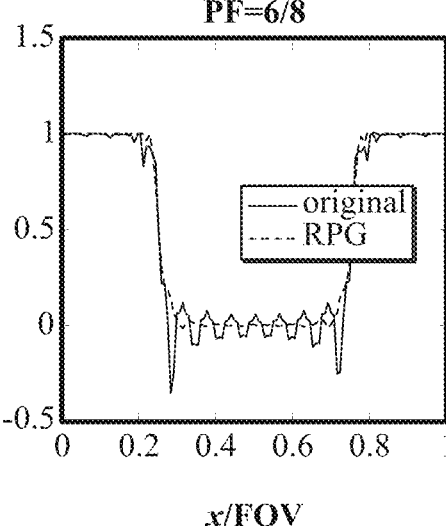
Figure 25(Cont...)

no partial Fourier     *pf*= 7/8          *pf*= 6/8          *pf*= 5/8

Original  SI=0.8779  Original  SI=0.8801  Original  SI=0.8700  Original  SI=0.8923

SuShi    SI=0.8576  RPG    SI=0.8617  RPG    SI=0.8536  RPG    SI=0.8440 no partial Fourier     *pf*= 7/8          *pf*= 6/8          *pf*= 5/8

Original  SI=0.9045  Original  SI=0.9027  Original  SI=0.8861  Original   SI=0.8965

SuShi    SI=0.8922  RPG    SI=0.8708  RPG    SI=0.8787  RPG    SI=0.8663

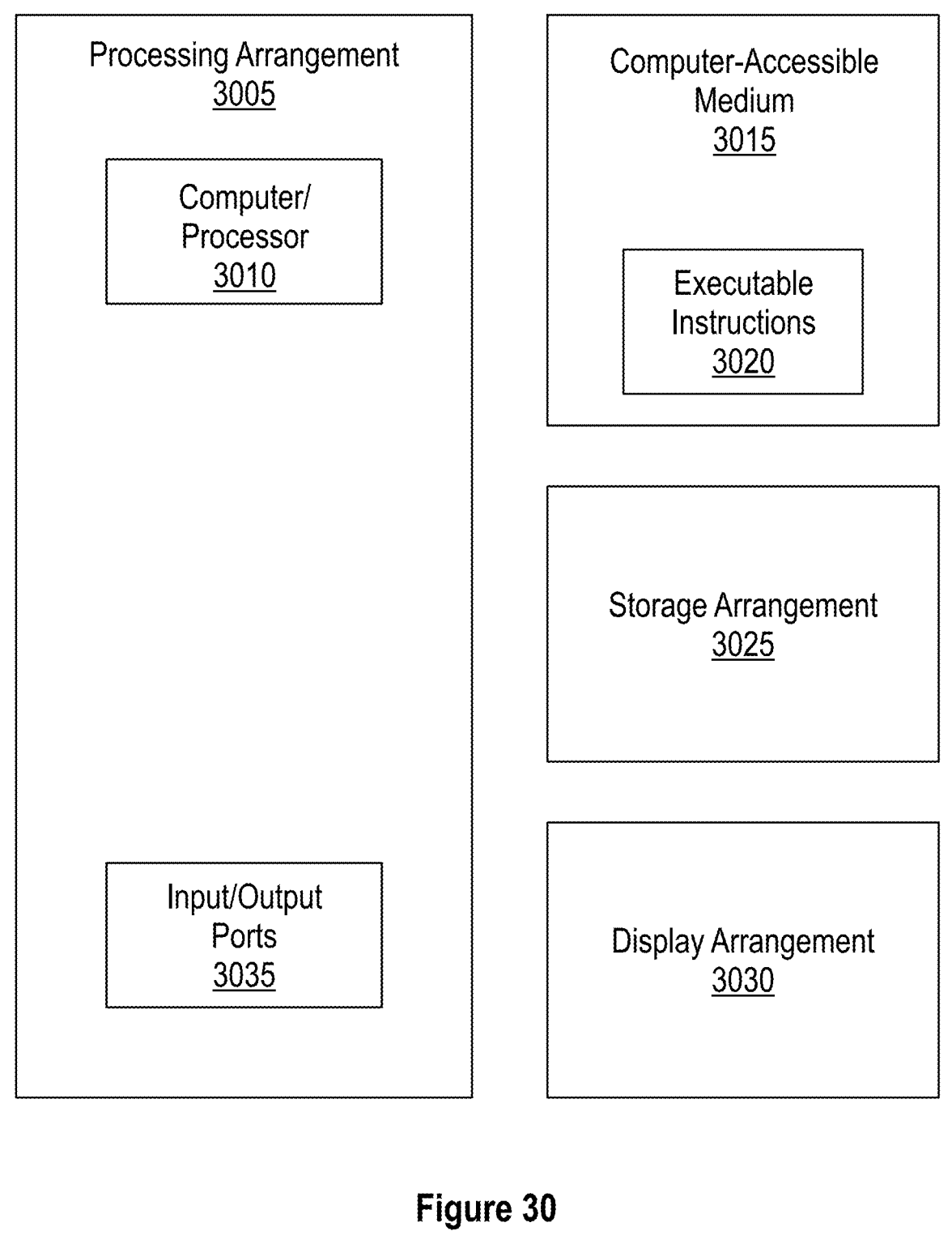

Processing Arrangement
3005

Computer/
Processor
3010

Input/Output
Ports
3035

Computer-Accessible
Medium
3015

Executable
Instructions
3020

Storage Arrangement
3025

Display Arrangement
3030

Figure 30

SYSTEM, METHOD AND COMPUTER-ACCESSIBLE MEDIUM FOR DECORRELATING AND REMOVING NOISE, AND/OR REMOVING PARTIAL FOURIER-INDUCED GIBBS (RPG) RINGING ARTIFACTS FROM AT LEAST ONE IMAGE

CROSS-REFERENCE TO RELATED APPLICATION(S)

This application is a U.S. National Phase Patent Application, which relates to and claims priority from International Patent Application No. PCT/US2022/027298 filed on May 2, 2022 that published as International Patent Publication No. WO 2022/232688 on Nov. 3, 2022, which claims the benefit and priority from U.S. Provisional Patent Application Nos. 63/182,690, filed on Apr. 30, 2021, the entire disclosures of which are incorporated herein by reference.

STATEMENT REGARDING FEDERALLY SPONSORED RESEARCH

This invention was made with government support under R01 NS102904, P41 EB017183, R01 NS088040, and R01 EB027075 awarded by the National Institutes of Health. The government has certain rights in the invention.

BACKGROUND INFORMATION

By encoding images in the Fourier domain (k-space) with applied magnetic field gradients, MRI can serve as a super-resolution medical imaging technique probing anatomical structure much smaller than radiofrequency wavelength.

Development of MRI facilitates in vivo evaluation of tissue properties through various signal contrasts, such as diffusion MRI (dMRI) and relaxation time mapping, in which inference is made based on measured signal attenuation in multiple images (see, e.g., references 1 and 2). The signal-to-noise ratio (SNR), which decreases with stronger signal attenuation such as in dMRI, can become quite low; thermal noise corrupts image quality and can propagate into estimated parametric maps. For example, noise in diffusion tensor imaging (DTI) can lead to eigenvalue repulsion in the diffusion tensor (see, e.g., reference 3), resulting in over-estimated axial diffusivity and fractional anisotropy, and an under-estimated radial diffusivity.

In the first part of the present disclosure, an exemplary family of algorithms is described for noise reduction assuming spatially and temporally independent and identically distributed (i.i.d.) white Gaussian noise. Using the redundancy in MRI data of multiple contrasts via a local or non-local image patch, it is possible, e.g., to identify (see, e.g., reference 4) and remove (see, e.g., reference 5) the noise components in the domain of principal component analysis (PCA), where the pure noise-related eigenvalues obey the universal Marchenko-Pastur (MP) law (see, e.g., reference 6) based on the random matrix theory (RMT) results for large noisy covariance matrices. The corresponding MPPCA denoising algorithm, e.g., was first applied to magnitude dMRI data (see, e.g., references 4 and 5). The value of MPPCA was shown in other redundant acquisitions such as $T_2$ mapping (see, e.g., reference 7) and fMRI (see. e.g., references 8 and 9), and it became the first step in image processing pipelines (see, e.g., reference 10).

The complex i.i.d. noise assumption of a fully-sampled MR image may break down in parallel imaging (due to a non-unitary transformation of the i.i.d. Gaussian noise in receive coils (see, e.g., references 11, 12, 13 and 14)) or after taking the absolute value (see, e.g., reference 7). Hence, to further improve the performance of RMT-based denoising, the effect of spatially varying noise level (geometry factor, g-factor) (see, e.g., references 15 and 9) or full noise correlation between coils (references 16 and 17) due to linear transformations in parallel imaging can be considered in reconstructed images. One exemplary way to preserve the i.i.d. noise statistics is to denoise all aliased coil images (after applying Fourier transform to the acquired k-space lines) before image reconstruction and coil combination. Denoising such images before image reconstruction prevents the problem of spatial varying noise level and noise correlation between coils, effectively leading to a 5-fold decrease in the Rician noise floor (see, e.g., references 18 and 19).

Non-Cartesian sampling in k-space can provide flexibility in MRI acquisitions, e.g., for echo time (TE) shortening or motion robustness (see, e.g., references 20 and 21), and it has been used to achieve highly accelerated image acquisition, such as Golden-angle radial sparse parallel (GRASP) MRI (see, e.g., reference 22). Although noise level estimation and noise removal can be equally important for image reconstruction and quantitative analysis based on non-Cartesian data, denoising non-Cartesian sampled MRI may be challenging. Indeed, while different k-space trajectories (such as radial spokes) have i.i.d. noise in k-space, "patching" them (or their images) together may not provide sufficient redundancy. Ideally, one would like to utilize spatial redundancy and denoise in the (reconstructed) image space, but this requires the additional interpolation of non-uniformly sampled Fourier data onto a Cartesian grid in the reconstruction. This non-unitary linear transformation may introduce a spatially varying noise level and noise correlations between each voxel or a k-space data point (see FIG. 1). This challenge is even greater than that arising in denoising Cartesian undersampled data. Failure to address these noise correlations results in image blurring after denoising (see FIG. 2).

To estimate and remove noise for any sampling scheme, for example, it may be beneficial to provide an exemplary universal sampling denoising (USD) pipeline (see FIG. 1), which can overcome at least some of the deficiencies described herein above. The USD pipeline simultaneously can homogenize the noise level (i.e., variance stabilization) and de-correlate the noise in the gridded k-space and image space for non-Cartesian sampling, such that image denoising methods, such as but not limited to, e.g., PCA or RMT-based methods (e.g., MPPCA), can be applied to identify and remove the noise in the Cartesian image domain after the re-gridding.

Further, the removal of the Gibbs artifact from at least one image is described. Constraints of scan time and signal-to-noise level may limit the amount of the k-space data that can be sampled. The maximal spatial frequency$\pm K_{max}$ of the sampled data may lead to a sharp edge in the Fourier domain and subsequent Gibbs-ringing artifacts in the image space (See, e.g., Wilbraham, 1848; Gibbs, 1898).

The k-space data can be acquired symmetrically around the low frequency k=0 domain in a Cartesian grid (e.g., line by line), resulting in a symmetric truncation of the k-space data, usually dubbed "fully" sampled data. Many procedures have been proposed to correct the Gibbs-ringing artifacts due to this symmetric truncation in k-space. Some approaches include the Lanczos-type local averaging method (See, e.g., Jerri, 2000) and the hybrid Gegenbauer reconstruction (See, e.g., Archibald & Gelb, 2002). Total variation (TV) approaches have been applied to jointly reduce noise and ringings (See, e.g., Sarra, 2006; Block et al., 2008; Perrone et al., 2015; Veraart et al., 2016); the choice of regularization factors for TV or total generalized variation (TGV) may necessitate the noise level estimation and noise reduction during the ringing removal. Alternatively, as the image is reconstructed on a discretized grid, the image can be re-interpolated on the local subvoxel-shifts to sample the ringing pattern at the zero-crossings of the oscillation kernel (e.g., sinc function) (see, e.g., Kellner et al., 2016). In early works, the idea of global subvoxel-shifts implemented by using the translational phase-shift in k-space has been applied to reduce the partial volume effect in MR angiography (see, e.g., Du et al., 1994) and functional MRI (See, e.g., Du et al., 2014); subsequently, the dark rim artifact in myocardial perfusion MRI was suggested to be due to Gibbs-ringing, the degree of which was attributed to subvoxel-shifts relative to the endocardial border (see, e.g., Ferreira et al., 2009). Recently, a convolutional neural network (CNN) has been used to remove the Gibbs-ringing either with (see, e.g., Muckley et al., n.d.) or without (see, e.g., Wang et al., 2017) adding noise into the training data.

Partial Fourier (PF) can be a common technique to accelerate MRI acquisition and shorten echo time (TE) (see, e.g., Sotiropoulos et al., 2013). Due to the MR data redundancy (e.g., smoothly varying image phase), it is possible to restore nearly half of the k-space data instead of acquiring it; such PF acquisition can lead to an asymmetric truncation in the k-space and may complicate the ringing artifacts. The easiest way to remove the ringings for such data can be to recover fully sampled k-space data by using PF reconstruction procedures, such as Margosian and Projection Onto Convex Sets (POCS) methods (see, e.g., McGibney et al., 1993), and perform above-mentioned ringing removal pipelines (see FIG. 11). However, this PF reconstruction method may require the knowledge of image phase map or k-space data, which can often be unavailable for public MRI databases and clinical data reconstructed by simply using zero filling. Lately, Muckley et al. (see, e.g., Muckley et al., n.d.) used CNN to jointly remove Gibbs-ringings and the noise for PF acquired data of magnitude or complex images reconstructed via zero filling; ringings in PF acquired complex images were removed as expected, whereas ringings of PF acquired magnitude images were only partially removed, especially for highly undersampled data.

Gibbs ringing around sharp edges in MRI has been shown to bias diffusion metrics around, for example, the boundary between cerebrospinal fluid (CSF) and brain white matter (WM) (see, e.g., Perrone et al., 2015: Veraart et al., 2016; Kellner et al., 2016). For example, for PF acquired data reconstructed via zero filling, the underestimated mean diffusivity (MD) in genu and splenium of the corpus callosum (CC) has been reported as spurious dark bands in WM around the CSF in MD map (see, e.g., Kellner et al., 2016) These banding artifacts can be wider than ordinary Gibbs ringings of fully sampled data, and may not be corrected by pipelines targeting ringings of fully sampled data. Yet, PF acquisition has been used in diffusion MRI (dMRI) to shorten the TE for achieving higher signal-to-noise ratios (SNR). Besides, zero filling is sometimes preferred since PF reconstruction can be vulnerable to motion during the echo train of echo-planar imaging (EPI) (see, e.g., Sotiropoulos et al., 2013; Bammer et al., 2010). For instance, dMRI data in Human Connectome Project were obtained using PF acquisition of ⅝ and zero filling interpolation, and only magnitude images were made publicly available for dMRI (see, e.g., Sotiropoulos et al., 2013).

To achieve, for example, fast and accurate quantitative analysis for such data, developing a pipeline to correct the "unconventional", PF-induced Gibbs ringing, may be needed. Thus, it may be beneficial to provide an exemplary pipeline for the Removal of PF-induced Gibbs ringing (RPG), which can overcome at least some of the deficiencies described herein above.

SUMMARY OF EXEMPLARY EMBODIMENTS

Exemplary systems, methods and computer-accessible medium, according to exemplary embodiments of the present disclosure can facilitate (i) decorrelating, identifying and removing noise from at least one image, and (ii) the origin of Gibbs ringing patterns caused by the PF acquisition and zero filling interpolation. According to the exemplary embodiments of systems, methods, and computer arrangement of the present disclosure, it is possible to provide (i) a universal sampling denoising (USD) pipeline to decorrelate, identify and remove noise in any, in general non-Cartesian, MRI acquisition; and (ii) a pipeline for the Removal of PF-induced Gibbs ringing (RPO), based on, e.g., any conventional (fully-sampled) unringing method, to, e.g., correct the extra ringing arising in PF-acquired magnitude images.

In the exemplary systems, methods and computer-accessible medium, according to exemplary embodiments of the present disclosure, USD algorithm stabilizes the variance, decorrelates the noise, and thereby enables the application of denoising approaches (such as, but not limited to, random matrix theory-based approaches) to MR images reconstructed from any non-Cartesian data. In addition to MRI, USD may also apply to other medical imaging techniques involving non-Cartesian acquisition, such as positron emission tomography (PET), computerized tomography (CT), and single-photon emission computerized tomography (SPECT).

While, in exemplary embodiments, the RPG pipeline can be independent of the choice of the conventional unringing method, the local subvoxel-shifts method (see, e.g., Kellner et al., 2016) can be employed. Exemplary systems, methods and computer-accessible medium, according to exemplary embodiments of the present disclosure, refer to the RPG pipeline in magnitude signals of numerical phantoms and of in vivo human brain dMRI data, and describe the effect of the ringing removal on diffusion metrics. In the exemplary systems, methods, and computer arrangement according to the exemplary embodiments of the present disclosure, the RPG pipeline can be applicable not just to EPI-acquired dMRI data but also to MRI of other contrasts acquired using, e.g., PF Cartesian k-space sampling, such as anatomical MRI or functional MRI.

One of the exemplary advantages the exemplary systems, methods, and computer arrangement, according to the exemplary embodiments of the present disclosure, can be the alleviating of the need for adjustable parameters, training data, or complex-valued data, thereby providing beneficial exemplary methods, systems and computer-accessible medium to identify and remove noise from any acquisitions, and to correct magnitude images.

Exemplary systems, methods and computer-accessible medium according to exemplary embodiments of the present disclosure can be provided for decorrelating noise in at least one image, which can be used to receive information related to the at least one image, and produce the image(s) based on the determination if the noise is decorrelated.

In exemplary systems, methods and computer-accessible medium, according to exemplary embodiments of the present disclosure, the producing procedure can be performed by decorrelating the at least one image. In exemplary systems, methods and computer-accessible medium, according to exemplary embodiments of the present disclosure, it is possible to remove the noise from the at least one image, and transform the denoised image to a final image. The image(s) can be or include an image acquired using any trajectory or sampling scheme in a k-space, or in the projection space. The projection space can be or include a CT image and/or a PET image. The trajectory or the sampling scheme in a k-space can be or include an MR image.

According to various exemplary embodiments of the present disclosure, it is possible to remove noise correlations in a reconstructed Cartesian k-space, a projection space, and/or an image space using a noise covariance matrix. The noise covariance matrix can be determined in terms of reconstruction kernel weights. The noise covariance matrix can also be determined by a numerical noise propagation through an image reconstruction. Further, it is possible to decorrelate the noise using an inverse square root of the noise covariance matrix.

In additional exemplary embodiments of the present disclosure, it is possible to estimate and remove the noise from the image(s) after the decorrelation. The removal of the noise can be performed using at least one noise removal procedure. For example, the noise can be removed and/or decorrelated iteratively. An estimate of the noise correlations can be estimated using the denoised image, whereas the noise is decorrelated and removed to provide a result that is used as the estimate of the noise correlations for a subsequent iteration.

The estimation of the noise level and/or the removal of the noise can be performed by identifying the noise components in the eigenspectrum of a singular value decomposition (SVD) or a principal component analysis (PCA). The components of the noise in SVD or PCA space can be described by a Marchenko-Pastur distribution. It is also possible, after removal of the noise, to restore an original image contrast of the at least one image by applying a noise covariance matrix to the denoised data. It is also possible to transform a map of the noise from the decorrelated space into an original image space by applying a noise covariance matrix. It is further possible to rotate the noise covariance matrix by a Fourier transformed reconstruction kernel.

According to further exemplary embodiments of the present disclosure, systems, methods and non-transitory computer-accessible medium having stored thereon computer-executable instructions can be provided for removing Gibbs ringing data from at least one image. For example, using such exemplary system, method and computer-accessible medium, it is possible to receive information related to the image(s), detect an oscillation pattern from at least one edge of a measured portion of k-space associated with the information, and remove the Gibbs ringing data from the information based on the detected oscillation pattern.

The image(s) can be or include a magnetic resonance ("MR") image. The oscillation pattern can be acquired using a k-space undersampling asymmetric procedure with respect to a center of the k-space. The oscillation pattern can also be acquired using a partial Fourier ("PF") acquisition. The Gibbs ringing data can be removed by applying a Gibbs-ringing correction more than once. The Removal of the Gibbs ringing data can be performed on a sub-sampled image, and a sub-sampling rate of the removal can be determined based on a subsampling factor of a partial Fourier ("PF") acquisition.

For example, it is possible to subsample the at least one image in an image domain or an image-frequency hybrid domain. It is also possible to remove a PF Gibbs pattern from the image(s) by transforming the image(s) into a set of sub-sampled images, applying a Gibbs-ringing correction procedure to sub-sampled images, and recombining the Gibbs-corrected sub-sampled images. The Gibbs ringing correction can be performed based on performing sub-voxel shifts.

Further, according to yet further exemplary embodiments of the present disclosure, it is possible to remove the Gibbs ringing pattern of a fully-sampled part of the k-space by applying the Gibbs ringing correction to the recombined images. It is also possible to swap an order of the Gibbs-ringing corrections. The swapping of the order can comprise. e.g., after applying a full Gibbs-ringing correction to the at least one image, transforming the image(s) of the removing procedure into the sub-sampled images, applying the Gibbs ringing correction to the sub-sampled images, and combining the sub-sampled images after the transformation. It is also possible to apply one or more combinations of subsampling and Gibbs-ringing correction. Such one or more combinations can be applied (i) iteratively and/or (ii) in different order.

According to still further exemplary embodiments of the present disclosure, exemplary systems, methods and computer-accessible medium can be provided which can be used to decorrelate noise in at least one image comprising receiving information related to the image(s), and produce the image(s) based on the determination if the noise is decorrelated. It is possible to remove Gibbs ringing data from the image(s) by receiving information related to the image(s), detecting an oscillation pattern from at least one edge of a measured portion of k-space associated with the information, and removing the Gibbs ringing data from the information based on the detected oscillation pattern.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 16 is a set of exemplary illustrations of the exemplary numerical simulations of Gibbs-ringing removal in 2-dimensional magnitude images of the Shepp-Logan phantom with the additional phase, according to an exemplary embodiment of the present disclosure;

FIG. 21 is a set of exemplary graphs of the optimal shift in subvoxel-level based on numerical simulations of Gibbs-ringing removal in 1-dimensional signal of a rectangular function, according to an exemplary embodiment of the present disclosure:

FIG. 25 is a set of exemplary graphs providing the exemplary numerical simulations of Gibbs-ringing removal in 1-dimensional diffusion-weighted signals, according to an exemplary embodiment of the present disclosure;

FIG. 30 shows a block diagram of an exemplary embodiment of a system according to the present disclosure.

Figure 1:
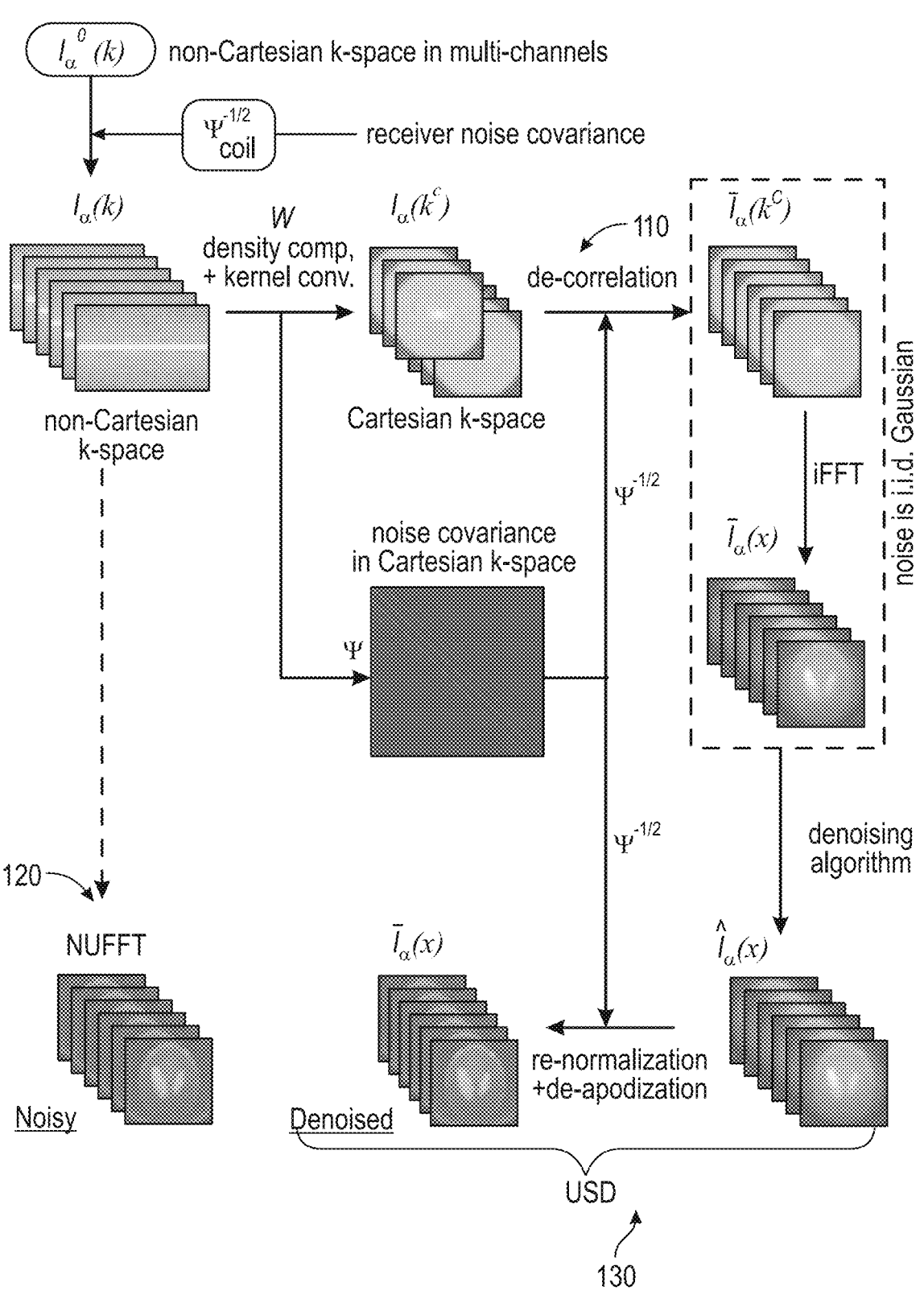
FIG. 1 is an exemplary schematic diagram of an exemplary pipeline of Universal Sampling Denoising (USD) for non-Cartesian k-space data according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary Discussion of the Universal Sampling Denoising (USD) Pipeline

In the exemplary systems, methods and computer-accessible medium according to an exemplary embodiment of the present disclosure, the Universal Sampling Denoising (USD) pipeline can be used to denoise the non-Cartesian data. USD can, e.g., de-correlate the noise before applying the denoising procedure (such as, but not limited to, RMT-based procedure, e.g., MPPCA procedure), along the following exemplary and non-exhaustive procedures.

In the exemplary systems, methods and computer-accessible medium according to an exemplary embodiment of the present disclosure, noise correlations in receiver channels can be removed by using the noise covariance matrix given by the noise pre-scan acquired without radiofrequency (RF) pulses (see, e.g., references 23; 24). In the exemplary systems, methods and computer-accessible medium according to an exemplary embodiment of the present disclosure, the remaining noise correlations between voxels due to non-uniform resampling onto a Cartesian grid can be removed by using the noise covariance matrix determined by coefficients of density compensation and kernel convolution in non-uniform fast Fourier transform (NUFFT). This can be a nontrivial USD procedure. After the exemplary noise de-correlation, e.g., the noise can be approximately i.i.d. Gaussian, and can subsequently be removed by applying MPPCA denoising. Further, e.g., the denoised images can be re-normalized to restore the image contrast.

In FIG. 1, exemplary USD is illustrated for a radial k-space trajectory. After removing any noise correlation between receiver channels by using noise scans, it is possible to further de-correlate the noise statistics in the gridded Cartesian k-space prior to applying any denoising algorithm in the image space. The noise covariance matrix $\Psi = WW^H$ in Cartesian k-space is determined by coefficients W of density compensation and convolution with interpolation kernel, as in Equation 5 below. After denoising using the MPPCA procedure, re-normalization of the denoised image can recover the original image contrast.

Exemplary Noise De-Correlation in Receiver Channels

For example, the noisy acquisition (image plus complex-valued noise)

$$I_\alpha^0(k) + \epsilon_\alpha(k) \tag{1}$$

for the RF receive channel $\alpha$, where k is the k-space point in any (in general, non-Cartesian) trajectory. The "original" noise $\epsilon_\alpha$ is correlated along the RF coil dimension $\alpha$, such that the expectation value $$\left\langle \epsilon_\alpha(k)\epsilon_\beta^*(k') \right\rangle = \delta_{kk'} \cdot \Psi_{coil,\alpha\beta}, \tag{1}$$

and yet is independent of k (hence the Kronecker $\delta_{kk'}$). The coil covariance matrix $\Psi_{coil}$, that can be determined using noise prescan without RF excitations, defines noise correlations in receiver channels (see, e.g., references 23 and 24).

As the first step of the USD pipeline, the measured signal is de-correlated (procedure 110) (see, e.g., references 23 and 24) using the following:

$$I_\alpha(k) + \varepsilon_\alpha(k) = \sum_\beta \left(\Psi_{coil}^{-1/2}\right)_{\alpha\beta} \cdot \left(I_\beta^0(k) + \epsilon_\beta(k)\right), \tag{2}$$

such that the noise $\epsilon \to \varepsilon$ becomes i.i.d. complex-valued Gaussian.

$$\left\langle \varepsilon_\alpha(k)\varepsilon_\beta^*(k') \right\rangle = \delta_{kk'} \cdot \delta_{\alpha\beta}, \tag{3}$$

having, e.g., no correlations between the "rotated" coils.

Exemplary Universal Sampling Denoising (USD) Pipeline for any Sampling Scheme In the exemplary systems, methods and computer-accessible medium according to an exemplary embodiment of the present disclosure, the case when the original image is acquired at the non-Cartesian k-points can be evaluated. Since an MR image can be defined (in the x-space) on a Cartesian grid, the non-Cartesian k-space points should be re-gridded (interpolated) onto the Cartesian k-space grid. The exemplary combination of re-gridding in k-space and the inverse fast Fourier transform (iFFT) into the x-space is referred to as the non-uniform FFT (NUFFT). Since FFT is a unitary operation, e.g., most or all the noise correlations introduced by the NUFFT can come from the k-space re-gridding.

The exemplary USD pipeline can be used to remove such correlations. For that, consider the four conventional NUFFT steps (see, e.g., reference 25):
  i. Density compensation in k-space;
  ii. Convolution with an interpolation kernel C(k) in k-space, e.g., the Kaiser-Bessel function;
  iii. iFFT to image space; and
  iv. De-apodization in image space.

The exemplary steps of NUFFT (procedure 120) can be utilized as a linear non-unitary transformation (same for each coil $\alpha$):

$$I_\alpha(k_i^c) + \varepsilon_\alpha(k_i^c) = \sum_j w_{ij} \cdot [I_\alpha(k_j) + \varepsilon_\alpha(k_j)], \tag{4}$$

where $$k_i^c$$

refer to the Cartesian k-space points, as opposed to general non-Cartesian $k_j$ acquired originally. The weights $$W = (w_{ij}) = (d_j \cdot C(k_j - k_i^c))$$

incorporate density compensation $d_j$ and kernel convolution $$C(k_j - k_i^c).$$

Typically, $w_{ij}$ is a local kernel, involving a few adjacent non-Cartesian points to interpolate a Cartesian one. Indices i and j label the points with the 2- or 3-dimensional coordinates. Hence, they can run up to the total number of k-space points. For the most general form of Equation 4 and the following denoising pipeline, the linear transformation weights $w_{ij}$ can be extended to not only the dimension of k-space or image space, but also the dimension of coils, slices, or temporal domain for parallel imaging, simultaneous multi-slice, or any other fast imaging techniques.

The re-gridding (Equation 4) introduces noise correlations on the Cartesian grid:

$$\langle \varepsilon_\alpha(k_i^c)\varepsilon_\beta^*(k_j^c)\rangle = \sigma_0^2 \cdot \delta_{\alpha\beta} \cdot \Psi_{ij},\ \Psi = WW^H, \tag{5}$$

with $\sigma_0$ the noise level in the non-Cartesian k-space. Based on Equation 3, $\sigma_0=1$ when the coil data is de-correlated along the RF coil dimension using noise prescan. From such point, it can be assumed that the noise level is homogeneous and constant (not necessarily unity) in the acquired non-Cartesian k-space. An exemplary observation can be that the noise covariance matrix $\Psi$ on the k-space Cartesian grid is determined by the weighting coefficients W.

With the knowledge of how noise gets correlated, the k-space data on the Cartesian grid can be de-correlated, analogously to Equation 2:

$$\tilde{I}_\alpha(k_i^c) + \tilde{\varepsilon}_\alpha(k_i^c) = \sum_j (\Psi^{-1/2})_{ij} \cdot [I_\alpha(k_j^c) + \varepsilon_\alpha(k_j^c)], \tag{6}$$

where $\tilde{I}$ and $\tilde{\varepsilon}$ are the k-space signal and noise on the Cartesian grid after de-correlation.

While the de-correlation (Equation 6) changes the local contrast in the k-space, it can ensure the i.i.d. complex Gaussian noise, $$\langle \tilde{\varepsilon}_\alpha(k_i^c)\tilde{\varepsilon}_\beta^*(k_j^c)\rangle = \sigma_0^2 \cdot \delta_{\alpha\beta} \cdot \delta_{ij}. \tag{7}$$

Likewise, the corresponding signal contrast in the noise de-correlated image $\tilde{I}_\alpha(x)$ is very different from that of the ground truth coil image, and yet, after the unitary iFFT transformation, the corresponding image noise $\tilde{\varepsilon}_\alpha(x)$ remains spatially-uncorrelated i.i.d. Gaussian. Hence, the image noise statistics in the "tilde" space make it particularly suitable for applying exemplary RMT-based noise removal procedures such as, but not limited to, MPPCA.

After de-correlation and iFFT, the three-way MRI data matrix remained which is sampled in a patch $\Omega(x_0)$ around the voxel $x_0$: $X_{\alpha xm}(\Omega)=[\tilde{I}_{\alpha,m}(x)+\tilde{\varepsilon}_{\alpha,m}(x)]|_{x\in\Omega(x_0)}$, where m labels independent measurements (e.g., diffusion q-space points, or images in a time-series). The noise $\tilde{\varepsilon}_{\alpha,m}(x)$ is uncorrelated and i.i.d. Gaussian across all three indices in $X_{\alpha xm}$. It is possible to then denoise such an object using RMT-based methods by "flattening" it along different dimensions. Empirically, combining the coil dimension with the patch around the voxel has the best performance (18; 19), i.e., re-arranging $X_{\alpha xm}$ as an $(N_\alpha\cdot N_x)$ by $N_m$ matrix, with $N_{(\bullet)}$ denoting the number of elements along the dimension $(\bullet)$.

Alternatively, according to exemplary embodiments of the present disclosure, it is possible to first combine the coil images, obtaining the matrix $X_{xm}$ of size $N_x$ by $N_m$, and then apply RMT-based denoising, such as, but not limited to, MPPCA complex denoising, to this two-way object, in which case an additional noise variance stabilization would be required for the spatially varying coil combination weights.

An exemplary denoising, such as, but not limited to, RMT-based denoising (e.g., the MPPCA procedure) can be then applied to estimate the noise level $\hat{\sigma}(x)$ and the number $P(x)$ of signal components in the PCA domain in the patch $\Omega(x)$ (either a local square patch, or a non-locally chosen, e.g., based on signal similarity) around voxel x, and to remove the noise (see, e.g., references 5, 4, 18 and 19). The data of all coils can be denoised either separately, or jointly. This denoising can include at least one of the following exemplary steps: phase demodulation, virtual coil compression, and PCA thresholding based on MP distribution. And PCA thresholding can include optimal eigenvalue shrinkage (27). After denoising, the noise variance can decrease by a factor of $P\cdot(1/N+1/M)$, assuming $P<<M$, N, such that SNR at voxel x increases by a factor$\approx\sqrt{M/P(x)}$, where M is the smaller dimension of data matrix defined at the voxel (4). In most cases, M is the number of scanned images.

Further, the denoised image $\hat{I}_\alpha(x)$ can then be re-normalized to recover its original contrast:

$$I_\alpha(x) = \frac{1}{c(x)}iFFT\{\Psi^{-1/2} \cdot FFT\{\hat{I}_\alpha(x)\}\}, \tag{8}$$

where $c(x)$ is the FT of convolution kernel $C(k)$ for de-apodization. The denoised images $I_\alpha(x)$ in multiple channels are then adaptively combined (28; 29), $$I(x) = \sum_\alpha p_\alpha(x) \cdot I_\alpha(x), \tag{9}$$

with spatially varying adaptive combination weights $p^T=p_\alpha(x)$.

The noise map $\hat{\sigma}(x)$ of de-correlated image $\tilde{I}_\alpha(x)$ can be an estimate of $\sigma_0$ in Equation 7, which can be translated into the noise map $\sigma(x)$ of images in the original contrast without denoising, via $$\sigma(x) = \frac{1}{c(x)}\sqrt{|F^H \cdot \Psi \cdot F|_{x,x}} \cdot \sigma_0$$
$$= \frac{1}{c(x)}\sqrt{\left|\sum_{ij} F_{xi}^* \cdot \Psi_{ij} \cdot F_{jx}\right|} \cdot \sigma_0, \tag{10}$$

with $$F = (F_{k_i^c x}) = (F_{ix})$$

denoting the fast Fourier transform, and $|\bullet|_{x,x}$ denoting the absolute value of diagonal element at voxel x (See section Noise Level Transformation below).

Given that the noise in the exemplary de-correlated image $\tilde{I}_\alpha(x)$ can be, e.g., i.i.d. Gaussian, its noise variance $$\sigma_0^2$$

can be estimated by the $\hat{\sigma}^2(x)$ or its average over space $\langle \hat{\sigma}^2(x)\rangle$, with $\langle \bullet \rangle$ denoting averaging over space. Similarly, substituting Equation 8 into Equation 9 and following the derivation in section Noise Level Transformation below, the noise level of combined image is given by $$\sigma_{comb}(x) = \frac{1}{c(x)} \sqrt{\left|(F \cdot p^*)^H \cdot \Psi \cdot (F \cdot p^*)\right|_{x,x}} \cdot \sigma_0 \tag{11}$$

$$= \frac{1}{c(x)} \sqrt{\left|\sum_{\alpha ij} p_\alpha(x) \cdot F_{xi}^* \cdot \Psi_{ij} \cdot F_{jx} \cdot p_\alpha^*(x)\right|} \cdot \sigma_0.$$

The first lines in Equations 10 and 11 suggest the most general form of the noise level transformation, where the noise correlation $\Psi$ can be extended to not only the dimension of k-space or image space, but also the dimension of coils, slices, or temporal domain for parallel imaging, simultaneous multi-slice, or any other fast imaging techniques. If parallel imaging and simultaneous multi-slice are not applied, the second lines in Equations 10 and 11 are valid; in other words, the adaptive combination weight p is separable from the FFT coefficient F and noise covariance matrix $\Psi$ of NUFFT since the later two are independent of the coils, leading to $$\sigma_{comb}(x) = \frac{1}{c(x)} \sqrt{\left|p^T \cdot p^*\right|_{x,x}} \cdot \sqrt{\left|F^H \cdot \Psi \cdot F\right|_{x,x}} \cdot \sigma_0. \tag{12}$$

Using Equation 10, it is possible to define the g-factor for the coil image due to NUFFT:

$$g = \frac{SNR^{full}}{SNR^{nufft}} = \frac{\sigma(x)}{\sigma_0} = \frac{1}{c(x)} \sqrt{\left|F^H \cdot \Psi \cdot F\right|_{x,x}}. \tag{13}$$

Similarly, the g-factor of the combined image is given by $$g_{comb} = \frac{SNR_{comb}^{full}}{SNR_{comb}^{nufft}} = \frac{\sigma_{comb}(x)}{\sigma_0} \cdot \frac{1}{\sqrt{\left|p^T \cdot p^*\right|_{x,x}}}, \tag{14}$$

and $g_{comb} = g$ when parallel imaging is not applied.

Exemplary Noise Level Transformation in USD Pipeline

Given that the noise at a voxel x in an image $\check{I}(x)$ is i.i.d. Gaussian and has a standard deviation $\hat{\sigma}(x)$, its linear transformation by an arbitrary matrix E, $$I(x) = \sum_{x'} E_{xx'} \check{I}(x'), \varepsilon_x = \sum_{x'} E_{xx'} \check{\varepsilon}_{x'}, \tag{15}$$

can leads to the noise correlation function $$\langle \varepsilon_x \varepsilon_y^* \rangle = \sum_{x',y'} E_{xx'} E_{yy'}^* \langle \check{\varepsilon}_{x'} \check{\varepsilon}_{y'}^* \rangle = \sum_{x'} E_{xx'} E_{yx'}^* \sigma_0^2 \tag{16}$$

where the i.i.d. property $$\langle \check{\varepsilon}_x, \check{\varepsilon}_{y'} \rangle = \delta_{x'y'} \sigma_0^2$$

can be utilized. In practice, the noise variance $$\sigma_0^2$$

can be estimated by the noise map $\hat{\sigma}^2(x)$ yielded by the denoising procedure or its average $\langle \hat{\sigma}^2(x) \rangle$ over space. Then the image I(x) after applying linear transformation has the noise of variance $$\sigma^2(x) = \langle \varepsilon_x \varepsilon_x^* \rangle,$$

given by $$\sigma(x) = \sqrt{\left|E \cdot E^H\right|_{x,x}} \cdot \sigma_0, \tag{17}$$

based on Equation 16.

Substituting $E = F^H \cdot \Psi^{1/2} \cdot F$ and Fourier transform F into Equation 18, and incorporating the de-apodization scaling c(x) in the last step of NUFFT, it is possible to obtain the noise level transformation in USD for each coil image in Equation 10. Similarly, substituting $E = p^T \cdot F^H \cdot \Psi^{1/2} \cdot F$ into Equation 17, it is possible to obtain Equation 11 for the combined image. This is shown in procedure 130 of FIG. 1.

Exemplary Numerical Simulation of USD Pipeline

To demonstrate USD in simulated data, a 2-dimensional Shepp-Logan phantom of size 64×64 was created. The phantom can include a non-diffusion-weighted-image (non-DWI) $S_0 \in [0,1]$ and 30 DWIs of b-value b=0.1-1 ms/μm2 with 12 different coils of linear coil sensitivity. The multiple channels provided extra data redundancy for noise removal, and were adaptively combined after denoising. The DWI signal was $S = S_0 \cdot \exp(-bD)$ with a diffusivity map $D = |6S_0 - 4S_0^7|$. Its k-space data was sampled on radial trajectories, consisting of 100 spokes/image and 64 sampled data points/spoke. Gaussian noise with standard deviation σ=0.05 was added in the real and imaginary part of k-space data on radial trajectories. The non-Cartesian diffusion weighted images (DWIs) were reconstructed by using the NUFFT toolbox (see, e.g., reference 30), and the diffusivity map was estimated by fitting a mono-exponential fit.

Exemplary Ex-Vivo Mouse Brain Data to Illustrate the USD Pipeline

Further, USD in dMRI data of an ex vivo mouse brain was demonstrated where the brain was controlled at 36° C. during the scan. dMRI measurements were performed using a monopolar pulsed-gradient 2-dimensional center-out radial acquisition (reference 31) on a 7 Tesla MRI system (Bruker Biospin, Billerica, MA, USA) with a 4-channel receive-only cryocoil in combination with a 72-mm diameter volume coil for excitation, providing extra data redundancy for noise removal, and adaptively combined after denoising. The following was obtained: 4 non-DWIs and 60 DWIs of b-value b=[1,2] ms/μm² along 30 directions per b-shell, with a voxel size=0.156×0.156×1 mm³, FOV=20× 20 mm², and fixed TE/TR=20/400 ms. The ground truth image was reconstructed from 402 center-out radial spokes with 70 data points/spoke by using the NUFFT toolbox (30), and averaged over two repeated measurements. In addition, the noisy raw data was reconstructed from only 201 spokes without averaging over repeats. Hence, the SNR of the ground truth is higher than that of the noisy raw data. The USD denoising pipeline was applied to noisy raw data. Voxelwise kurtosis tensor fitting (see, e.g., references 32; 33) was performed to the ground truth, noisy raw data, and denoised data to extract parametric maps of diffusion and kurtosis tensor metrics, such as mean diffusivity (MD), axial diffusivity (AD), radial diffusivity (RD), colored fractional anisotropy (FA), mean kurtosis (MK), axial kurtosis (AK), and radial kurtosis (RK).

Exemplary in Vivo Human Data to Illustrate USD Pipeline

Further, USD in in vivo $T_2$ relaxometry data of a human abdomen was demonstrated. Following IRB approval for prospective data collection and informed consent, a volunteer (female, 39 years old) was imaged using a 6-channel surface array coil and an 18-channel spine coil on a commercial MRI system (MAGNETOM Aera 1.5 T, Siemens Healthcare, Erlangen, Germany) modified to operate as a prototype scanner at a field strength of 0.55 T. Data was acquired using a 2-dimensional radial turbo spin echo sequence (see, e.g., reference 34) with the following parameters: TE=7.9-158 ms (echo train length=20, echo spacing=7.9 ms), voxel size=1.48×1.48×6 mm³, TR=3.3 s, and refocusing flip angle=180°. Each image of matrix size 256×256 was reconstructed from 51 radial spokes with 512 data points/spoke by using the NUFFT toolbox (see, e.g., reference 30). The USD denoising pipeline was applied, and the $T_2$ value in each voxel is decided by matching the denoised signal with a dictionary of multi-spin-echo $T_2$ relaxation, built based on the extended phase graph method (see, e.g., reference 35) with a fixed $T_1$=1000 ms. $T_2$=1–200 ms, and $$B_1^+ = 60 - 120\%$$

(see, e.g., reference 36).

Exemplary Results of Numerical Simulations for the Exemplary USD Pipeline

Figure 2:
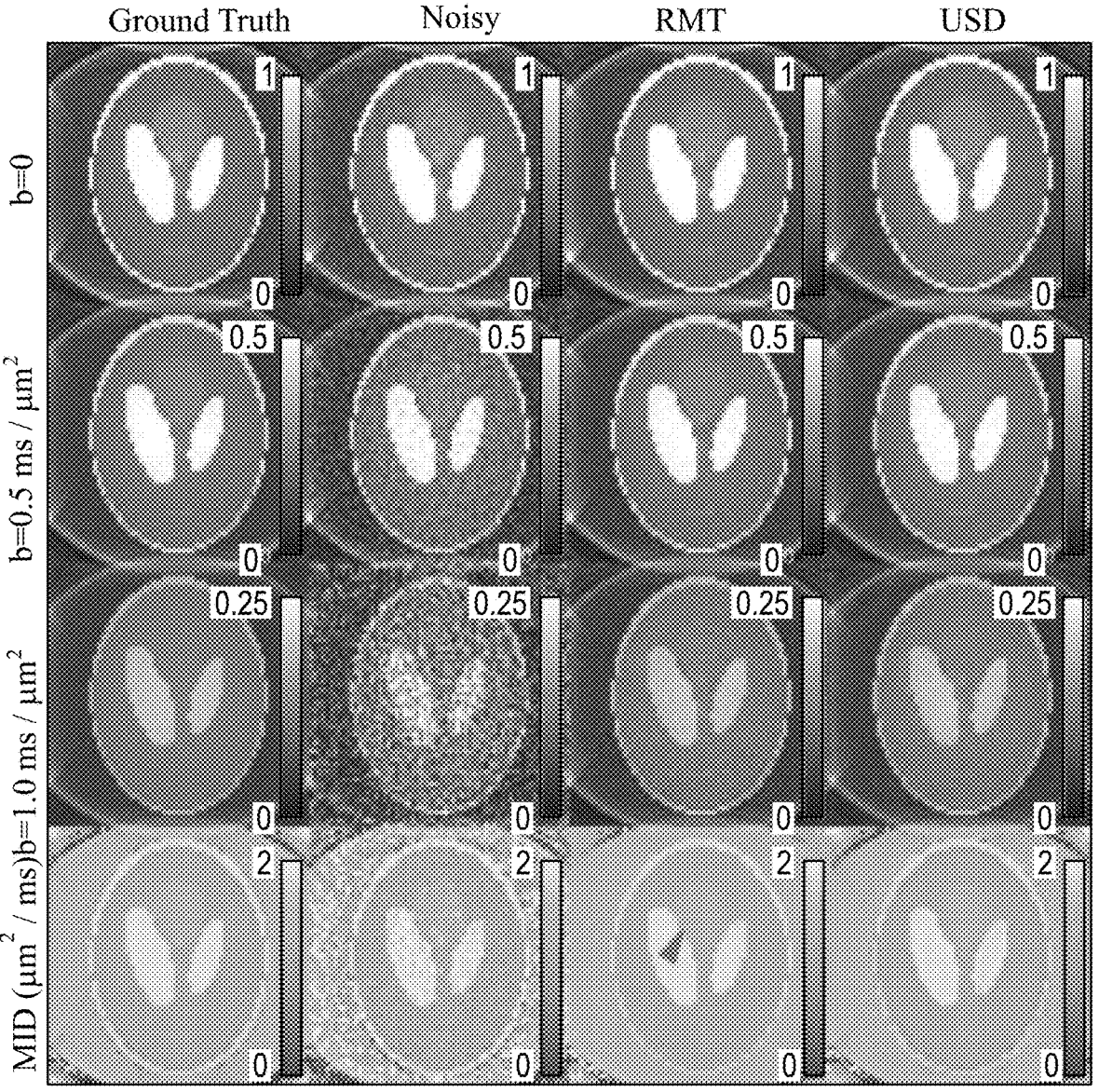
FIG. 2 is as set of exemplary illustrations of a numerical simulation of a phantom according to an exemplary embodiment of the present disclosure.

In the exemplary numerical phantom, USD substantially reduced the noise and recovered the true values from the diffusivity values biased due to the noise floor in noisy raw data (see FIG. 2).

In particular, FIG. 2 shows a set of exemplary illustrations for an exemplary numerical simulation of a diffusion phantom (1 b=0 image+30 DWIs) according to an exemplary embodiment of the present disclosure. The ground truth (GT) and noisy data were reconstructed by applying NUFFT to the original k-space data on radial trajectories. The noise in noisy data was significantly reduced by using either RMT-based denoising without noise de-correlation or the USD pipeline. The RMT without noise de-correlation seemed to reduce the noise in images, yet lead to blurring in the MD map (red arrow). In contrast, the USD successfully recovered the MD values without excessive smoothing.

Figure 3:
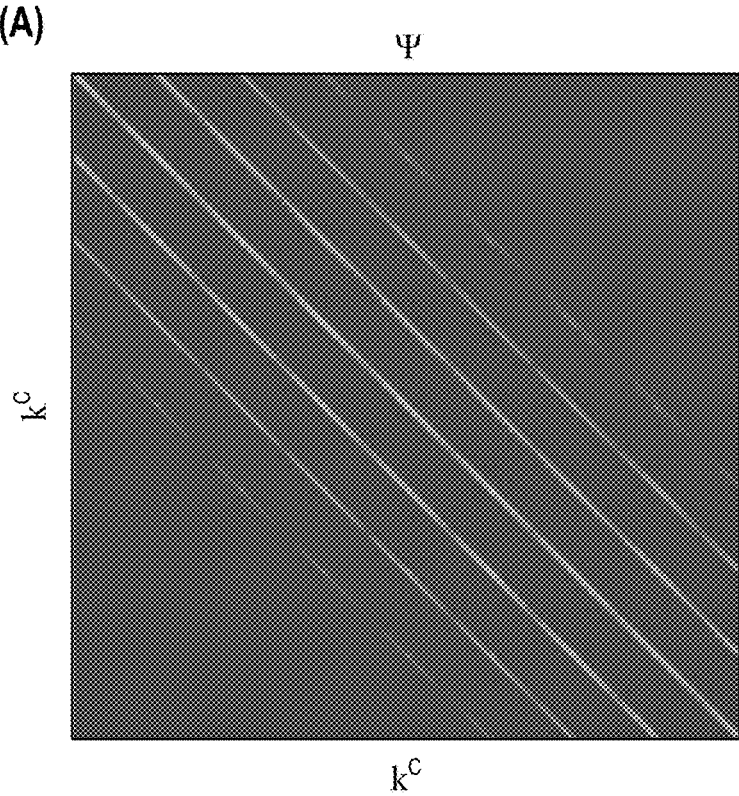
FIGS. 3(A)-3(F) are exemplary illustrations and associated graph for an exemplary noise covariance matrix in gridded k-space of associated noise statistics in an exemplary embodiment of the present disclosure.
Figure 3:
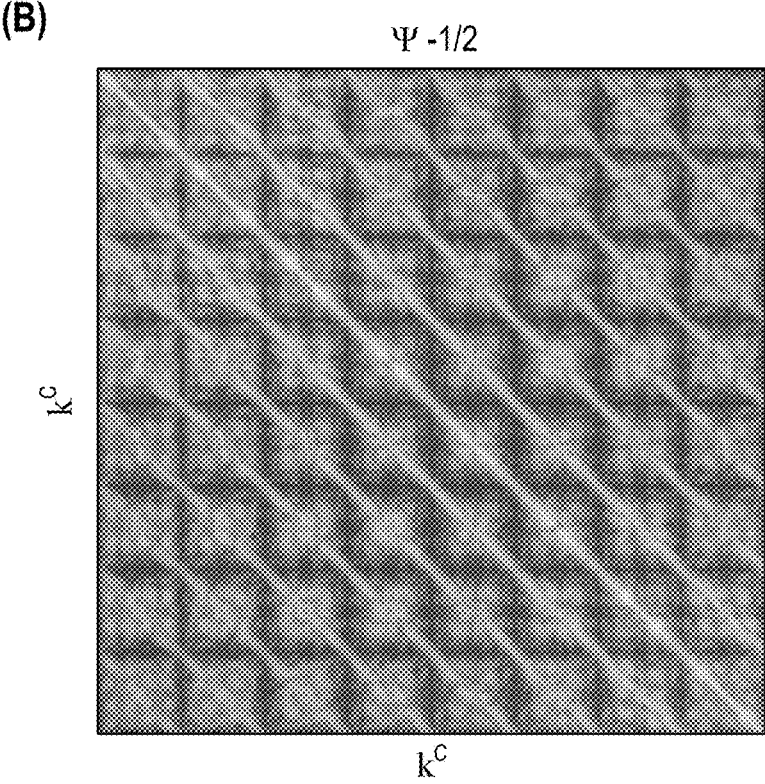

FIGS. 3(A)-3(E) show exemplary illustrations and a graph for an exemplary noise covariance matrix in gridded k-space and noise statistics in numerical simulations (corresponding to FIG. 2) according to an exemplary embodiment of the present disclosure. In particular, FIGS. 3(A) and 3(B) illustrate that in the Cartesian k-space $k^c$, the noise covariance matrix $\Psi$ is sparse, but its square root of inverse $\Psi^{-1/2}$ is not. FIGS. 3(C) and 3(D) illustrate exemplary noise maps before and after re-normalization, $\hat{\sigma}(x)$ and $\sigma(x)$, are both smooth. FIG. 3(E) shows an illustration of number P(x) of signal components in PCA domain is low, indicating the applicability of RMT-based denoising algorithm to noise de-correlated images. FIG. 3(F) illustrates a graph indicating the normalized image residual r (defined in Equation 18 below) was almost normally distributed, manifested by the slope≈−½ in the semi-log scale.

The noise covariance matrix due to NUFFT is sparse, and yet its inverse square root may not be (see FIGS. 3(A) and 3(B)). The noise map before and after re-normalization was smooth (see FIGS. 3(C) and 3(D)), and the number of signal components in PCA domain is low (see FIG. 3(E)). For quantitative analysis, it is possible to define the normalized image residual in multiple channels, $$r \equiv \left[\hat{I}_\alpha(x) - I_\alpha(x)\right] / \hat{\sigma}(x). \qquad (18)$$

When the exemplary denoising procedure removes most of the noise without corrupting the signal, the $\hat{\sigma}$-normalized residual r may be normally distributed. In simulations, the residual histogram in the semi-log scale is below the reference line of slope−½, i.e., PDF~exp(−½r²)/√2π, indicating the applicability of USD in simulations (FIG. 3F).

Exemplary Results of Ex Vivo Mouse Brain Data for the Exemplary USD Pipeline

Figure 4:
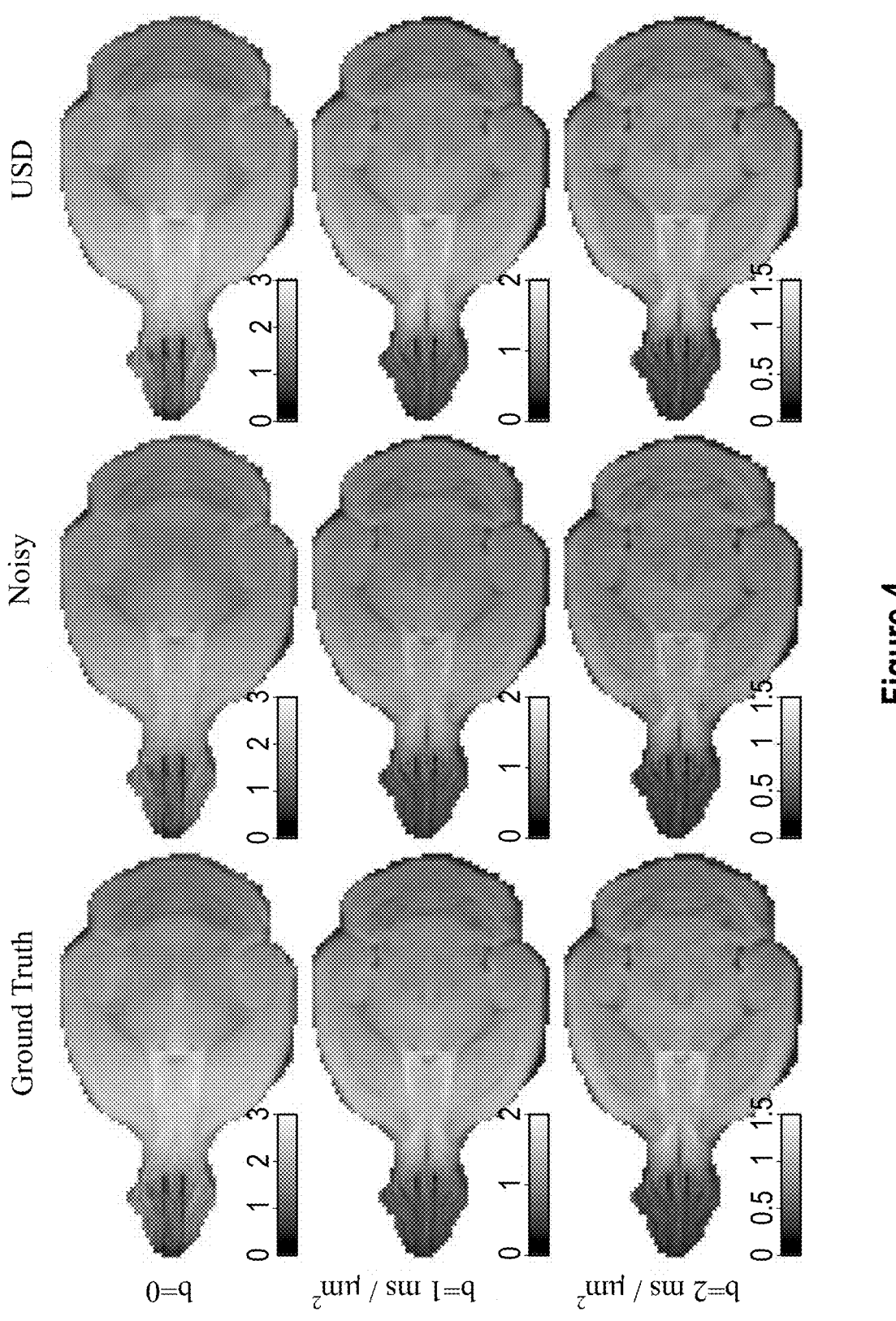
FIG. 4 is a set of exemplary illustrations associated with a noise removal pipeline (USD) on diffusion weighted dMRI data in an ex vivo mouse brain according to an exemplary embodiment of the present disclosure.

FIG. 4 shows a set of exemplary illustrations of an exemplary USD denoising pipeline on dMRI data in ex vivo mouse brain (4b=0 images+60 DWIs) according to an exemplary embodiment of the present disclosure. The ground truth data was reconstructed from 402 spokes per DWI, averaged over 2 repeated measurements. The noisy data was reconstructed from 201 radial spokes per DWI, without averaging over repeats. The noise in DWIs was reduced by the USD.

Figure 5:
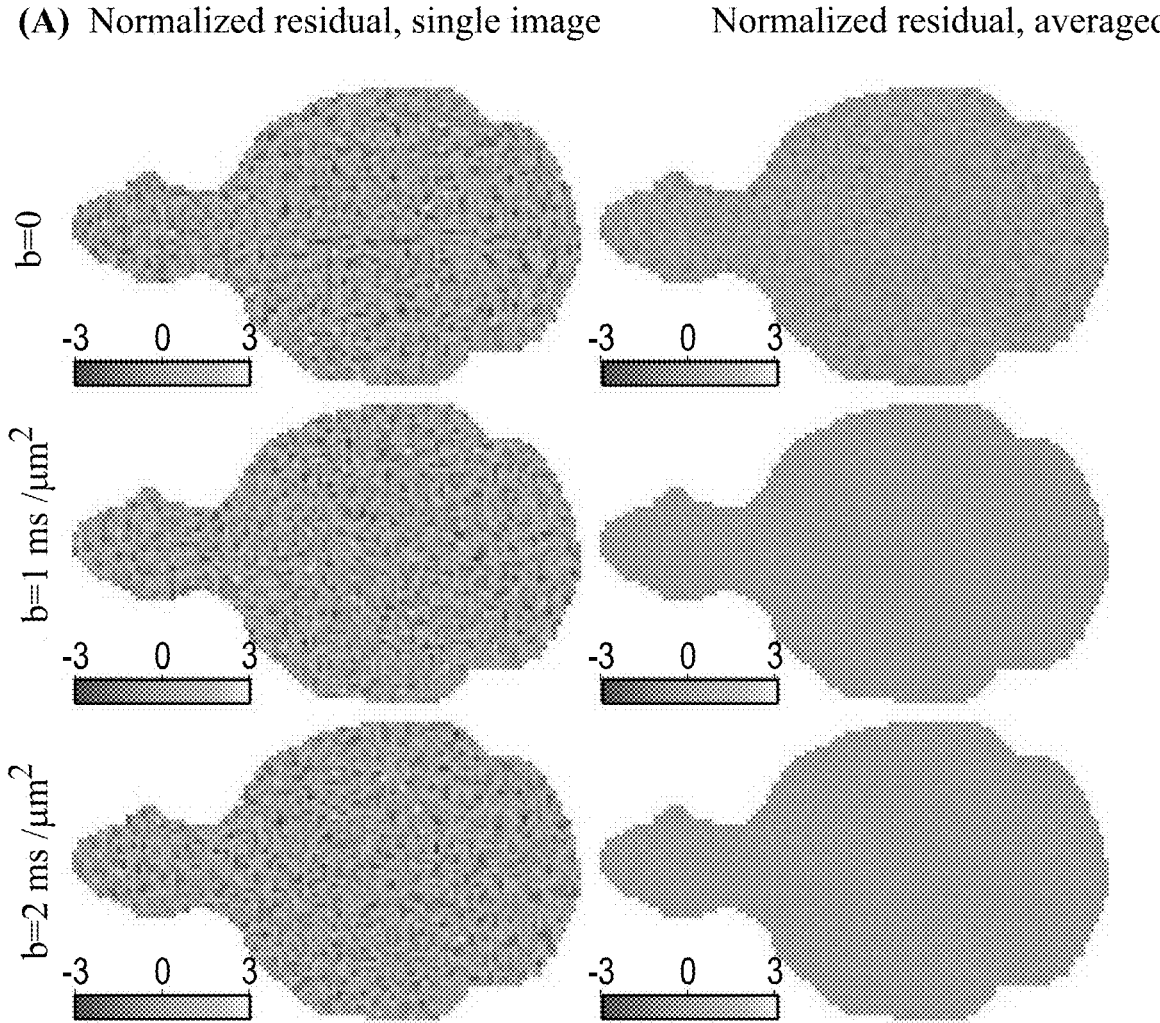
FIGS. 5(A)-5(D) are exemplary illustrations and associated graph of noise statistics after USD pipeline in ex vivo mouse brain according to an exemplary embodiment of the present disclosure.

FIGS. 5(A)-5(D) show exemplary illustration of exemplary noise statistics of USD in DWIs of ex vivo mouse brain (as presented in FIG. 4) according to an exemplary embodiment of the present disclosure. In particular, FIG. 5(A) illustrates the normalized residual maps r in Equation 18 had no anatomical structures, either before (left) or after (right) averaging over multiple residual maps in different gradient directions of each b-shell. FIG. 5(B) shows the exemplary noise maps before and after re-normalization, $\hat{\sigma}(x)$ and $\sigma(x)$, were both smooth. FIG. 5(C) provides an exemplary illustration for the number P(x) of signal components in PCA domain was low at the central region, where the SNR improvement~√M/P was the highest. FIG. 5(D) shows a graph indicating the normalized image residuals r were roughly normally distributed and below the reference line of slope−½ in semi-log scale, indicating that USD only removed noise.

Figure 6:
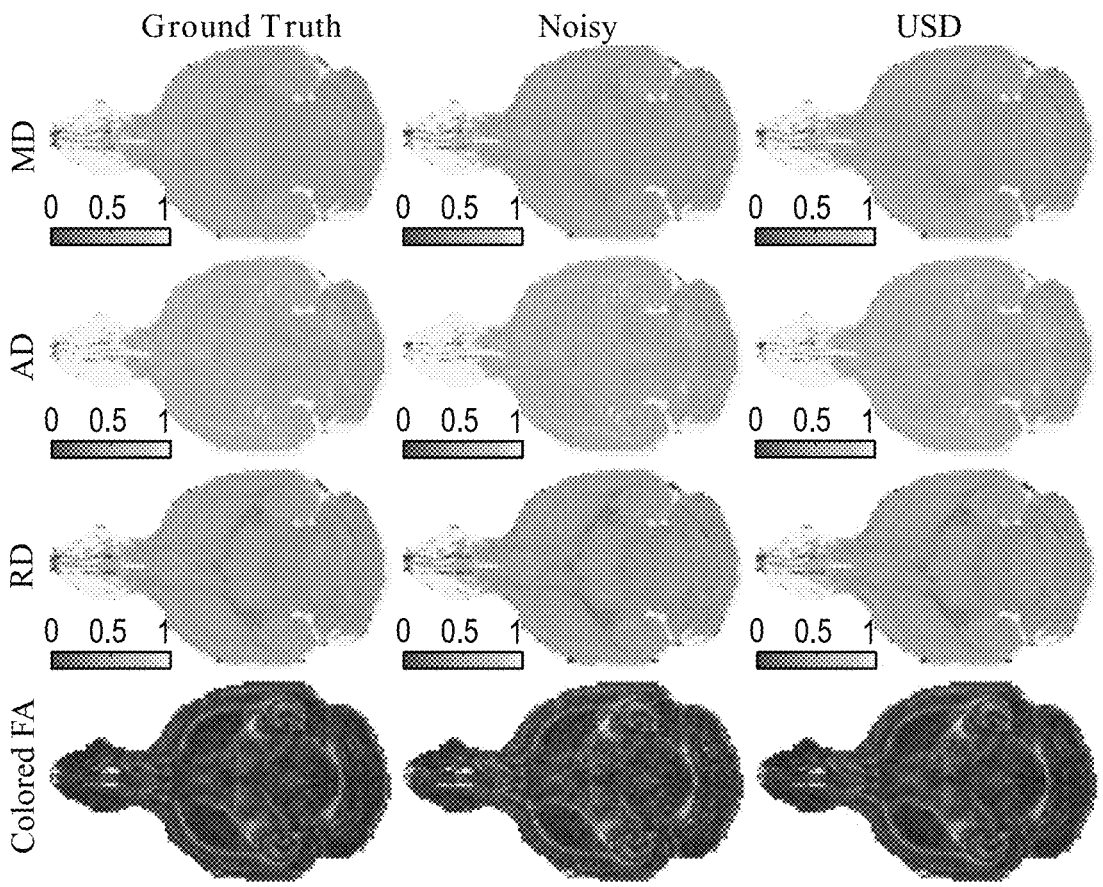
FIG. 6 is as set of exemplary illustrations associated with the exemplary effect of noise removal pipeline (USD) on diffusion tensor metrics (MD/AD/RD/colored FA) measured in an ex vivo mouse brain according to an exemplary embodiment of the present disclosure.

FIG. 6 shows a set of illustration for the exemplary effect of the USD denoising pipeline on diffusion tensor metrics (MD/AD/RD/colored FA) in ex vivo mouse brain (corresponding to FIG. 4) according to an exemplary embodiment of the present disclosure. After denoising by using USD, e.g., the noise in colored FA map was largely reduced. Here, the colored FA map was multiplied by a factor of 2 to enhance the contrast. The units of MD, AD, and RD are µm²/ms.

Figure 7:
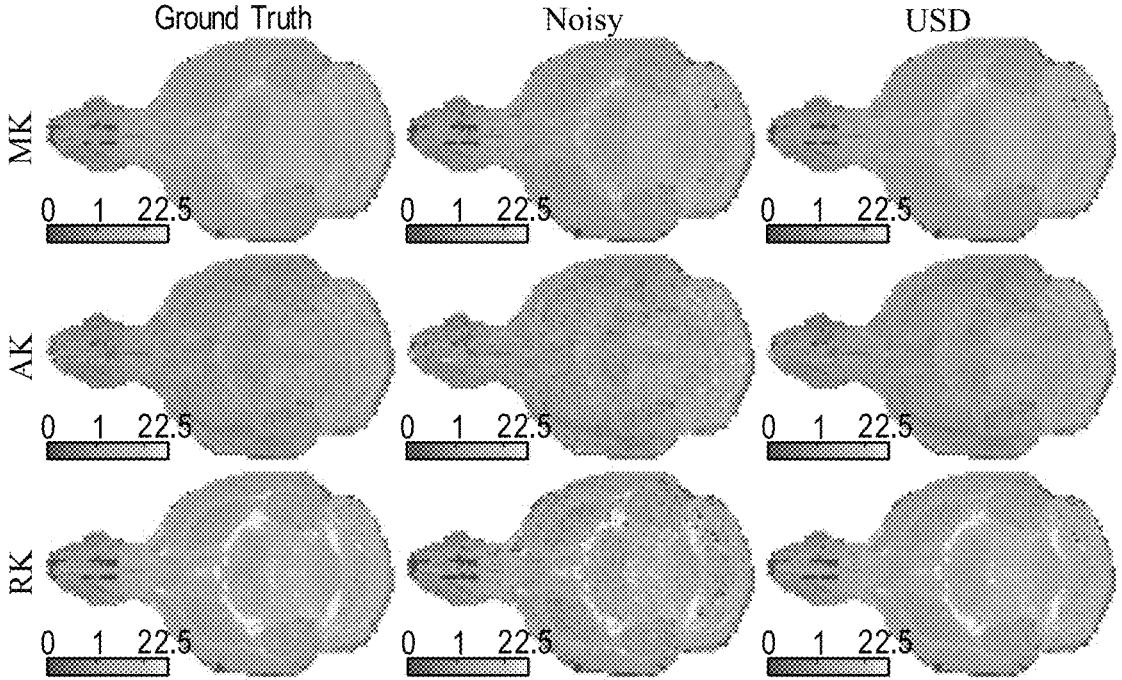
FIG. 7 is as set of exemplary illustrations associated with the exemplary effect of noise removal pipeline (USD) on kurtosis tensor metrics (MK/AK/RK) measured in an ex vivo mouse brain according to an exemplary embodiment of the present disclosure.

FIG. 7 shows a set of illustration for the exemplary effect of the USD denoising pipeline on kurtosis tensor metrics (MK/AK/RK) in ex vivo mouse brain (corresponding to FIG. 4) according to an exemplary embodiment of the present disclosure. The kurtosis tensor was fitted by using weighted linear least square without any constraints. By applying the USD pipeline to the noisy data, the noise in MK, AK, and RK maps is largely reduced.

Figure 8:
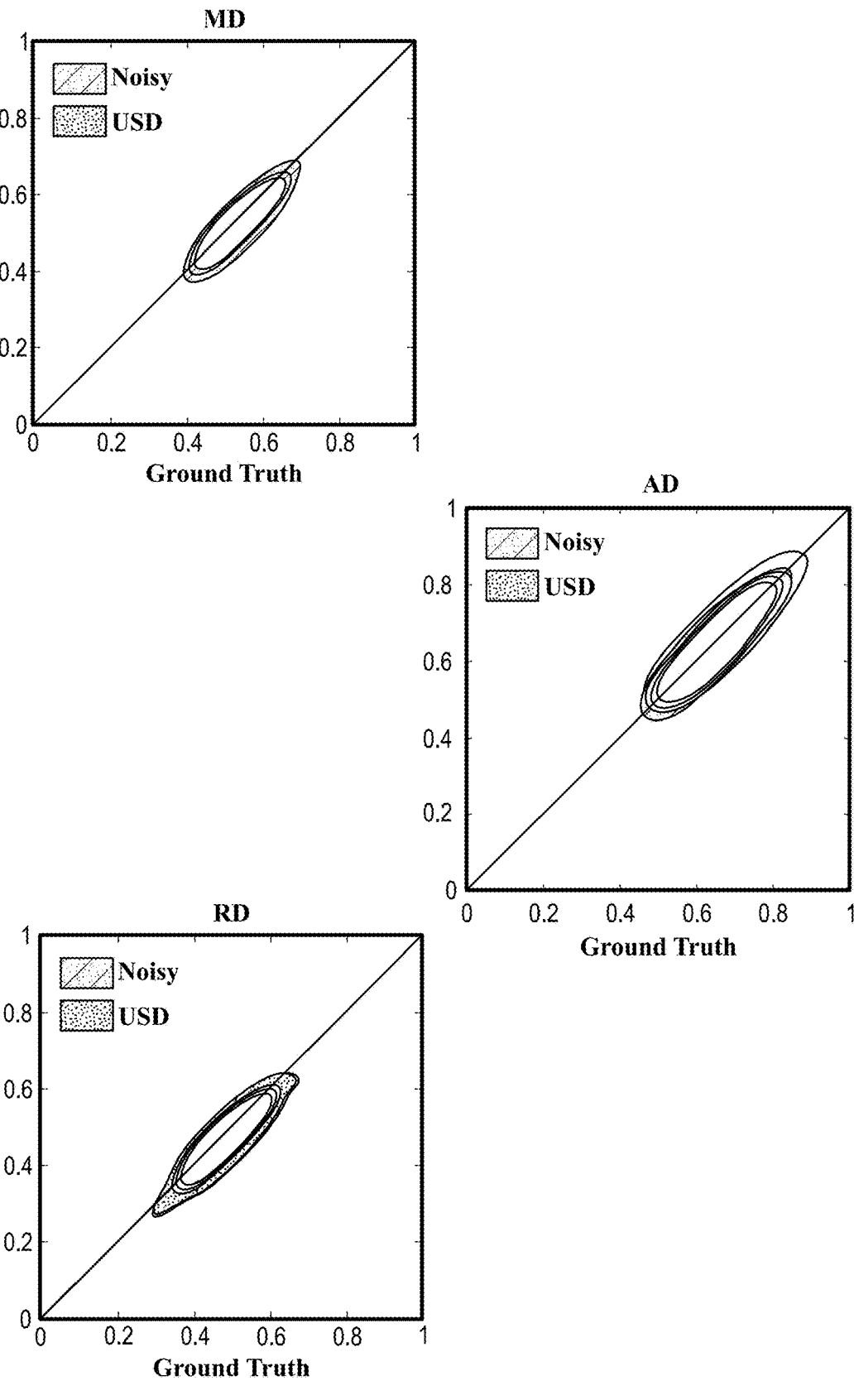
FIG. 8 is a set of exemplary graphs providing and exemplary effect of the USD denoising pipeline on diffusion and kurtosis tensor metrics (MD/AD/RD/FA and MK/AK/RK) and its signal-to-noise (SNR) gain/scaling in an ex vivo mouse brain according to an exemplary embodiment of the present disclosure.

FIG. 8 illustrates a set of exemplary graphs providing the exemplary effect of the USD denoising pipeline on diffusion and kurtosis tensor metrics (MD/AD/RD/FA and MK/AK/RK) and its SNR gain/scaling in an ex vivo mouse brain according to an exemplary embodiment of the present disclosure. In noisy data, the AD, FA, and AK are overestimated, and the RD and RK are underestimated. Denoising using USD corrected the bias, with the SNR gain≈2. The units of MD, AD, and RD are $\mu m^2$/ms.

In the ex vivo mouse brain data, the USD pipeline substantially reduced the noise (FIG. 4), especially in DWIs. The normalized residual maps had no anatomical structures in residuals of single images, nor in residuals averaged over multiple DWIs of each b-shell (see FIG. 5(A)). The noise maps before and after re-normalization were both smooth (see FIG. 5(B)), and the number of signal components in PCA domain was low at the central region (see FIG. 5(C)). The exemplary histogram of normalized image residuals showed that the noise removed by USD was normally distributed up to 4 standard deviations (see FIG. 5(D)), and its curve in the semi-log scale was below the reference line of slope−½, indicating that USD only removes the noise without corrupting signals. This was also supported by the absence of anatomical structure in the residual map.

Furthermore, USD improved, e.g., the precision in parametric maps of diffusion (see FIG. 6) and kurtosis tensors (see FIG. 7), such as colored FA, MK, AK, and RK maps. The slight decrease in structural details, compared with the ground truth (402 spokes per image), was potentially due to the sub-sampling in the noisy and USD-denoised data (201 spokes per image). In particular, the eigenvalue repulsion due to the noise fluctuation lead to the overestimated AD, FA, and AK and underestimated RD and RK in the noisy mouse brain data (FIG. 8). This effect has been demonstrated in simulations in, for example, Reference 37 and in FIG. 10, where the diffusion signal in white matter was simulated based on the Standard Model (see, e.g., references 38 and 39). These biases in diffusion and kurtosis metrics were corrected by the USD pipeline, and the SNR was increased by a factor of $\sqrt{M/P}\approx 2$ after denoising (see FIG. 8).

Figure 10:
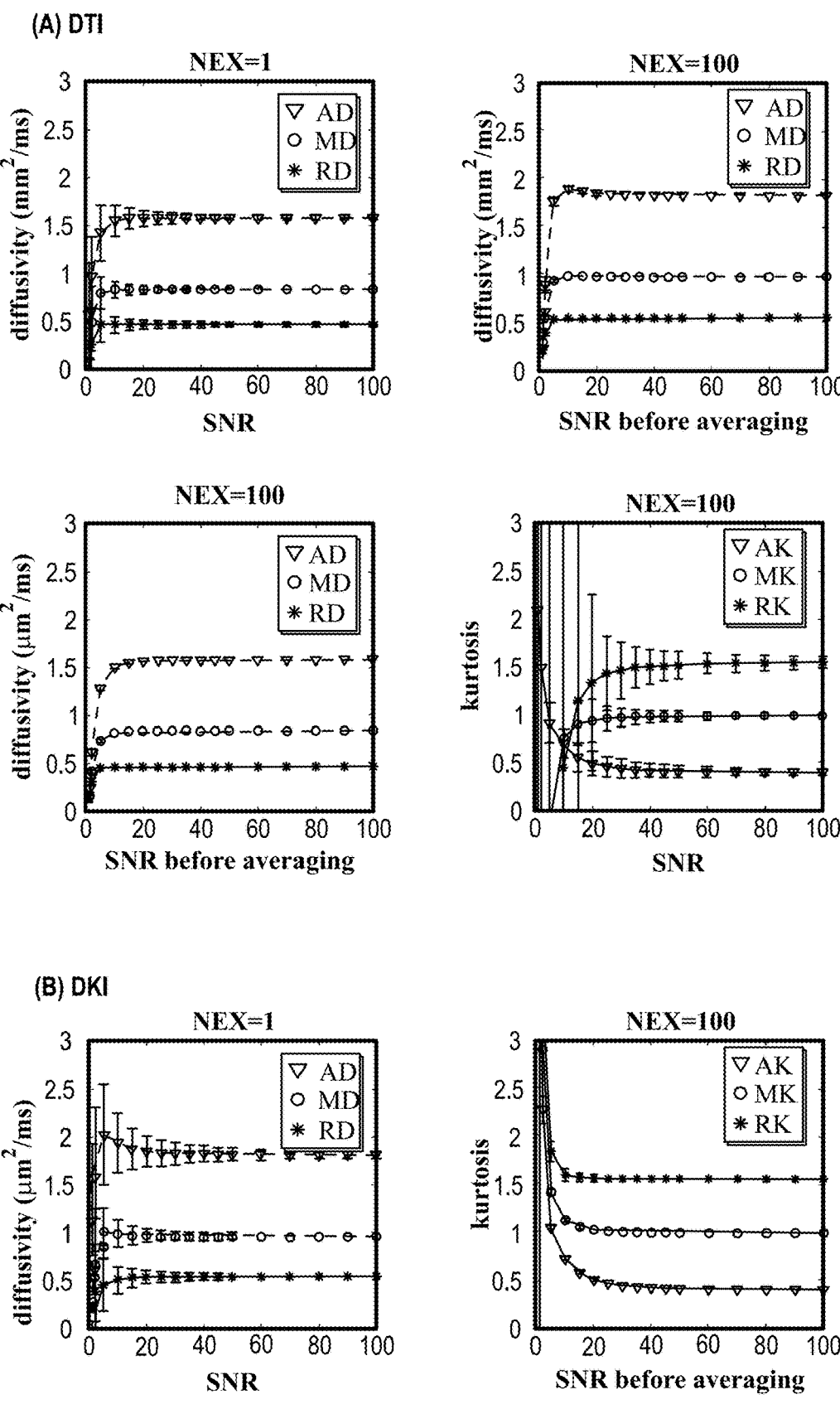
FIGS. 10(A) and 10(B) are exemplary graphs providing exemplary effects of Rician noise on the eigenvalue repulsion and diffusion metrics in white matter, according to an exemplary embodiment of the present disclosure.
Figure 11:
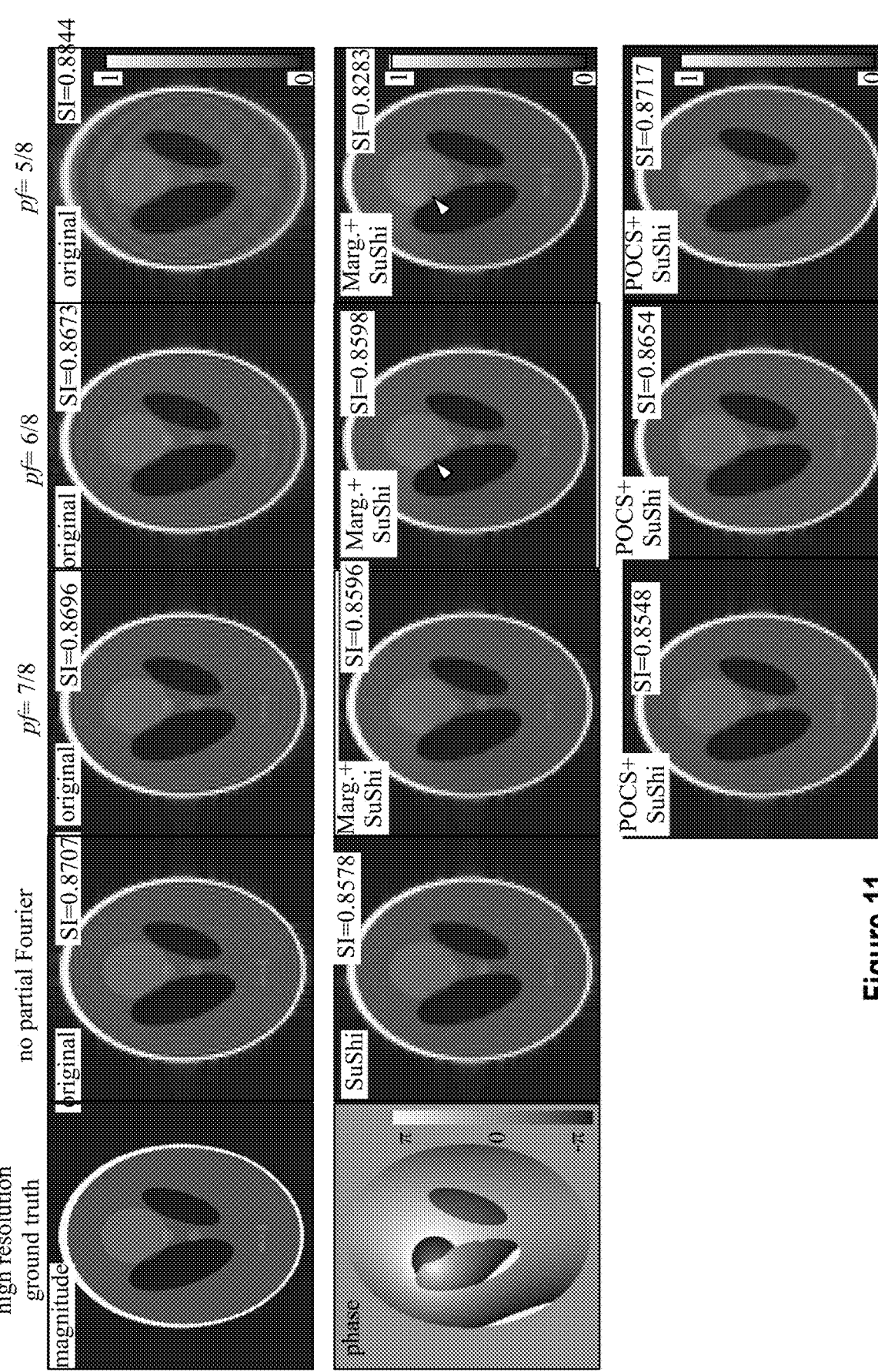
FIG. 11 is a set of exemplary illustrations of numerical simulations of Gibbs-ringing removal in 2-dimensional magnitude images of the Shepp-Logan phantom with the additional phase, according to an exemplary embodiment of the present disclosure.

FIG. 10 shows graphs illustrating the exemplary effect of Rician noise on the eigenvalue repulsion and diffusion metrics in white matter according to an exemplary embodiment of the present disclosure. Diffusion signals $$S = $$
$$\int d\xi\, P(\xi)\left[f \cdot e^{-bD_a\xi^2} + (1 - f - f_{CSF}) \cdot e^{-bD_e^{\perp} - b\left(D_e^{\parallel} - D_e^{\perp}\right)\xi^2}\right] + f_{CSF} \cdot e^{-bD_{CSF}}$$

were simulated based on the Standard Model of diffusion in white matter (see, e.g., reference 2) involving three compartments: intra-axonal space (stick), extra-axonal space (anisotropic Gaussian), and CSF/free water component (isotropic Gaussian), with parameters $D_\alpha$=2.5 $\mu m^2$/ms, $$D_e^{\parallel} = 2 \ \mu m^2/ms, \ D_e^{\perp} = 0.5 \ \mu m^2/ms,$$

$D_{CSF}$=3 $\mu m^2$/ms, f=50%, and $f_{CSF}$=5%. The fiber orientation distribution P was sampled in 200 directions, based on a Watson distribution of concentration parameter=5, corresponding to a spherical harmonic coefficient $p_2$=0.614 and a dispersion angle $\theta$=30.5°. The noisy data $S_n$ with Rician noise was simulated by adding the Gaussian noise ($\epsilon_r$ and $\epsilon_i$ for real and imaginary parts) to the noise-free signal S via $$S_n^2 = (S + \varepsilon_r)^2 + \epsilon_i^2.$$

The signal-to-noise ratio (SNR) was defined as S(b=0)/$\sigma_g$, where $$\sigma_g^2 = \left\langle \epsilon_r^2 \right\rangle = \left\langle \epsilon_i^2 \right\rangle.$$

To further explore the effect of Rician noise floor (the lower row), the magnitude of noisy data was averaged over 100 noise realizations (NEX=100) to reduce the noise fluctuation, while the Rician noise floor remained. The simulation was repeated 1000 times: the data point and error bar were the median and the standard deviation of the repeats. Panel (A): Diffusion tensor imaging (DTI) was fitted to the data of 2 b=0 signals and DW signals of b=1 ms/$\mu m^2$ in 30 directions by using weighted linear least square (WLLS). The eigenvalue repulsion in diffusivity was not observed (upper figure). In contrast, the Rician noise floor led to the diffusivity decrease at SNR<10 (lower figure). Panel (B): Diffusional kurtosis imaging (DKI) was fitted to the data of 2 b=0 signals and DW signals of b−[1,2] ms/$\mu m^2$ in [30, 60] directions by using WLLS. The eigenvalue repulsion in AD and RD was observed at SNR<20 (upper left), and the Rician noise floor led to the diffusivity decrease at SNR<10 (lower left). Furthermore, the eigenvalue repulsion in AK and RK was also observed at SNR<40 (upper right), and the Rician noise floor led to the kurtosis increase at SNR<30 (lower right).

Exemplary Results of in Vivo Human Data for the Exemplary USD Pipeline

Figure 9:
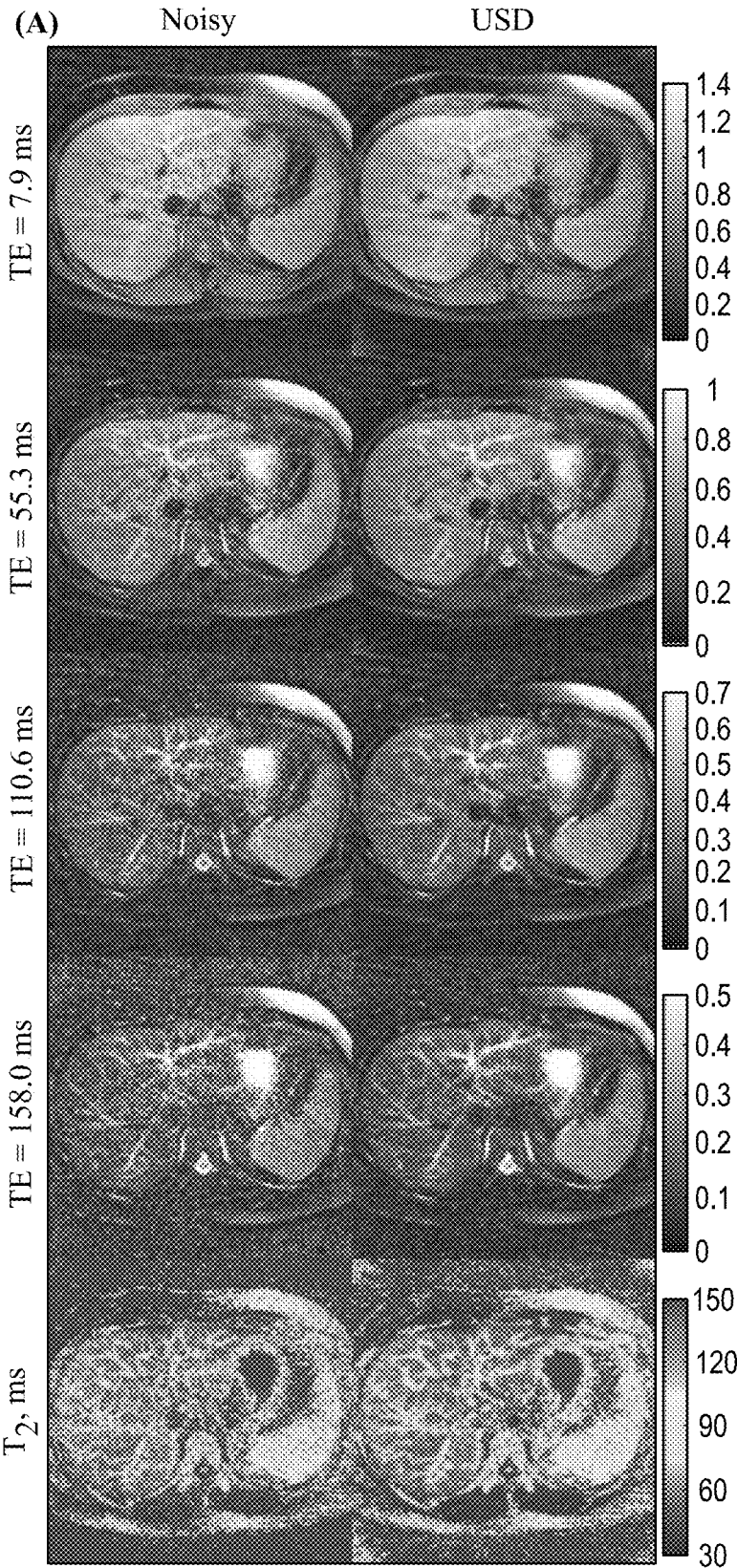
FIGS. 9(a)-9(c) are exemplary illustrations and an associated graph of USD pipeline reducing noise in human abdomen T2-weighted MRI data according to an exemplary embodiment of the present disclosure.

FIGS. 9(A)-9(C) providing exemplary illustrations and associated graph for the exemplary USD denoising pipeline on T2 MRI in an in vivo human abdomen (20 T2w images) according to an exemplary embodiment of the present disclosure. In particular, FIG. 9(A) shows exemplary illustrations of the noise in T2w images, and the fitted T2 map was reduced by USD. FIG. 9(B) provides illustration of exemplary noise maps before and after re-normalization, $\hat{\sigma}(x)$ and $\sigma(x)$, are both smooth. The number P(x) of signal components in PCA domain is low at central region. FIG. 9(C) shows the exemplary graph for the normalized image residual r in Equation 18 is roughly normally distributed and below the reference line of slope−½ in semi-log scale, indicating that the USD only removed the noise.

In human abdomen, the USD pipeline substantially reduced the noise in T2w images (see FIGS. 9(A) and 9(B)), especially in those of TE>50 ms. The noise maps were smooth, and the number of signal components was low at the central region. The histogram of normalized image residuals in the semi-log scale was below the line of slope−½, showing that USD only removed noise without corrupting signals. In particular, the $T_2$ value in liver was 67±15 ms in noisy data and 64±12 ms in denoised data. As a reference, the liver $T_2$ value at 0.55 T was 66±6 ms in previous human studies (see, e.g., reference 40).

Exemplary Discussion of the Results of the Exemplary USD Pipeline

In the exemplary systems, methods and computer-accessible medium according to an exemplary embodiment of the present disclosure, a universal denoising pipeline applicable to any k-space sampling trajectories can be provided. Furthermore, it is demonstrated that the noise with correlation between voxels due to NUFFT for non-Cartesian MRI can be removed in a numerical phantom, in dMRI data of an ex vivo mouse brain, and in T2 relaxation data of an in vivo human abdomen. The noise in images and parametric maps is largely reduced, the noise maps and residual maps have no anatomical structures, and the residual histogram is roughly i.i.d. Gaussian, all indicating that the USD pipeline only removes the noise without corrupting signals.

While above examples describe linear reconstruction of non-Cartesian MRI, such as the NUFFT in Equation 4, USD can be generalized to nonlinear transformations. For example, the USD pipeline can be adapted into a two-step approach. First, e.g., non-Cartesian k-space can be reconstructed and denoised by using linear transformation and USD. Second, e.g., the k-space data of denoised images can be re-sampled into the original non-Cartesian k-space trajectory, and further reconstructed by using a nonlinear transformation. This two-step approach potentially can extend the applicability of USD to many other pipelines, such as Cartesian or non-Cartesian MRI that is highly accelerated in spatial (see, e.g., references 41; 42) and temporal domains (see, e.g., reference 43), where the challenge is that the noise correlation in coil and temporal dimensions will further increase the size of the noise covariance matrix $\Psi$ substantially. To reduce the computational load, it is possible to denoise such data by only accounting for the noise variation in all dimensions without considering the noise correlation, i.e., setting off-diagonal elements in $\Psi$ as zero. Moreover, the noise mapping given by USD could also benefit from deep-learning-based image reconstruction and processing by providing an reliable estimate of regularization factors.

In addition to MRI, USD is applicable to imaging modalities sampled in the projection space, such as PET, CT, and SPECT. With the proper treatment of Poisson noise in counting photons, and/or Poisson-Gaussian noise statistics, it is possible to generalize the USD as a universal denoising algorithm for many other medical imaging techniques, wherein USD provides noise decorrelation before application of RMT-based denoising methods, for example.

Equation 4 can be generalized to exemplify any linear transformation of an acquired image $I_\alpha(p_j)$ from the at least one detector a in some space $p=(p_j)$ convenient for acquisition, such as, but not limited to, the projection space:

$$I_\alpha(x_i) + \varepsilon_\alpha(x_i) = \sum_j w_{ij} \cdot [I_\alpha(p_j) + \varepsilon_\alpha(p_j)],$$

where the reconstruction weights $W=(w_{ij})$ from the acquisition coordinates $p_j$ to the image coordinates $x_i$ can be assumed known. The acquisition coordinates can be, for example, the position in the projection space of PET, CT or SPECT. The detector noise can be made uncorrelated by measuring the detector noise covariance matrix (analogous to $\Psi_{coil}$) and using the procedure of Equations 1-3. Thus, without the loss of generality, it can be assumed that the detector noise is uncorrelated. Further, if the noise $\varepsilon_\alpha(p_j)$ in the acquisition-space is uncorrelated, $$\langle \varepsilon_\alpha(p_i)\varepsilon_\beta^*(p_j) \rangle = \sigma_0^2 \delta_{\alpha\beta} \delta_{ij},$$

then, similarly to Equation 5, the noise in the image space will be correlated as $$\langle \varepsilon_\alpha(x_i)\varepsilon_\beta^*(x_j) \rangle = \sigma_0^2 \delta_{\alpha\beta} \Psi_{ij} \text{ with } \Psi = WW^M.$$

The transformation analogous to Equation 6, $$\tilde{I}_\alpha(x_i) + \tilde{\varepsilon}_\alpha(x_i) = \sum_j (\Psi^{-1/2})_{ij} \cdot [I_\alpha(p_j) + \varepsilon_\alpha(p_j)],$$

can render the noise in the "tilde" basis as i.i.d. Gaussian.

$$\langle \tilde{\varepsilon}_\alpha(x_i)\tilde{\varepsilon}_\beta^*(x_j) \rangle = \sigma_0^2 \cdot \delta_{\alpha\beta} \cdot \delta_{ij}.$$

In this basis, the denoising procedure, such as, but not limited to RMT-based denoising (e.g., the MPPCA algorithm) can be applied. The denoised detector images $\hat{I}_\alpha(x)$ can be further re-normalized via the procedure similar to Equation 8, to recover their original contrast:

$$I_\alpha(x_i) = \frac{1}{c(x_i)} \sum_j \Psi_{ij}^{-1/2} \hat{I}_\alpha(x_j),$$

where $c(x)$ is the de-apodization function. The detector images then can be combined in a standard way.

If the above acquisition-space noise $\varepsilon_\alpha(p_j)$ is correlated.

$$\langle \varepsilon_\alpha(p_i)\varepsilon_\beta^*(p_j) \rangle = \sigma_0^2 \delta_{\alpha\beta} P_{ij},$$

its covariance matrix P can be first estimated, and used to decorrelate the noise:

$$\tilde{I}_\alpha(q_i) + \tilde{\varepsilon}_\alpha(q_i) = \sum_j (P^{-1/2})_{ij} \cdot [I_\alpha(p_j) + \varepsilon_\alpha(p_j)],$$

where the noise in the "tilde" space is i.i.d. Gaussian. The above "tilde" space $q=(q_i)$ in general is not necessarily a reconstructed image space, but can be some other space, that can be different from both p and x spaces. In this third (intermediate) space, the denoising procedure, such as, but not limited to RMT-based denoising (e.g., the MPPCA algorithm) can be applied. The denoised detector images $\hat{I}_\alpha(q_i)$ can be further re-normalized via the procedure similar to Equation 8, to recover their original contrast:

$$I_\alpha(p_i) = \frac{1}{c(p_i)} \sum_j \Psi_{ij}^{-1/2} \hat{I}_\alpha(q_i),$$

where $c(p)$ is the de-apodization function. The detector images then can be combined and reconstructed to determine the final denoised image $I(x_i)$.

The noise covariance matrices such as $\Psi$ and P can be estimated by propagating the noise through the reconstruction procedure, if the weights $w_{ij}$ are not explicitly known. For example, the noise can be numerically generated according to known statistical properties, added to the ground truth image and propagated through the reconstruction pipeline to estimate matrices such as W, $\Psi$ and P. Noise covariance matrices can depend on the image intensity. Therefore, they can be estimated in an iterative procedure, where first the approximate image intensity is reconstructed without the denoising procedure, then this image intensity (which can be, for example, also smoothed to reduce random fluctuations) can be used for estimating the noise covariance matrices, and then these updated noise covariance matrices can be further used to decorrelate the noise and to denoise the images. Such exemplary procedure of improving the estimate of covariance matrices and denoising can be repeated iteratively, until convergence.

In the projection space of PET, CT or SPECT, image reconstruction can be a linear transformation $$I(x_i) + \varepsilon(x_i) = \sum_j w_{ij} \cdot [I(p_j) + \varepsilon(p_j)]$$

where $p_j$ are the coordinates of the detectors, and the linear transformation $W=(w_{ij})$ are related to the Funk-Radon transform or filtered back-projection. The noise in the image space can be Poissonian, such that $$\langle \varepsilon(x_i) + \varepsilon(x_i) \rangle = \sigma_0^2 \delta_{ij} I(x_i),$$

i.e., the noise variance is proportional to the image intensity at a given point. Thus, the RMT-based denoising procedure can be performed in the reconstructed image space, by normalizing the reconstructed image as $\tilde{I}(x)=I(x)/\sigma(x)$ where $\sigma(x) \propto \sqrt{\tilde{I}(x)}$, such that noise in the "tilde" space can be considered i.i.d. Gaussian. Here $\tilde{I}(x)$ is the estimate of image intensity that can utilize, for example, the smoothed reconstructed image $I(x)$, or the denoised image at a previous iteration. In particular, one can create an iterative procedure, in which:

given the estimated image $\tilde{I_n}(x)$ at iteration number n;
use original noisy signal $I(p_j)$ to reconstruct the image $I(x)$ based on, for example, the Funk-Radon transform or filtered back-projection;
create a noise-decorrelated image $\tilde{I_n}(x)$ such that the noise statistics in this image is approximately i.i.d. Gaussian, for example, $\tilde{I_n}(x)=I(x)/\sigma(x)$ where $\sigma(x)=\sqrt{\tilde{I_n}(x)}$. To reduce the effect of noise propagation into this noise decorrelation step, the decorrelation weight $\sigma(x)$ may be additionally smoothed.
Denoise the at least one noise-decorrelated image $\tilde{I_n}(x)$ based on, for example, RMT-based methods, such as MPPCA, for instance, relying on the redundancy of the series of images $\tilde{I_n}(x; t)$ iteratively processed in the similar way. Such image series $\tilde{I_n}(x; t)$ can correspond to multiple acquisitions t (e.g., a time series $I(x, t)$, exemplifying, for instance, the passage of a bolus of contrast in CT or SPECT or PET).
Obtain the improved estimation of an image by unwinding the noise decorrelation procedure, such as, for example, $\tilde{I_{n+1}}(x)=[\text{denoised } \tilde{I_n}(x)]^2$, or more generally, $\tilde{I_{n+1}}(x)=[\text{denoised } \tilde{I_n}(x)] \cdot \sigma(x)$ with $\sigma(x)$ from the previous step. This procedure can be applied to each image in a series to obtain the at least one image $\tilde{I_{n+1}}(x; t)$ in a series.
Repeat until the desired convergence.
For the initial iteration (n=1), a suitably smoothed version of the reconstructed image $I(x)$ can be utilized.

Exemplary Conclusions and Outlook for USD Pipeline

The exemplary USD pipeline successfully estimates, among others, the noise level and reduces the noise in non-Cartesian acquired data in a numerical phantom, dMRI data of an ex vivo mouse brain, and T2 relaxation data of in vivo human abdomen. Though tested only in 2-dimensional radially sampled MRI the USD pipeline may also apply to noise removal of MRI, CT, and PET data acquired in any 2- or 3-dimensional k-space/projection-space sampling scheme, as long as, for example, sufficient data redundancy is presented. The USD pipeline can be either applied before the image reconstruction or incorporated as part of it, facilitating the data under-sampling and fast imaging in future study.

Exemplary Discussion of the RPG (Removal Partial-Fourier Gibbs) Pipeline

To facilitate the understanding of the Gibbs ringing patterns due to the Partial Fourier (PF) acquisition and zero filling, exemplary embodiments of the present disclosure can be provided utilizing the point spread function (PSF), i.e., oscillating convolution kernel in image space, caused by the asymmetric k-space truncation. For PF acquisition of factor pf, the k-space data can be asymmetrically truncated at cutoffs $k=-vK_{max}$ and $+K_{max}$ (FIG. 12a), where $$v = 2pf - 1 < 1, \frac{1}{2} < pf < 1.$$

The Fourier transform of this k-space modulation can yield a PSF $P_v(x)$ accounting for the Gibbs-ringing patterns in image space. By definition, $P_v(x)$ is a result of the cutoffs in the delta-function at x=0:

$$P_v(x) \equiv \int_{-vK_{max}}^{K_{max}} \frac{dk}{2\pi} e^{ikx} = \frac{2}{2\pi i x} \left( e^{iK_{max}x} - e^{-ivK_{max}x} \right). \tag{19}$$

This function has sinusoidal oscillations at both cutoffs, with periods $2\pi/K_{max}$ and $2\pi/vK_{max}$. Given that the voxel size $$\Delta x = \frac{\pi}{K_{max}} \tag{20}$$

is half the smallest period, ringing patterns are shown to correspond to intervals $$x_r = \Delta x \tag{21}$$

and $$x_v = \frac{\Delta x}{v} = \frac{\Delta x}{2pf - 1} > \Delta x. \tag{22}$$

For example, the interval of a ringing pattern can be defined as the distance of peak-to-valley or valley-to-peak along x- and/or y-directions in the magnitude image, such that the distance from the central peak to the first zero of the convolution kernel (sine function) is the same as the interval of the ringing pattern.

The real part of the PSF in Equation 19 is an even function and it is nonzero at x=0. In contrast, the imaginary part of the PSF is an odd function and it is equal to zero at x=0. In other words, for the most part, the ringings patterns arise by the convolution with PSF's real part, $$ReP_v(x) = \frac{1}{2\Delta x}\left[\text{sinc}\left(\frac{x}{x_r}\right) + v \cdot \text{sinc}\left(\frac{x}{x_v}\right)\right], \qquad (23)$$

where $\text{sinc}(x) \equiv \sin x / x$. The first ringing pattern of interval $x_r$ is exactly the same as the ordinary Gibbs-ringing of fully sampled data (with half the amplitude), and the second ringing pattern has an interval $x_v$ wider than the first one. The first ringing pattern arises as the result of the ordinary rectangular modulation at $k=+K_{max}$ (denoted by "r"), and the second ringing pattern is the consequence of the asymmetric truncation at $k=-vK_{max}$ (denoted by "v"). Here, $x_v$ can be listed for commonly used under-sampling factors:

$$x_v = \begin{cases} \frac{4}{3}\Delta x, & pf = 7/8; \\ 2\Delta x, & pf = 6/8; \\ 4\Delta x, & pf = 5/8. \end{cases} \qquad (24)$$

PSF's real part in Equation 23 is the superposition of two sine functions, indicating that the two ringing patterns can be independently removed by applying conventional algorithms twice. However, PSF's imaginary part is negligible only when the image phase map (the ideal one without k-space truncation) smoothly varies over the image space in a length scale much longer than ringing intervals. This is empirically true for pf=⅞ and ⁶/₈, whose ringing intervals are relatively short. However, for pf=⅝, the wide ringing interval $x_v=4\Delta x$ potentially breaks this assumption in experimental data.

Most procedures correcting Gibbs-ringing artifacts may focus only on the oscillations of interval $x_r$ in Equation 21 (blue curves in FIG. 12b), while oscillations of interval $x_v$ in Equation 24 (red curves in FIG. 12b) have been considered as anatomical structures and left untreated.

Exemplary Methods for RPG Gibbs Removal

The exemplary system, method and computer arrangement according to the exemplary embodiment of the present disclosure can recognize and remove the two distinct ringing patterns, with intervals $x_r$ and $x_v$, by, e.g., employing the conventional method twice. The identification and removal of the $x_v$ pattern can be done, e.g., by resampling the image in such a way that the problem gets reduced to removing the conventional pattern $x_r$ in the resampled image. In this exemplary embodiment, the PF-specific Gibbs pattern (with interval $x_v$) can be removed both in 1-dimensional (1D) and in 2D magnitude images.

Since the local subvoxel-shifts method (see, e.g., Kellner et al., 2016) is employed for the conventional Gibbs pattern, the present disclosure describes the idea behind it, then describes an exemplary RPG pipeline for non-conventional Gibbs patterns (to which the method of Kellner et al., 2016 is not directly applicable), and finally validates it on numerical phantoms and on in vivo dMRI data of a human brain.

Exemplary Local Subvoxel-Shifts

The idea of local subvoxel-shifts method for the ringing removal of fully sampled data has been considered (see, e.g., Kellner et al., 2016). The k-space modulation in fully sampled data is symmetrically truncated at $k=\pm K_{max}$, leading to a convolution kernel of a sinc function of ringing interval $\Delta x$ in image space. The prior knowledge of the shape of this specific ringing pattern, under the assumption of no oscillation in a "perfect" image, allows one to identify the position of the boundary to a subvoxel precision, analogous to the idea of super-resolution. After shifting the image by a subvoxel amount through Fourier interpolation, the optimal shift t for each voxel can be individually determined by minimizing the local signal oscillation (e.g., TV) around the voxel. Based on the optimal subvoxel-shift and its subsequent signal with locally minimized oscillations, the signal at the original position can be linearly re-interpolated to the grid before shifting Since, according to Equation 22, the PF and regular ringing patterns due to a given tissue boundary interfere additively, the local subvoxel-shifts ($t_r$, $t_v$) may not be independent, and can be proportional to the corresponding ringing intervals ($x_r$, $x_v$), such that $$\frac{t_v}{t_r} = \frac{x_v}{x_r} = \frac{1}{2pf - 1}. \qquad (25)$$

Figure 21:
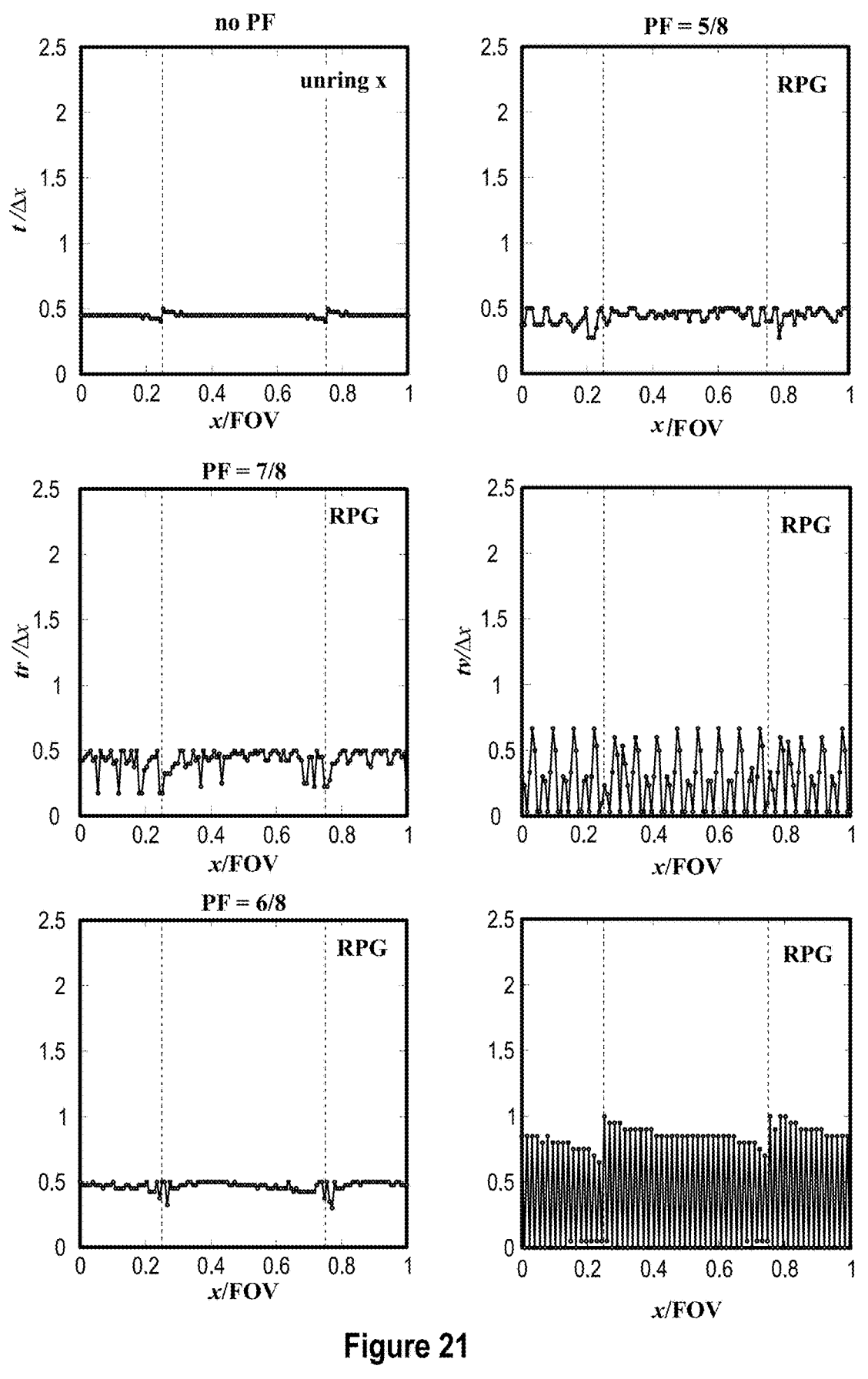

As shown in simulations (see FIG. 21), the shift ratio $t_v/t_r$, for the case when the shift is nonzero, generally can abide by Equation 25. The shifts widely fluctuate between voxels, such that for some there is no shift at all, but when the shift is actually needed, the above ratio holds to a reasonable numerical accuracy. Given the known PSF shape, it is possible to provide a procedure to self-consistently determine both shifts for both ringing patterns simultaneously. Practically, however, it may be difficult to use Equation 25 to regularize and optimize both local shifts in ringing removal pipeline at the same time, due to image phase and noise in actual data. Thus, as described below, the two kinds of ringing may be removed independently from each other. One of the benefits of the exemplary systems, methods and computer arrangement according to the exemplary embodiments of the present disclosure can be in the decoupling of the RPG pipeline from a particular conventional Gibbs pattern removal algorithm.

Exemplary Removal of Partial Fourier-Induced Gibbs-Ringing (RPG)

The RPG pipeline can include of two exemplary procedures: first the ringing of interval $x_v$ given by Equation 24 can be removed, and then the ringing of interval $x_r$ given by Equation 21 can be removed.

Exemplary 1D Case

The 1D case of ringing removal can be relatively simple. Given that the I-dimensional (1D) image ($N_x-1$ array) is obtained by using PF acquisition and zero filling in k-space, the 1D RPG pipeline for pf=⅞, ⁶/₈, and ⅝ can be as follows:

For pf=⅞, the ringing of interval $$x_v = \frac{4}{3}\Delta x$$

is removed in Equation 24. To do so, the nearest neighbor can be used to up-sample the 1D image by 3 fold ($3N_x \times 1$ array) and divide it into 4 smaller sub-images (taking one array element for every 4 elements, i.e., (4n+i)th element, $$n = 0, 1, 2, \ldots, \left\lfloor \frac{3N_x}{4} \right\rfloor,$$

and i=1,2,3,4 for each sub-image), where the ringing interval becomes $x_v'=\Delta x$. Then the ordinary local subvoxel-shifts method can be applied in the 4 sub-images respectively to remove ringings of interval $x_v'$. After combining the corrected sub-images together and use nearest neighbor to down-sample the combined image by 3 fold ($N_x \times 1$ array), again the local subvoxel-shifts method can be used to remove the remaining ringing of interval $x_r = \Delta x$.

For pf=⅚, first the ringing of interval $x_v = 2\Delta x$ in Equation 24 can be targeted; the 1D image can be divided into 2 smaller sub-images (taking the odd and even elements respectively), where the ringing interval becomes $x_v' = \Delta x$. Then the local subvoxel-shifts method can be applied in the 2 sub-images respectively to remove ringings of interval $x_v'$. After combining the corrected sub-images together, again the local subvoxel-shifts method can be used to remove the remaining ringing of interval $x_r = \Delta x$.

For pf=⅝, first the ringing of interval $x_v = 4\Delta x$ in Equation 24 can be focused on; the 1D image can be divided into 4 smaller sub-images (taking one element for every 4 elements, i.e., (4n+i)th element, $$ n = 0, 1, 2, \ldots , \left\lfloor \frac{N_x}{4} \right\rfloor , $$

and i=1,2,3,4 tor each sub-image), where the ringing interval becomes $x_v' = \Delta x$. Then the local subvoxel-shifts method can be applied to the 4 sub-images respectively to remove ringings of interval $x_v'$. After combining the corrected sub-images together, again the local subvoxel-shifts method can be applied to remove the remaining ringing of interval $x_r = \Delta x$.

Using ideas similar to those in Kellner et al., 2016, the above 1D pipeline can be generalized to 2D magnitude images.

Exemplary 2D Case

As discussed by Kellner et al., 2016, generalizing the procedure to the 2-dimensional (2D) case by applying 2D-shift may not remove ringings of checkerboard-like pattern caused by diagonal edges in images. For the fully acquired data, instead, Kellner et al. introduced the "weighting" filter functions with a saddle-like structure in Fourier domain (see, e.g., Kellner et al., 2016);

$$ G_x = \frac{1 + \cos k_y}{(1 + \cos k_y) + (1 + \cos k_x)}, \qquad (26) $$

$$ G_y = \frac{1 + \cos k_x}{(1 + \cos k_y) + (1 + \cos k_x)}, $$

where $G_x + G_y = 1$ for any ($k_x$, $k_y$), and $\Delta x = \Delta y = 1$ for simplicity. After applying the filter $G_x$ to the original image I, the ringing is suppressed in y direction and enhanced in x direction in the filtered image $I_x$, and vice versa for the $G_y$ and $I_y$ (see, e.g., Kellner et al., 2016):

$$ I_x = FT^{-1}\{FT\{I\} \cdot G_x\}, \qquad (27) $$

$$ I_y = FT^{-1}\{FT\{I\} \cdot G_y\}, $$

where FT{•} is the Fourier transform. Removing ringings in $I_x$ using local subvoxel-shifts along x-direction (denoted as "unring x") can result in a corrected image $J_x$. Similarly, applying local subvoxel-shifts along y-direction ("unring y") to the $I_y$ can lead to a corrected image $J_y$. Their sum can yield the final corrected image $J = J_x + J_y$, which is well-normalized due to $G_x + G_y = 1$. Unring x and unring y may not include the filter smoothing, but only the local subvoxel-shifts searching of ringing removal. For simplicity, the above local bvoxel-fts pipeline can be denoted for 2D fully sampled data as "SuShi" (see, e.g., FIG. 3 in Kellner et al., 2016).

Figure 13:
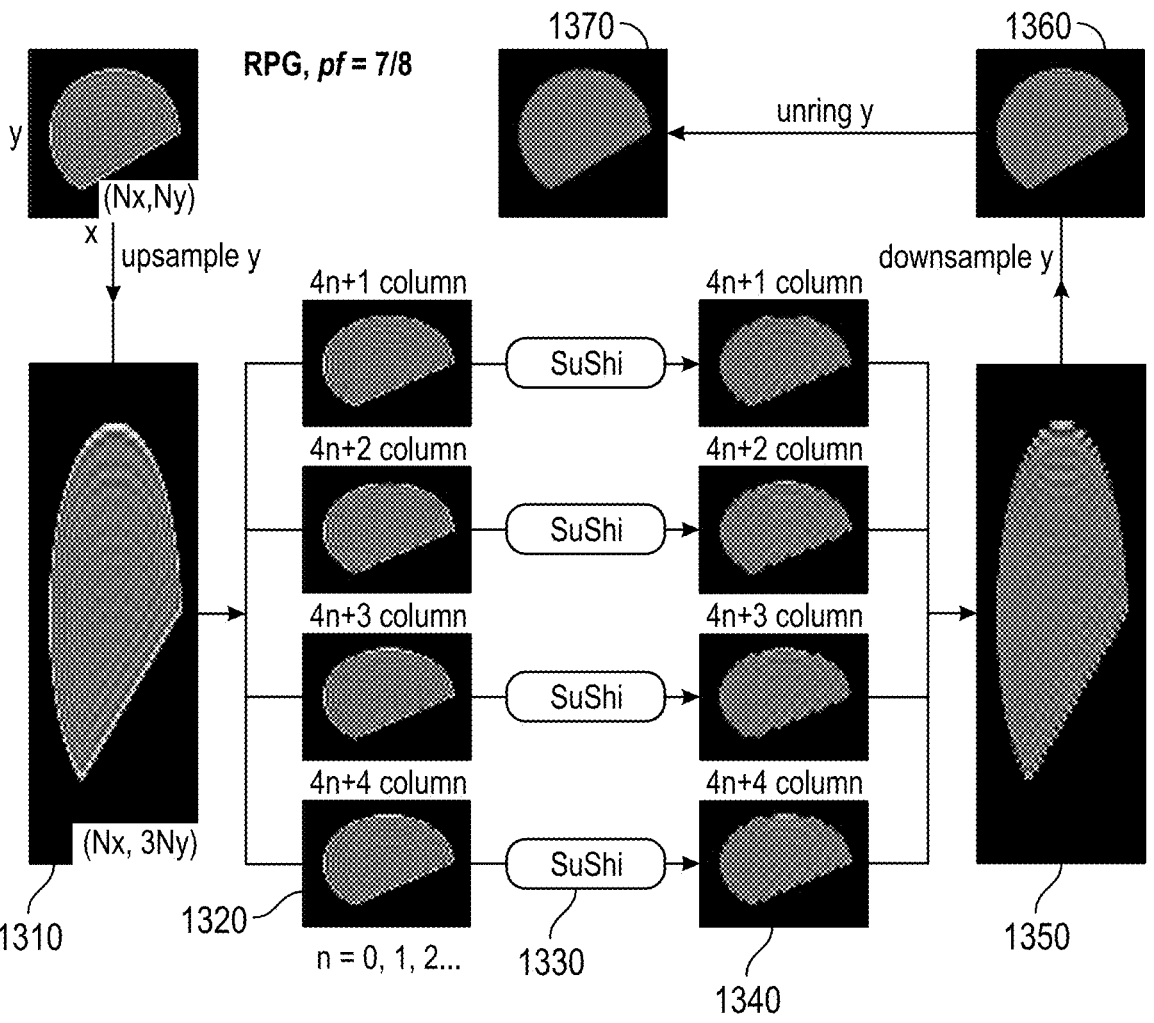
FIG. 13 is a diagram of a procedure illustrating an exemplary removal of PF-induced Gibbs-ringing (RPG) in 2D images with pf=⅞, according to an exemplary embodiment of the present disclosure.

For PF acquired 2D magnitude images, it can be assumed that k-space data is asymmetrically sampled in $k_y$-direction, and thus the ringing induced by PF acquisition and zero filling is in y-direction in the images. The original image is a $N_x \times N_y$ matrix, with a voxel size of ($\Delta x$, $\Delta y$) in x- and y-directions. In this exemplary procedure, it can be focused on the removal of three ringing patterns, including ringings of intervals $x_r = \Delta x$ and $y_r = \Delta y$ in x- and y-directions, and of interval $y_v$ in Equation 24 in y-direction. In exemplary systems, methods and computer arrangement according to the exemplary embodiments of the present disclosure, the 2D) RPG pipeline is described as follows (see FIGS. 13, 14 and 24).

In particular, for pf=⅞ (see FIG. 13, and Table S1 herein), the ringings of interval $x_r = \Delta x$ in x-direction and of interval $$ y_v = \frac{4}{3}\Delta y $$

in y-direction can be removed. To do so, the nearest neighbor can be used to up-sample the 2D image by 3 fold in y-direction ($N_x \times 3N_y$ matrix) as provided in procedure 1310 of FIG. 13, and divide it into 4 smaller sub-images (taking one column for every 4 columns, i.e., (4n+i)th column, $$ n = 0, 1, 2, \ldots , \left\lfloor \frac{3N_y}{4} \right\rfloor , $$

and i=1,2,3,4 for each sub-image) as provided in procedure 1320, where the ringing interval in y-direction becomes $y_v' = \Delta y$, and the ringing interval $x_r = \Delta x$ in x-direction is kept unchanged. Then, the original SuShi method in the 4 sub-images can be applied respectively to remove the ringings of interval $x_r$ in x-direction and of interval $y_v'$ in y-direction as provided in procedures 1330 and 1340. After combining the corrected sub-images together and using nearest neighbor to down-sample as provided in procedure 1350, the combined image by 3-fold in y-direction ($N_x \times N_y$ matrix) as provided in procedure 1360, it is possible to utilize the 1D local sub-voxel-shifts in y-direction (unring y) to remove the remaining ringing of interval $y_r = \Delta y$ in y-direction as provided in procedure 1370.

Figure 22:
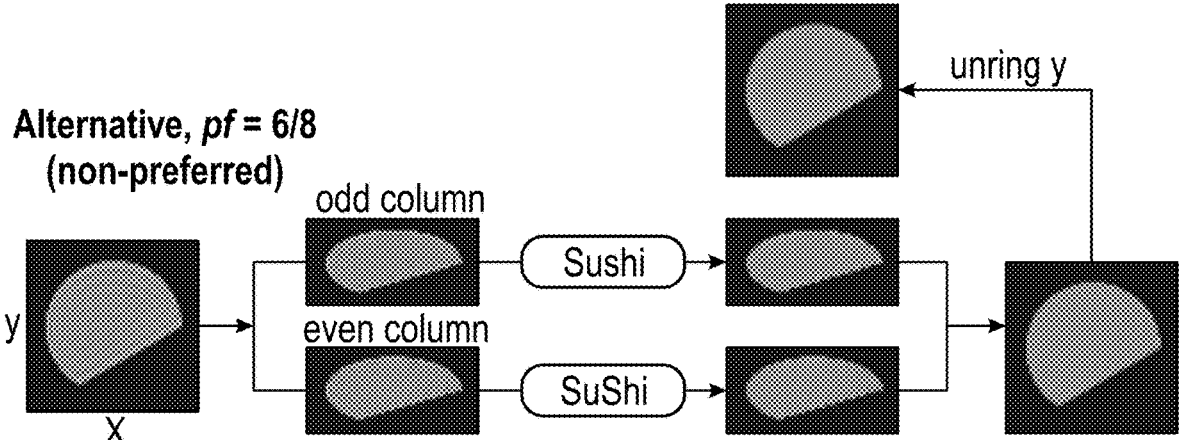
FIG. 22 is a diagram of a procedure for removal of PF-induced Gibbs-ringing (RPG) in 2-dimensional images with pf=⅝, according to another exemplary embodiment of the present disclosure.
Figure 23:
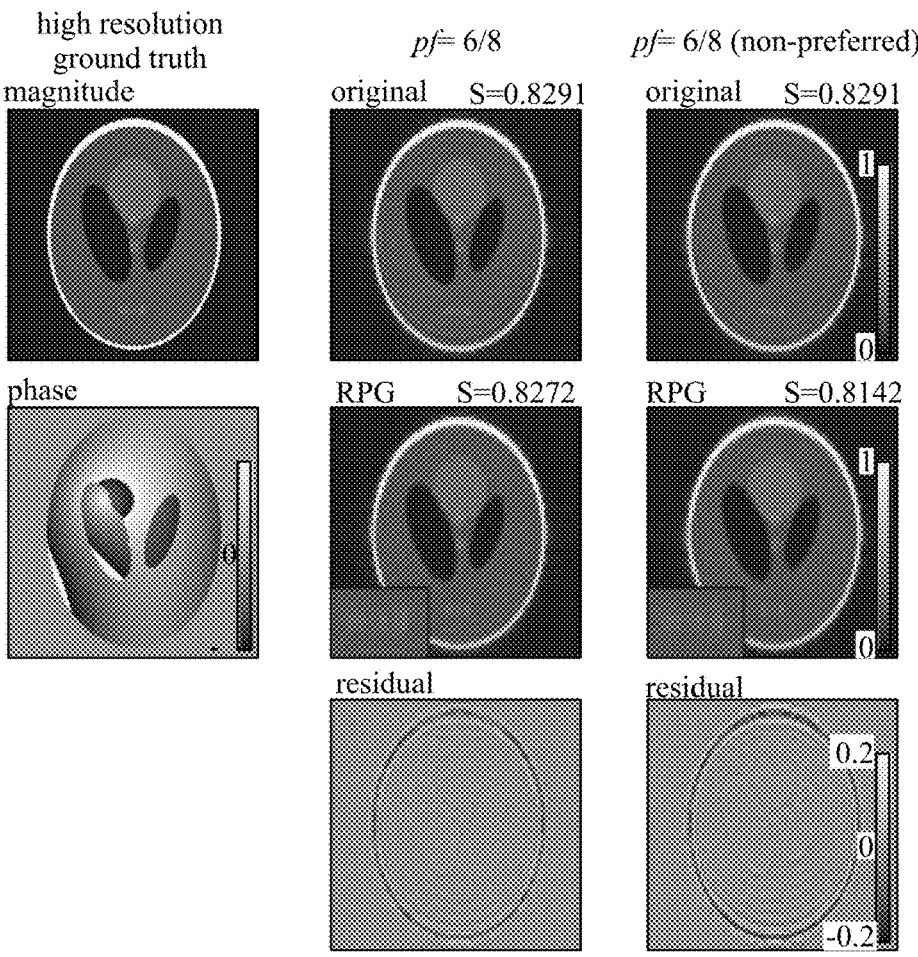
FIG. 23 is a set of exemplary illustrations of the exemplary numerical simulations of Gibbs-ringing removal in 2-dimensional magnitude signals of the Shepp-Logan phantom with the additional phase and pf=⅝, according to an exemplary embodiment of the present disclosure.

For pf=⅚, it makes sense to remove Gibbs-ringing similarly to the case of pf=⅞, i.e., by dividing the 2D image into 2 smaller sub-images (consisting of odd and even columns respectively) and applying SuShi to the two sub-images to remove ringings of intervals $y_v' = \Delta y$ and $x_r = \Delta x$, and then combining the two sub-images and applying the 1D local sub-voxel shifts (unring y) to remove the remaining ringing of interval $y_r = \Delta y$. This approach can introduce excessive image blurring; it can be dubbed as an alternative approach and detailed in FIGS. 22 and 23. Instead, it turns out that image blurring and performance of ringing removal are best balanced by first applying the weighting filters ($G_x$, $G_y$) and only then searching for local subvoxel-shifts. This can be the primary pipeline for pf=⅚ (see FIG. 14, Table S2 provided herein).

For example, the weighting filter functions $G_v$ and $G_y$ in Equation 26 can be applied to the original image I, resulting in filtered images $I_x$ and $I_y$ in Equation 27. On the one hand, for $I_y$, the ringing of interval $x_r=\Delta x$ in x-direction can be suppressed by $G_y$, and the ringing of interval $y_r=\Delta y$ in y-direction is subsequently removed by using 1D local subvoxel-shifts (unring y), yielding an intermediate image $J_y$. To remove the ringing of interval $y_v=2\Delta y$ in y-direction, the $J_y$ can be divided into two sub-images by taking the odd and even columns respectively, and apply 1D local subvoxel-shifts (unring y) to each of them. Combining the two corrected sub-images, the first corrected image $\tilde{J}_y$ can be obtained. On the other hand, for $I_x$, the ringing of interval $y_r=\Delta y$ in y-direction is suppressed by $G_x$, and the ringing of interval $x_r=\Delta x$ in x-direction is subsequently removed by using 1D local subvoxel-shifts (unring x), leading to the second corrected image $J_x$. Particularly, in $J_x$, the ringing of interval $y_v=2\Delta y$ is left untouched because it is difficult to define a filter to simultaneously suppress the ringings of intervals $y_r=\Delta y$ and $y_v=2\Delta y$ in y-direction. Finally, the sum of the two corrected images yields the final output $J=\tilde{J}_y+J_x$.

Figure 24:
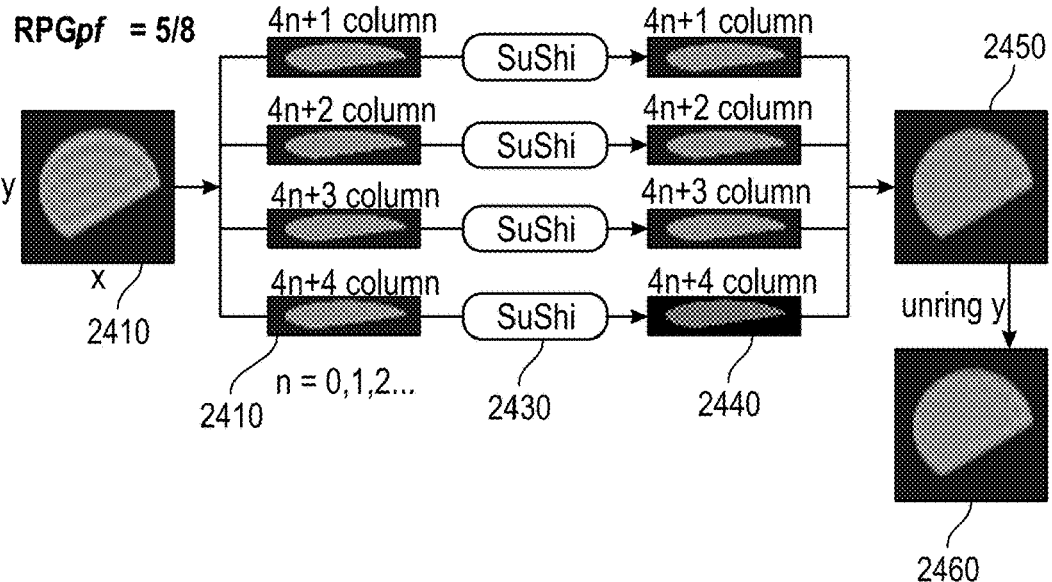
FIG. 24 is a diagraph of an exemplary procedure for removing Gibbs-ringing in 2-dimensional images using RPG, pf=⅝, according to an exemplary embodiment of the present disclosure.

For pf=⅝ (see FIG. 24. Table S3 provided herein), first the ringings of interval $x_r=\Delta x$ in x-direction and of interval $y_v=4\Delta y$ in y-direction are removed in procedure 2410. Dividing the original image into 4 sub-images (taking one column for every 4 columns, i.e., (4n+i)th column, $$n = 0, 1, 2, \ldots , \left\lfloor \frac{N_y}{4} \right\rfloor,$$

and i=1,2,3,4 for each sub-image) in procedure 2420, SuShi can be applied to 4 sub-images respectively in procedure 2430 and 2440 to remove ringings of interval $x_r$ in x-direction and of interval $y_v'=\Delta y$ in y-direction. After combining sub-images together in procedure 2450, the 1D local subvoxel-shifts in y-direction (unring y) can be used in procedure 2460 to remove the remaining ringing of interval $y_r=\Delta y$ in y-direction.

In the above exemplary pipelines for 1D and 2D images, the effect of image phase variations on the ringing pattern were ignored. In other words, it was assumed that the image phase varies smoothly over a length scale longer than the ringing interval y, in Equation 24. This assumption seems empirically valid for pf=⅞ and ⅚, but less so for pf=⅝ due to the wide interval $y_v=4\Delta y$. As provided herein below, the exemplary results of the RPG pipeline in 1D and 2D magnitude images with no additional phase are described, and the applicability of RPG to, e.g., 2D magnitude images modulated by the interplay of added image phase map and PSF in Equation 19 is demonstrated.

Exemplary Atypical Partial Fourier Factor

In addition to common PF factors (pf=⅞, ⅚, ⅝), the RPG pipeline can, e.g., be generalized for any PF factors of rational number (e.g., pf=0.6 on Philips MRI machines, and pf=5.5/8 on GE MRI machines) (see, e.g., Casey et al., 2018): For $v\equiv 2pf-1=p/q$ with coprime positive integers p and q (p<q), it is possible to first remove the ringings of interval $x_r=\Delta x$ in x-direction and of interval $y_v=\Delta y/v$ in y-direction in Equation 22. Further, it is possible to use nearest neighbor to up-sample the 2D image by p-fold in y-direction ($N_x \times pN_y$ matrix), and divide it into q smaller sub-images (taking one column for every q columns, i.e., (qn+i)th column, $$n = 0, 1, 2, \ldots , \left\lfloor \frac{pN_y - i}{q} \right\rfloor,$$

and i=1,2, . . . q for each sub-image), where the ringing interval in y-direction becomes $y_v'=\Delta y$, and the ringing interval $x_r=\Delta x$ in x-direction is kept unchanged. Then one could apply the original SuShi method in the q sub-images respectively to remove the ringings of interval $x_r$ in x-direction and of interval $y_v'$ in y-direction. After, e.g., combining the corrected sub-images together and using nearest neighbor to down-sample the combined image by p fold in y-direction ($N_x \times N_y$ matrix), one could use the 1D local subvoxel-shifts in y-direction (unring y) to remove the remaining ringing of interval $y_r=\Delta y$ in y-direction.

The RPG pipeline can be generalized for undersampled 3-dimensional acquisitions, where it can be applied independently in each dimension (xy, yz or zx) based on the corresponding PF factor.

Exemplary Numerical Phantoms for RPG

Exemplary 1D Phantom

The exemplary 1D phantom was a rectangular function of 64 pixels wide in a 128×1 array, i.e., field-of-view (FOV) =128 pixels, with no additional image phase:

$$S_0(x) = \begin{cases} 0.2 & x \notin [32, 95], \\ 1 & x \in [32, 95]. \end{cases} \tag{28}$$

Figure 12:
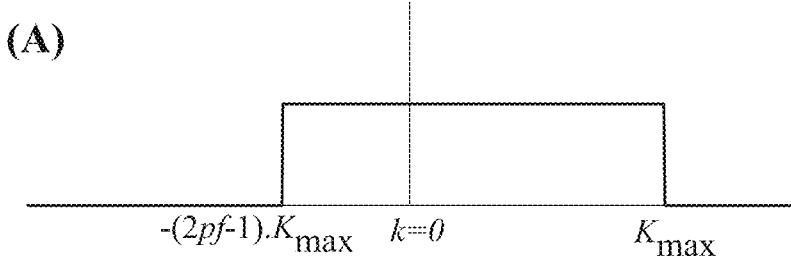
FIGS. 12(A) and 12(B) are exemplary graphs providing an exemplary explanation for Gibbs-ringing artifacts due to the PF acquisition and zero filling interpolation, according to an exemplary embodiment of the present disclosure.
Figure 12:
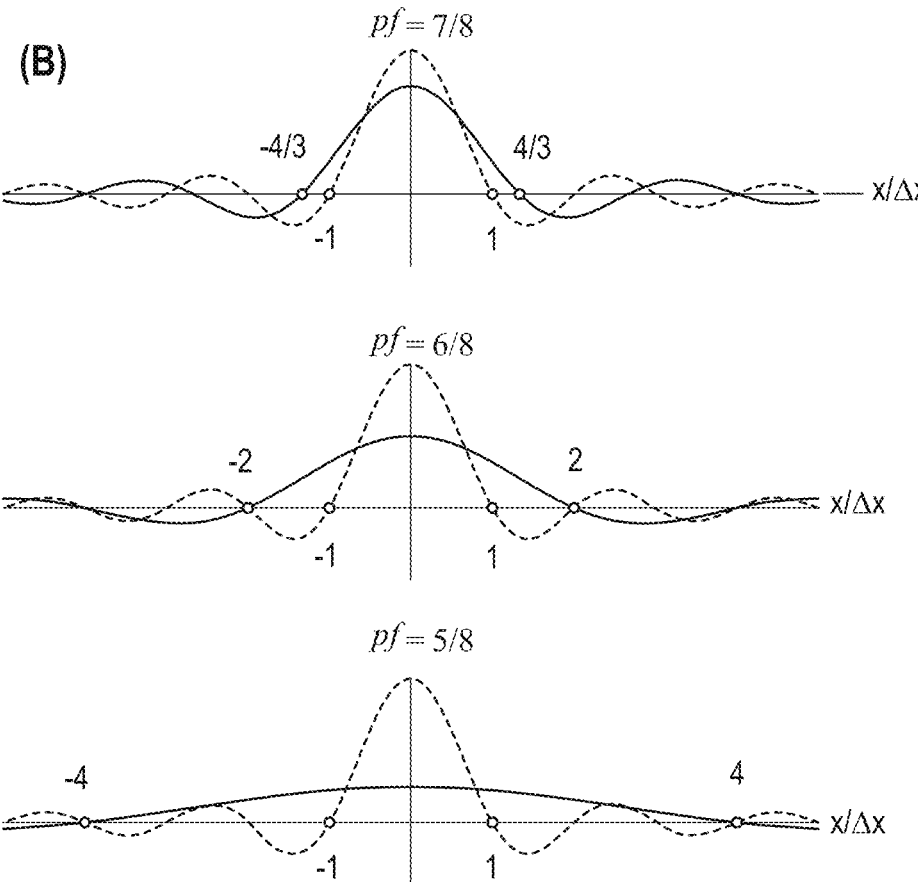

To induce Gibbs-ringings in the 1D phantom, a ground truth/high resolution image of a rectangular function of 640 pixels wide in a 1280×1 array was created, and only its center k-space data (128×1 array) was taken, where the range of spatial frequencies $k \in [-K_{max}, +K_{max}]$ was defined. The center k-space data was further zeroed for $k \in [-K_{max}, -vK_{max}]$ to simulate the data of PF acquisition of factor pf=⅞, ⅚, and ⅝ (FIG. 12*a*). No PF reconstruction was applied to recover the zeroed k-space data; instead, Fourier transform was applied and the magnitude image was taken. To remove Gibbs-ringings due to the asymmetric k-space truncation (PF acquisition and zero filling), the 1D pipeline described above was applied to the magnitude image. As a reference, the original local subvoxel-shifts method was applied to the magnitude image of fully sampled data.

To analyze the spatial frequencies of removed ringings, the power-spectrum $|FT\{\Delta I\}|^2$ of the image residual $\Delta I=J-I$ was calculated before and after the ringing removal. The Gibbs-ringing of interval $x_r$ in Equation 21 has a period of $2x_r$ (twice of the ringing interval), corresponding to a peak at the spatial frequency $$k = \frac{2\pi}{2x_r} = K_{max} \tag{29}$$

in the power spectrum of the image residual. Similarly, the PF induced Gibbs-ringing of interval $x_v$ in Equation 24 has a period of $2x_v$ (twice of the ringing interval), corresponding to a peak at the spatial frequency $$k = \frac{2\pi}{2x_v} = vK_{max} = (2pf - 1) \cdot K_{max} \tag{30}$$

in the power spectrum of the image residual, i.e., $k/K_{max}=\frac{3}{4}$, ½, and ¼ for pf=⅞, ⅚, and ⅝.

To further simulate the effect of Gibbs-ringings on diffusion metrics, diffusivities D(x) and kurtosis K(x) were assigned for this 1D phantom:

$$D(x) = \begin{cases} 1 \ \mu m^2/ms & x \notin [32, 95], \\ 3 \ \mu m^2/ms & x \in [32, 95], \end{cases} \tag{31}$$

$$K(x) = \begin{cases} 1 & x \notin [32, 95], \\ 3 & x \in [32, 95], \end{cases}$$

where the values $D(x)=1 \ \mu m^2/ms$ and $K(x)=1$ correspond to tissue properties in white matter, and the values $D(x)=3 \ \mu m^2/ms$ and $K(x)=0$ correspond to properties of cerebrospinal fluid. The diffusion-weighted signals were generated by using a cumulant expansion truncated at the kurtosis term (Jensen et al., 2005):

$$S(b, x) = S_0(x) \cdot \exp\left(-bD(x) + \frac{1}{6}b^2 D^2(x)K(x)\right), \tag{32}$$

where the non-diffusion-weighted signal $S_0$ was given by Equation 28, and diffusion weightings (b-values) were $b=[0.25,1,2] \ ms/\mu m^2$, matching the in vivo MRI protocol. For signals $S_0$ and S, Gibbs-ringings due to the asymmetric k-space truncation (PF acquisition and zero filling) was induced, and local subvoxel-shifts method or the 1D RPG pipeline was applied to remove ringings in magnitude signals. The signals before and after ringing removal yielded estimated mean diffusivity and mean kurtosis (FIG. 25) from Equation 32 via linear least squares method.

Exemplary 2D Phantom for RPG

The 2D phantom was a 90×90 Shepp-Logan phantom. To induce Gibbs-ringings in the 2D phantom, a ground truth/ high resolution image of a 900×900 Shepp-Logan phantom with additional phase (Chiew, n.d.) was created:

$$\phi = \tag{33}$$

$$2\pi \cdot \left[ 1.35\exp\left(-\frac{\sqrt{(x-338)^2 + (y-338)^2}}{150}\right) + 0.9\exp\left(-\frac{(x-525)^2}{338^2}\right) \right].$$

Its center k-space data (90×90 matrix) was taken, where the range of spatial frequencies was defined as $k_{x,y} \in [-K_{max}, +K_{max}]$. The center k-space data was further zeroed in $k_y \in [-K_{max}, -vK_{max}]$ to simulate the data of PF acquisition of factor pf=7/8, 6/8, and 5/8 in the phase-encoding direction. The zeroed k-space data using PF reconstruction was not recovered; instead, the Fourier transform was applied and the magnitude image was taken. To remove Gibbs-ringing due to the asymmetric k-space truncation (PF acquisition and zero filling), the 2D RPG pipeline above was applied to the magnitude image. As a reference, the original exemplary local subvoxel-shifts method (see, e.g., Kellner et al., 2016) or magnitude-input CNN (MCNN) (see, e.g., Muckley et al., n d.) was applied to the magnitude image of fully sampled data and PF acquired data.

Furthermore, in addition to the noiseless case, the effect of noise on ringing removal pipeline was observed by adding Gaussian noise of standard deviation $\sigma=[0.02,0.05,0.10]$ in k-space data (cf. 2D phantom's image intensity $\in [0,1]$), simulating the case of different SNR.

Exemplary in Vivo MRI to Illustrate RPG

A 27-year-old female underwent imaging on a 3 T Siemens Prisma scanner (Erlangen, Germany) with a 20-channel head coil after obtaining informed consent as approved by the Institutional Review Board. Diffusion MRI measurements using a monopolar pulsed-gradient spin echo sequence were repeated for fully sampled k-space data and PF acquisition of factor pf=7/8, 6/8, and 5/8 respectively. Exemplary images were reconstructed using zero filling. For each scan. 4 b=0 non-diffusion-weighted images (non-DWIs) and 84 DWIs of b-values b=[0.25,1,2] ms/$\mu m^2$ were obtained along [4,20,60] gradient directions for each b-shell, with an anisotropic resolution of 1.7×1.7×3 $mm^3$ and a FOV of 220×220 $mm^2$. The whole brain volume was scanned within 50 slices, aligned parallel to the anterior commissure-posterior commissure (AC-PC) line. GRAPPA with acceleration factor=2 and multiband with acceleration factor=2 were used. All scans were performed with the same TR/TE (repetition time/echo time)=3700/96 ms and readout bandwidth=1480 Hz/pixel. An additional b=0 image with the same sequence parameters was obtained except the opposing polarity of phase-encoding direction for the susceptibility-induced distortion correction. The total scan time is about 30 minutes.

Exemplary image processing DESIGNER pipeline was based on reference No. 22 and included five procedures: denoising (see, e.g., Veraart et al., 2016), Gibbs-ringing removal (local subvoxel-shifts (see, e.g., Kellner et al., 2016) or MCNN (see, e.g., Muckley et al., n.d.) for fully sampled data and PF acquired data; RPG for PF acquired data), susceptibility-induced distortion correction (see, e.g., Andersson et al. 2003), eddy current and motion correction (see, e.g., Andersson & Sotiropoulos, 2016), and Rician noise correction (see, e.g., Koay & Basser, 2006). For comparison, an alternative image processing pipeline excluding Gibbs-ringing removal was also applied. For each voxel, the diffusion and kurtosis tensors was estimated using weighted linear least squares with the constraint of positive apparent kurtosis (see, e.g., Veraart et al., 2013). Maps of MD, fractional anisotropy (FA), and mean kurtosis (MK) were calculated accordingly (see, e.g., Jensen et al., 2005; Basser et al., 1994).

Figure 29:
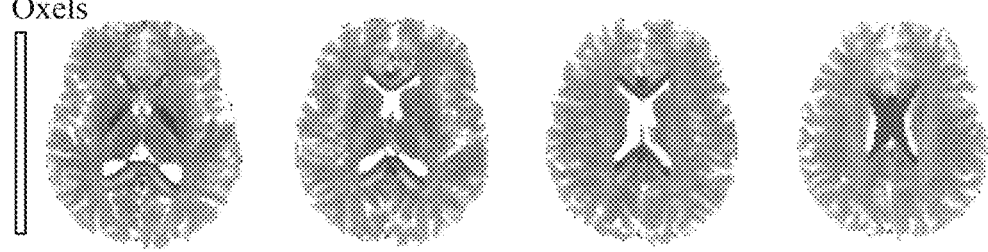
FIG. 29 is a set of exemplary illustrations of corpus callosum regions of interest.

To further demonstrate the effect of ringing removal on diffusion metrics in the area close to ventricles, the CC and parcellated were segmented it into multiple regions-of-interests (ROIs) based on the distance from the CSF: The subject's FA map of fully sampled data was registered to FSL's standard FA map with FMRIB's linear and non-linear registration tools (FLIRT, FNIRT) (see, e.g., Jenkinson & Smith, 2001; and Andersson et al., 2007). The transformation matrix (FLIRT) and the warp (FNIRT) were retrieved to inversely transform Johns Hopkins University (JHU) DTI-based WM atlas ROIs to the subject space (see, e.g., Mori et al., 2005) and the CC ROI was obtained. The CSF mask was obtained by thresholding the MD>1.5 $\mu m^2/ms$ of fully sampled data. Then, a distance transform was applied to the CSF mask to obtain a distance map showing the distance from the CSF (in a unit of voxels). The CC ROI was further segmented into multiple ROIs based on the distance map from the CSF (FIG. 29). The influence of ringing removal on diffusion metrics (MD, FA, MK) was shown in each CC ROI.

Exemplary Image Sharpness Assessment

Ringing removal procedures may induce image blurring due to the application of 2.5 weighted filter and/or the TV/TGV as the cost function or regularization. To evaluate the image blurring introduced by ringing removal, the sharpness index (SI) was defined based on the S3 metric (see, e.g., Vu et al., 2011), which incorporates two sharpness estimators: (1) a spectral-based estimator according to the slope of the local magnitude spectrum, and (2) a spatial-based estimator according to the local total variation. The higher the SI is, the sharper (and less smoother) the image is.

Exemplary Results of RPG Pipeline

Further, the applicability of the proposed ringing removal pipeline can be provided in 1D/2D numerical phantoms and in vivo dMRI data.

Exemplary Numerical Phantoms for RPG Pipeline

Figure 15:
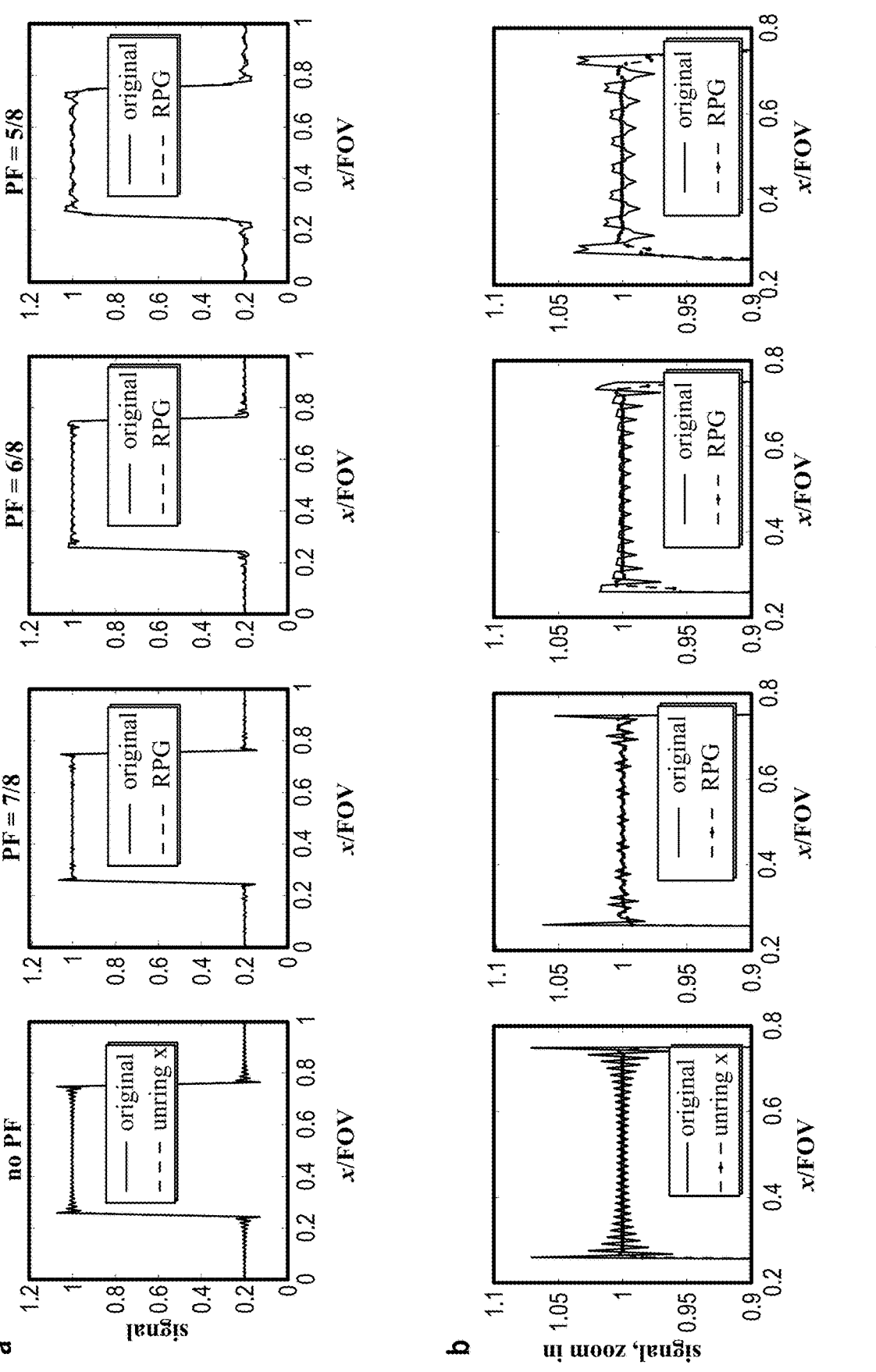
FIGS. 15(a)-15(c) are exemplary graphs of the exemplary numerical simulations of Gibbs-ringing removal in 1-dimensional magnitude signals of a phantom of rectangular function, according to an exemplary embodiment of the present disclosure.

Exemplary numerical simulations of Gibbs-ringing removal in 1D magnitude signal of a rectangular function showed that ringings of targeted intervals due to PF acquisition and zero filling in Equations 21 and 24 were properly removed by the proposed 1D RPG pipeline (FIG. 15$a$-$b$). The power spectrum analysis of the image residual further demonstrated the spatial frequency of removed ringings (FIG. 15$c$); For fully sampled data, the original 1D local subvoxel-shifts method removes the ringing of interval $\Delta x$, leading to a peak at $k=K_{max}$ in the power spectrum, according to Equation 29. Similarly, for PF acquired data, the RPG pipeline removes both ringings of intervals $x_r$ and $x_v$, leading to two peaks at $k=K_{max}$ and $(2pf-1)\cdot K_{max}$ in the power spectrum, based on Equations 29 and 30 respectively.

Figure 25:
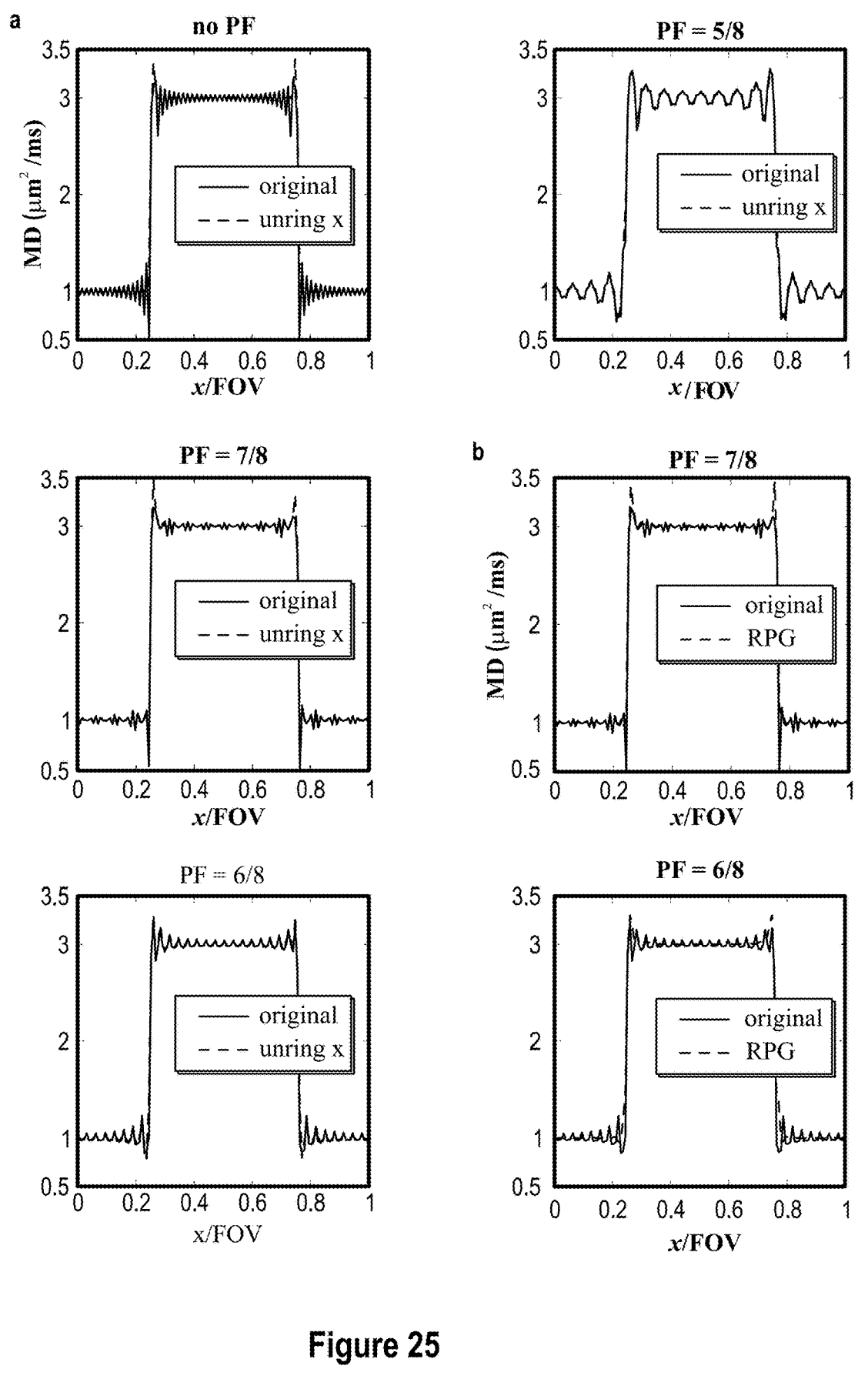
Figure 25:
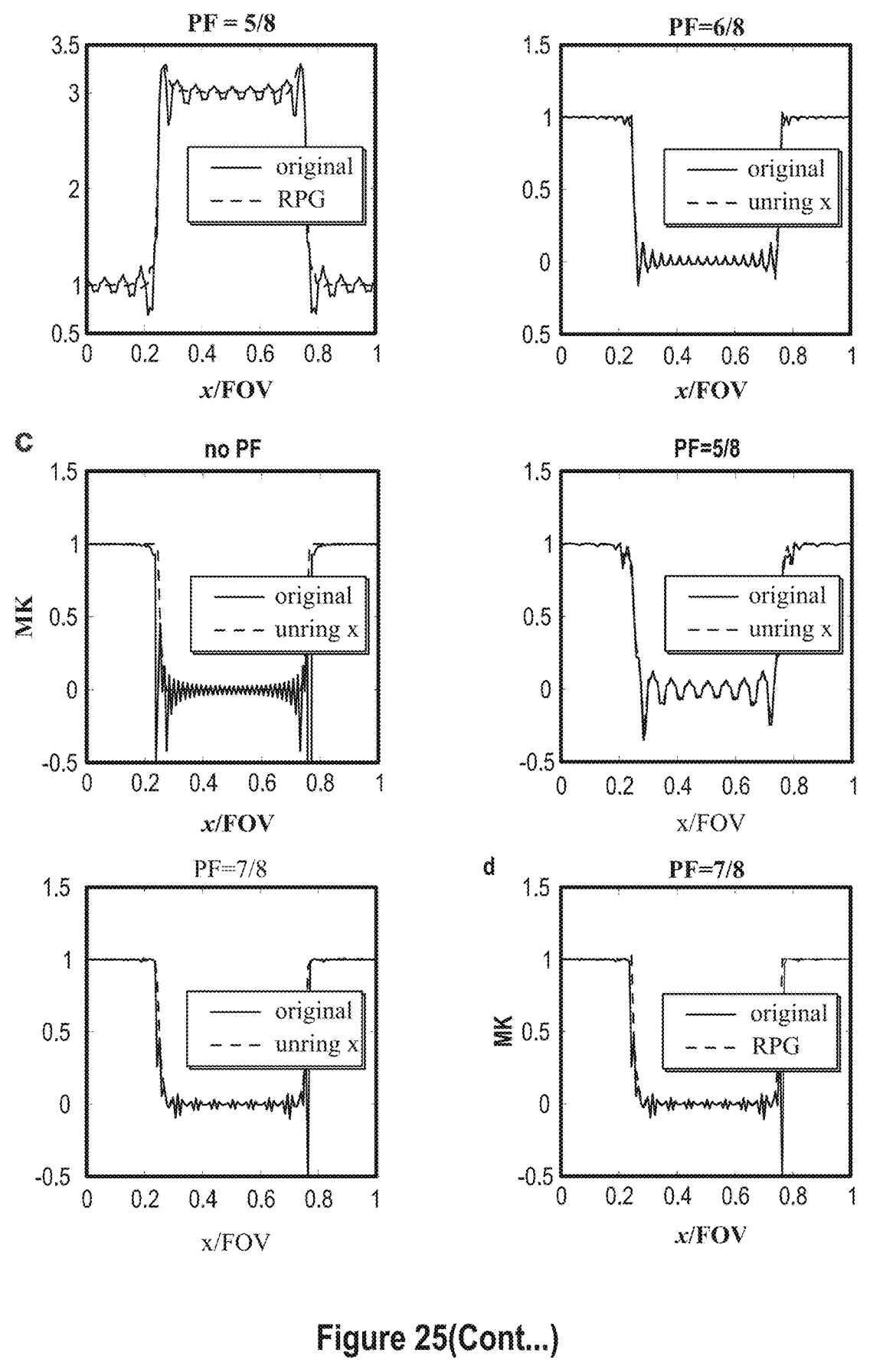

In addition to the 1D b=0 signal phantom, the 1D RPG pipeline was demonstrated on a data set of 1D diffusion weighted phantom in Equation 32 (FIG. 25). Simulation results showed that 1D local subvoxel-shifts method removed most ringings in MD and MK maps of fully sampled data, while ringings of PF acquired data were not corrected properly. In contrast, the 1D RPG pipeline removed most ringings in MD and MK maps of PF acquired data, especially for the correction of undershooting in the "white matter" region, where D(x)=1 $\mu m^2/ms$ and K(x)=1.

Figure 16:
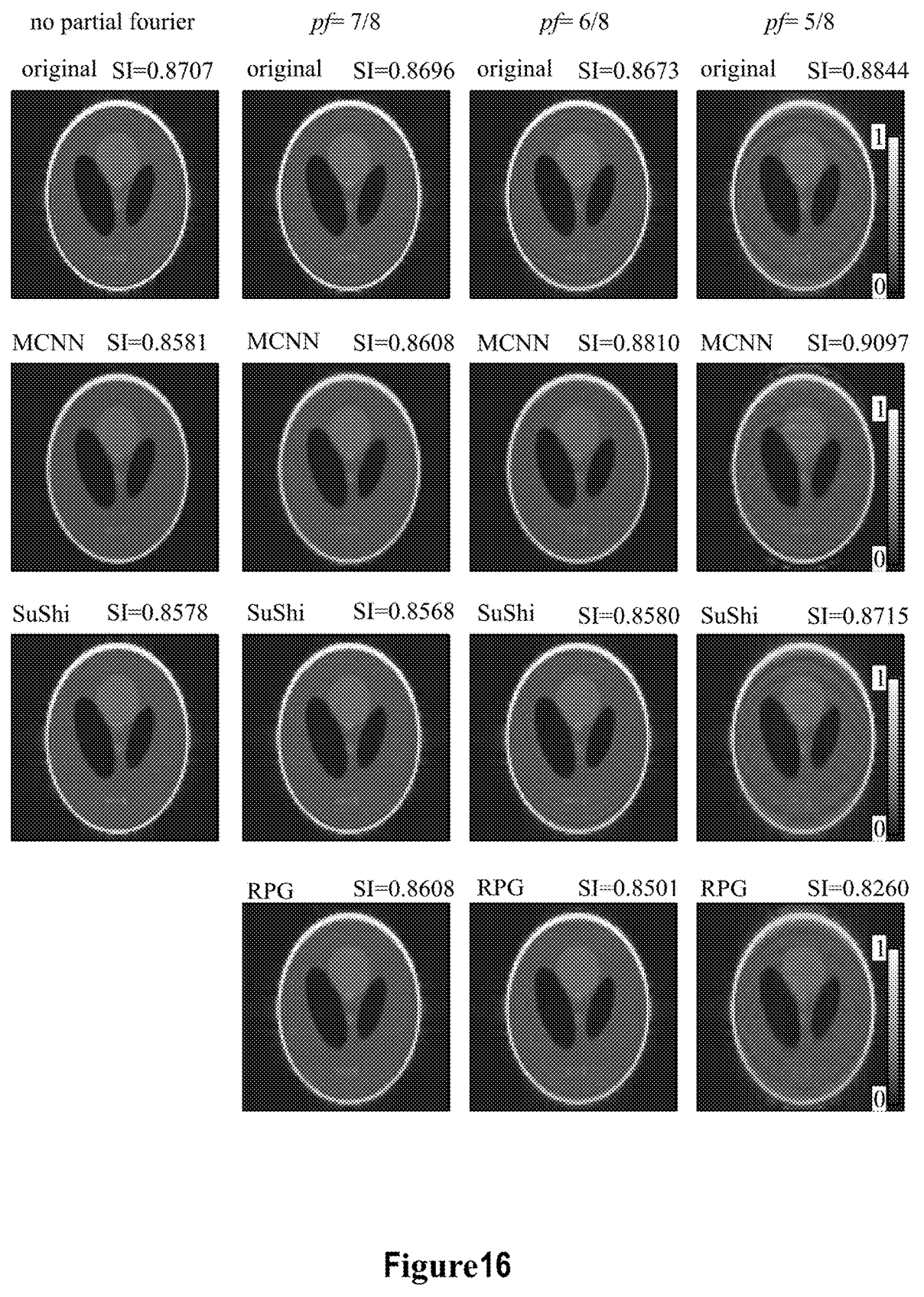

For 2D magnitude images of the Shepp-Logan phantom with additional phase in Equation 33, the 2D RPG pipeline properly removed most Gibbs-ringings due to the PF acquisition for pf=⅞ and ⅝ (FIG. 16). However, for pf=⅝, the image corrected by RPG was excessively blurred with remaining ringings. Similarly, MCNN removed most ringings for pf=⅞ and ⅝, but not for pf=⅝. In contrast, local subvoxel-shifts corrected only ringings of interval x, in Equation 21 and left ringings of interval $x_v$ in Equation 24 untreated.

Figure 26:
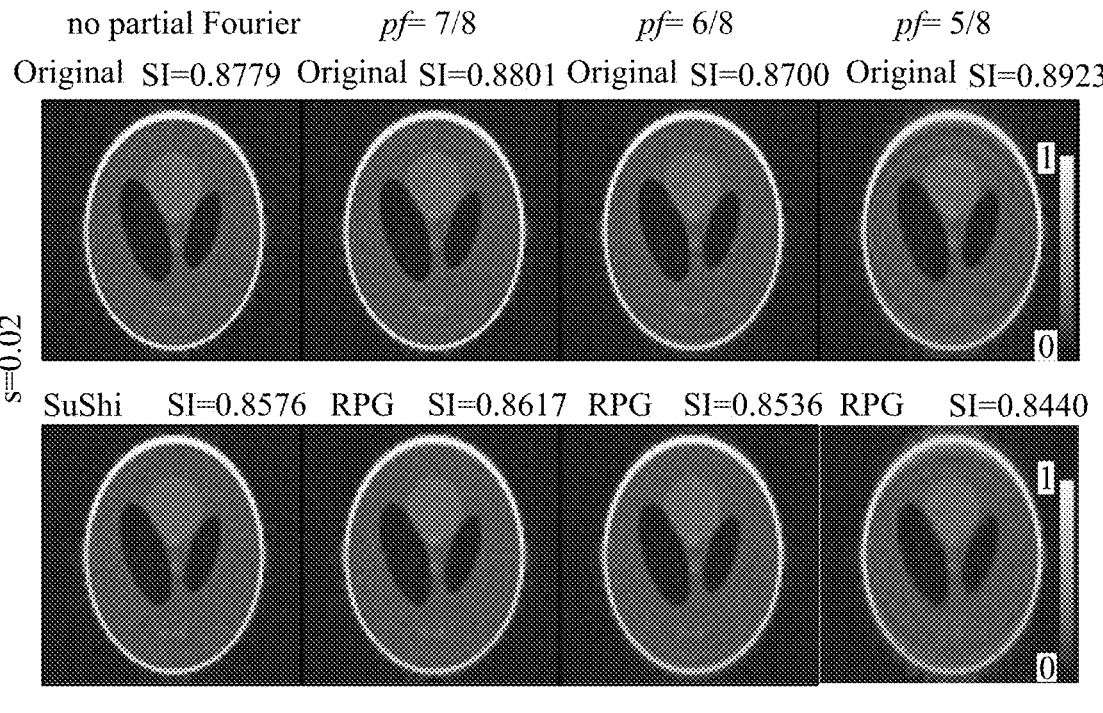
FIG. 26 is a set of exemplary illustrations of the exemplary numerical simulations of Gibbs-ringing removal in 2-dimensional magnitude images of the Shepp-Logan phantom with additional phase and Gaussian noise with standard deviation 0.02, according to an exemplary embodiment of the present disclosure.
Figure 27:
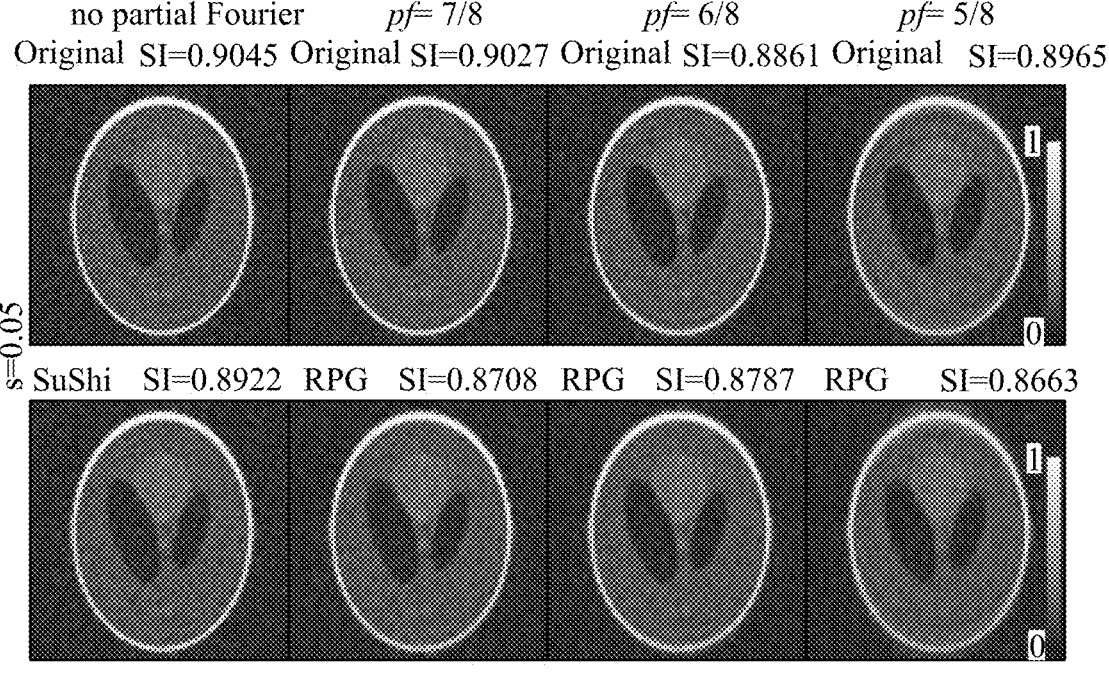
FIG. 27 is a set of exemplary illustrations of the exemplary numerical simulations of Gibbs-ringing removal in 2D magnitude images of the Shepp-Logan phantom with additional phase and a Gaussian noise with standard deviation 0.05, according to an exemplary embodiment of the present disclosure.
Figure 28:
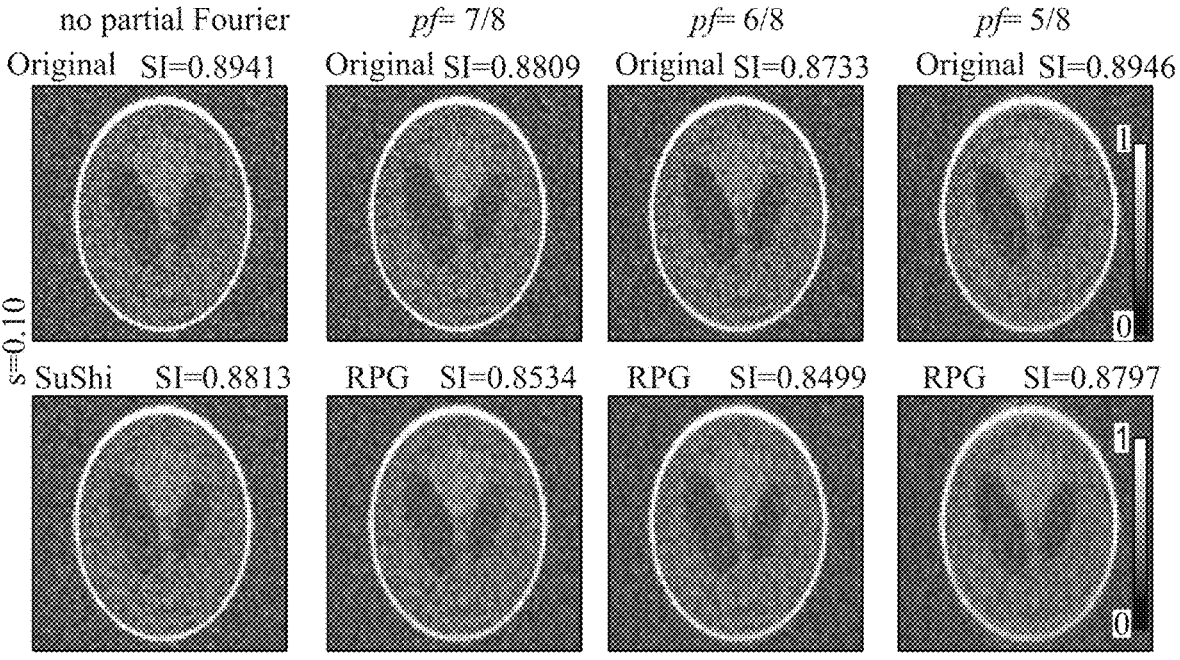
FIG. 28 is a set of exemplary illustrations of the exemplary numerical simulations of Gibbs-ringing removal in 2D magnitude images of the Shepp-Logan phantom with additional phase and Gaussian noise with standard deviation 0.1, according to an exemplary embodiment of the present disclosure.

Further, the stability of RPG pipeline was tested in 2D phantom images of different SNR in FIGS. 26, 27 and 28. For pf=⅞ and ⅝ at the noise level σ=0.02 and 0.05 (cf. image intensity∈[0,1]), the RPG pipeline robustly removed PF-induced ringings, whereas for pf=⅝ the corrected image still had non-trivial amount of ringings. At σ=0.10, the effect of ringing removal was not obvious due to the low SNR.

Exemplary In Vivo MRI for RPG Pipeline

Figure 17:
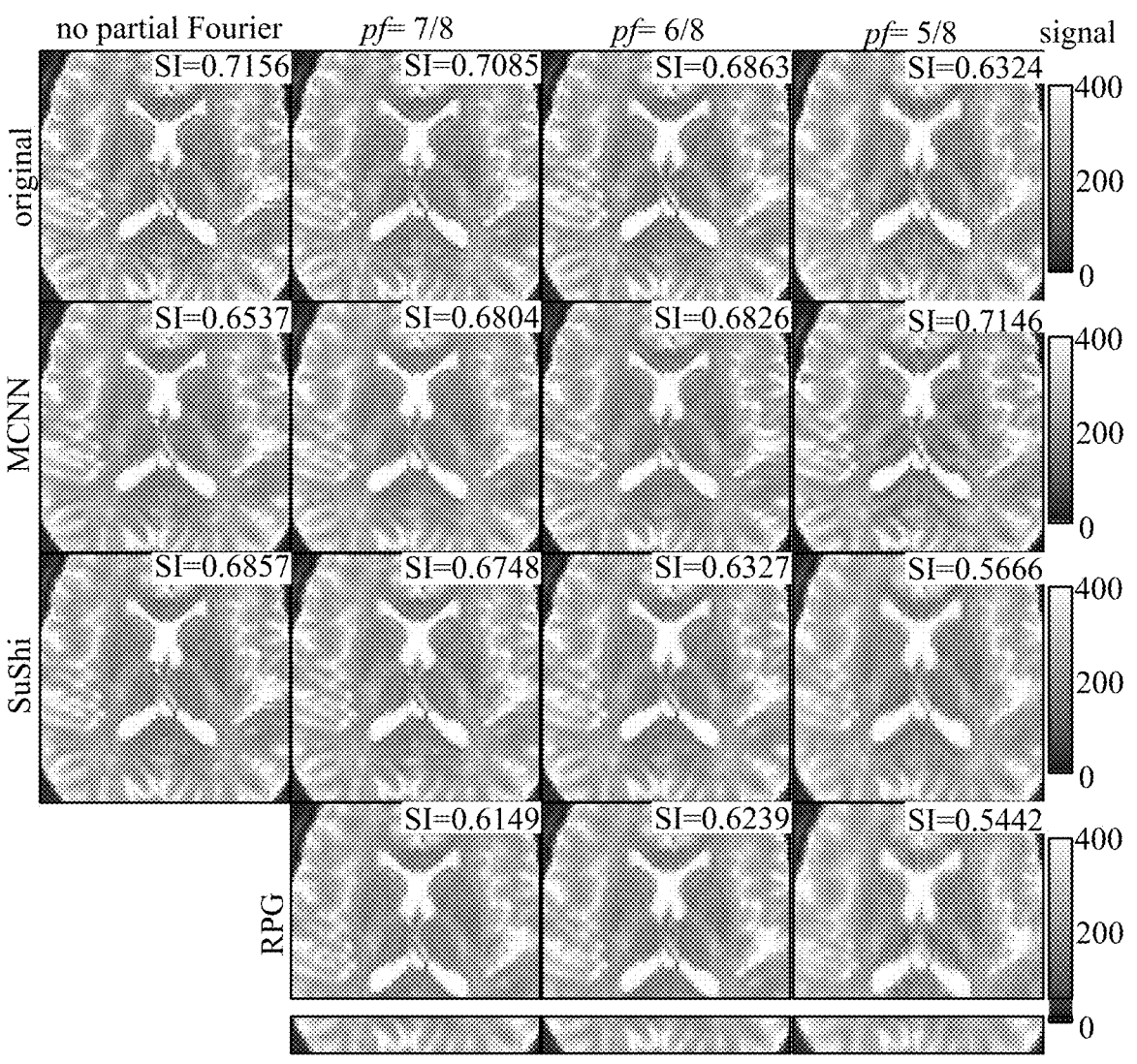
FIG. 17 is a set of exemplary non-diffusion-weighted (b=0) images before and after Gibbs-ringing removal using magnitude-input CNN (MCNN), local subvoxel-shifts (SuShi) and RPG, according to an exemplary embodiment of the present disclosure.
Figure 18:
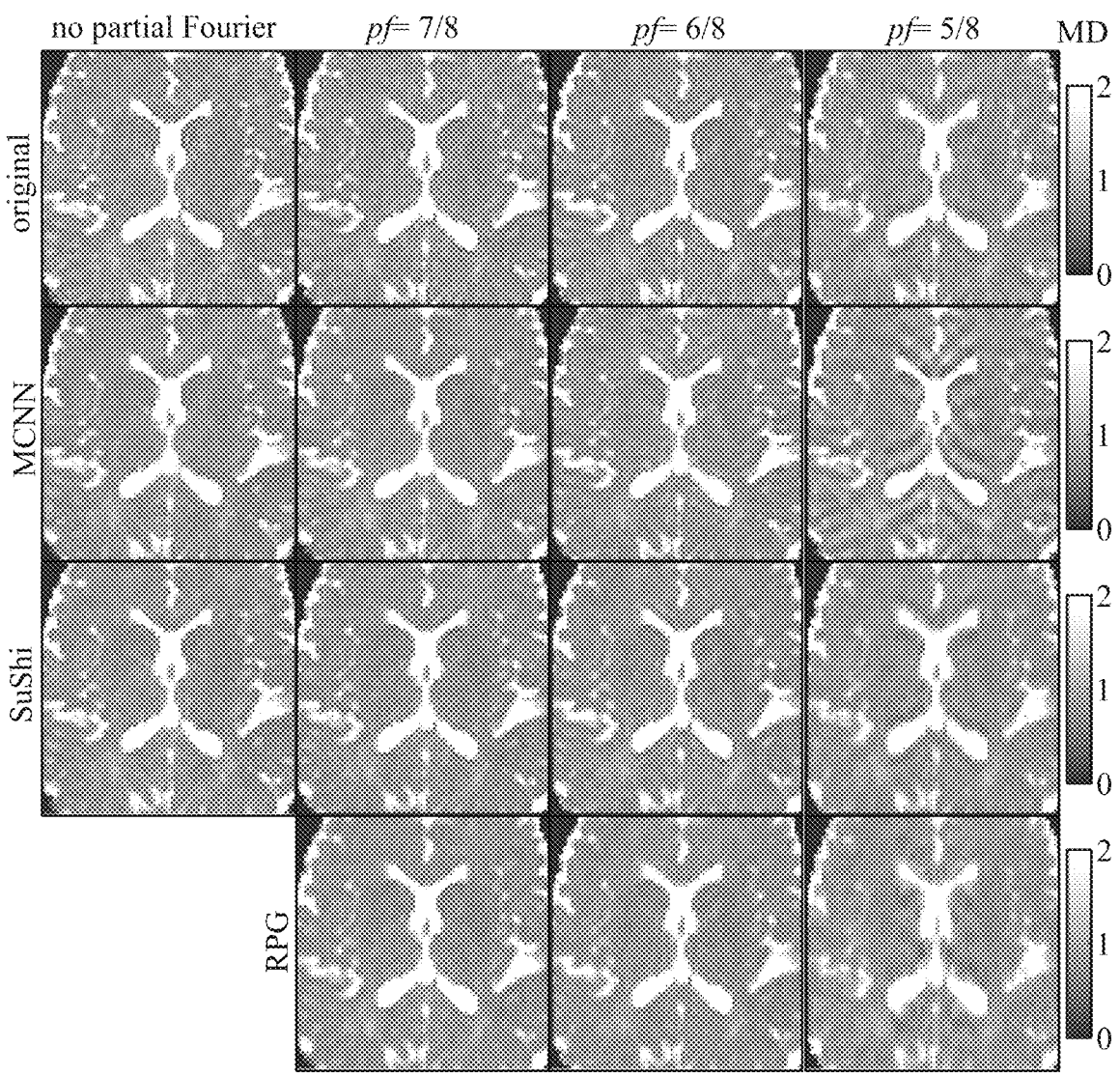
FIG. 18 is a set of exemplary mean diffusivity (MD) maps based on DWIs before and after Gibbs-ringing removal using magnitude-input CNN (MCNN), local subvoxel-shifts (SuShi) and RPG, according to an exemplary embodiment of the present disclosure.

For PF acquired data of pf=⅞, ⅝, and ⅝, the b=0 images (FIG. 17) and MD maps (FIG. 18) have ringing artifacts due to PF acquisition and zero filling that e.g. manifest as dark bands surrounding ventricles in MD maps, especially in genu and splenium of CC. While these cannot be corrected by using the original local subvoxel-shifts method, it can be seen that the 2D RPG pipeline largely removes the additional ringings in b=0 images and MD maps for pf=⅞ and ⅝. For pf=⅝, the b=0 image and MD map are both excessively blurred by using RPG, potentially caused by the interaction between the image phase map and the PSF in Equation 19. Furthermore, though the MCNN successfully removes ringing artifacts for pf=⅞, extra spurious ringings in the corpus callosum adjacent to the ventricles are observed in b=0 images and MD maps after applying the MCNN for pf=⅝ and ⅝, potentially related with the increase of the sharpness index in b=0 images.

Figure 19:
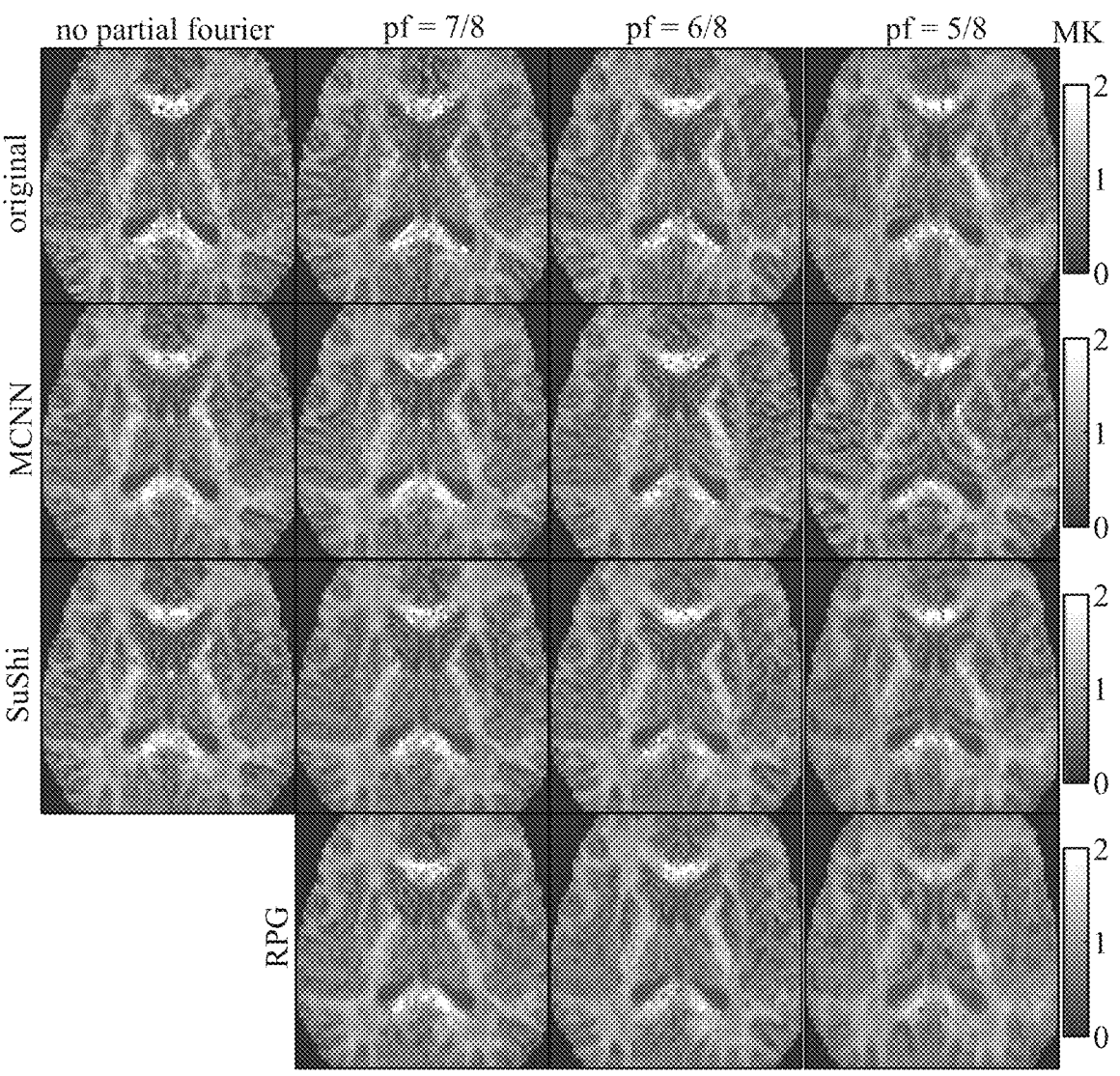
FIG. 19 is a set of exemplary mean kurtosis (MK) maps based on DWIs before and after Gibbs-ringing removal using magnitude-input CNN (MCNN), local subvoxel-shifts (SuShi) and RPG, according to an exemplary embodiment of the present disclosure.

For exemplary MK maps (see FIG. 19), Gibbs-ringings can lead to physically implausible values of MK>3 (varying from 3 to about 1000), that can be largely corrected by using the original local subvoxel-shifts method, even for PF acquired data. Compared with the original local subvoxel-shifts method, the RPG pipeline further reduces unrealistically high MK-values in voxels around the ventricles. However, after the ringing removal using RPG for pf=⅝, the MK values are lowered not only around ventricles but also in major WM tracts, such as the central region of genu in corpus callosum. In contrast, the MCNN reduces unrealistically high MK-values around the ventricles for pf=⅞ and ⅝, but not for pf=⅝.

Figure 20:
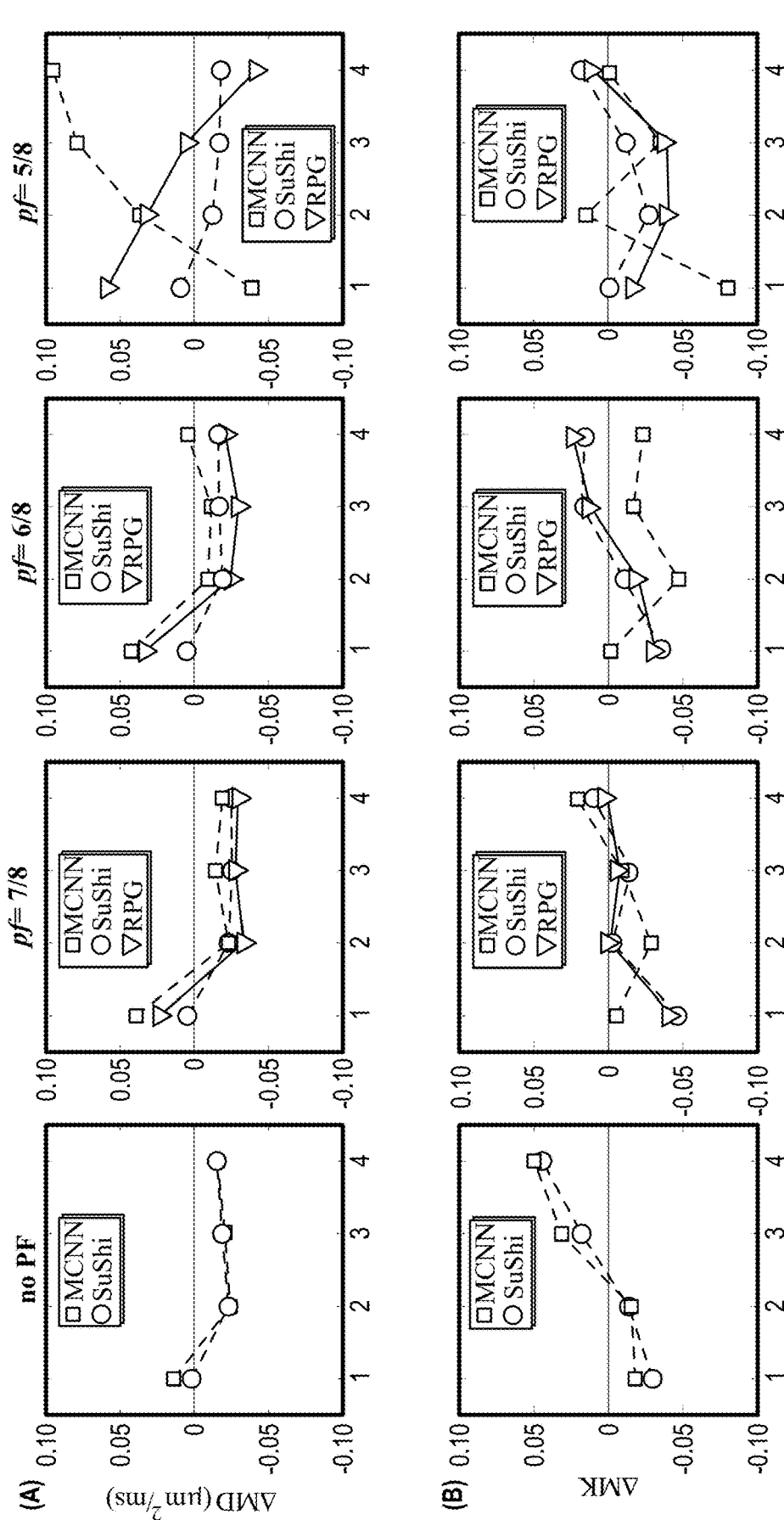
FIGS. 20(A)-20(B) are exemplary graphs showing exemplary differences of mean diffusivity (ΔMD), mean kurtosis (ΔMK), and fractional anisotropy (ΔFA) before and after ringing removals in corpus callosum ROIs consisting of voxels distant from the ventricles by 1-4 voxels, according to an exemplary embodiment of the present disclosure.

To review the effect of Gibbs-ringing removal on diffusion metrics in more detail, the changes of MD, FA, and MK were compared before and after ringing removal in the CC. The CC was segmented into multiple ROIs based on the distance from the CSF, being the major source of clear-cut edges in b=0 images and DWIs and resulting Gibbs-induced ringings. Before ringing removal for PF acquired data, MD is underestimated in WM close to the CSF, shown as dark bands surrounding ventricles in exemplary MD maps (see FIG. 18). The ROI analysis of CC showed that the local subvoxel-shifts method only slightly corrected the underestimated MD in WM voxels close to the CSF (see FIG. 20(A)). In contrast, the RPG pipeline resulted in stronger corrections on the underestimated MD in voxels close to the CSF. Similarly, the MCNN led to the MD corrections comparable with the RPG for pf=⅞, but not for pf=⅝ and ⅝. Furthermore, the local subvoxel-shifts method decreased FA values in WM voxels close to the CSF (see FIG. 20(C)), and the RPG pipeline decreased the FA values even further. This FA value reduction could be caused by the ringing removal and/or the additional smoothing introduced by local subvoxel-shifts or RPG pipeline. The MCNN, however, had similar FA reduction effect for pf=⅞, but not for pf=⅝ and ⅝. Finally, for pf=⅞ and ⅝, both local subvoxel-shifts method and RPG pipeline similarly reduced MK values in WM voxels close to the CSF (see FIG. 20(B)), whereas the RPG of pf=⅝ led to excessive reductions in MK, compared with the local subvoxel-shifts method. And yet the MCNN led to reduced MK values in voxels slightly away from the CSF (distant from the CSF for about 2-3 voxels).

The diffusion metrics after ringing removals can be subtracted by those before ringing removals.

Exemplary Discussion of RPG Pipeline

Asymmetric truncation in k-space due to PF acquisition and zero filling can induce additional Gibbs-ringing artifacts with ringing intervals determined by the PF factor pf in Equations 21 and 24, as compared to fully sampled data. Such artifacts may not be trivial to recognize due to their wider ringing intervals as opposed to the regular Gibbs-ringing in acquisitions with no PF.

In the exemplary numerical simulations and in vivo MRI data, for example, it was shown that these additional ringings can be robustly removed by the proposed RPG pipeline for pf=⅞ and ⅝, with the assumption of a smoothly varying image phase. Indeed, PF induced Gibbs-ringings resulted in reduction of MD in WM close to CSF, and these spurious dark bands can be removed by RPG for pf=⅞ and ⅝, but not by the ordinary local subvoxel-shifts method (see, e.g., Kellner et al., 2016) (pf=⅞, ⅝) or MCNN (see, e.g., Muckley et al., n.d.) (pf=⅝). In contrast, PF induced Gibbs-ringings have relatively small influence on MK even in WM close to the CSF, and local subvoxel-shifts, MCNN and RPG all had relatively small impact on MK-values.

Figure 14:
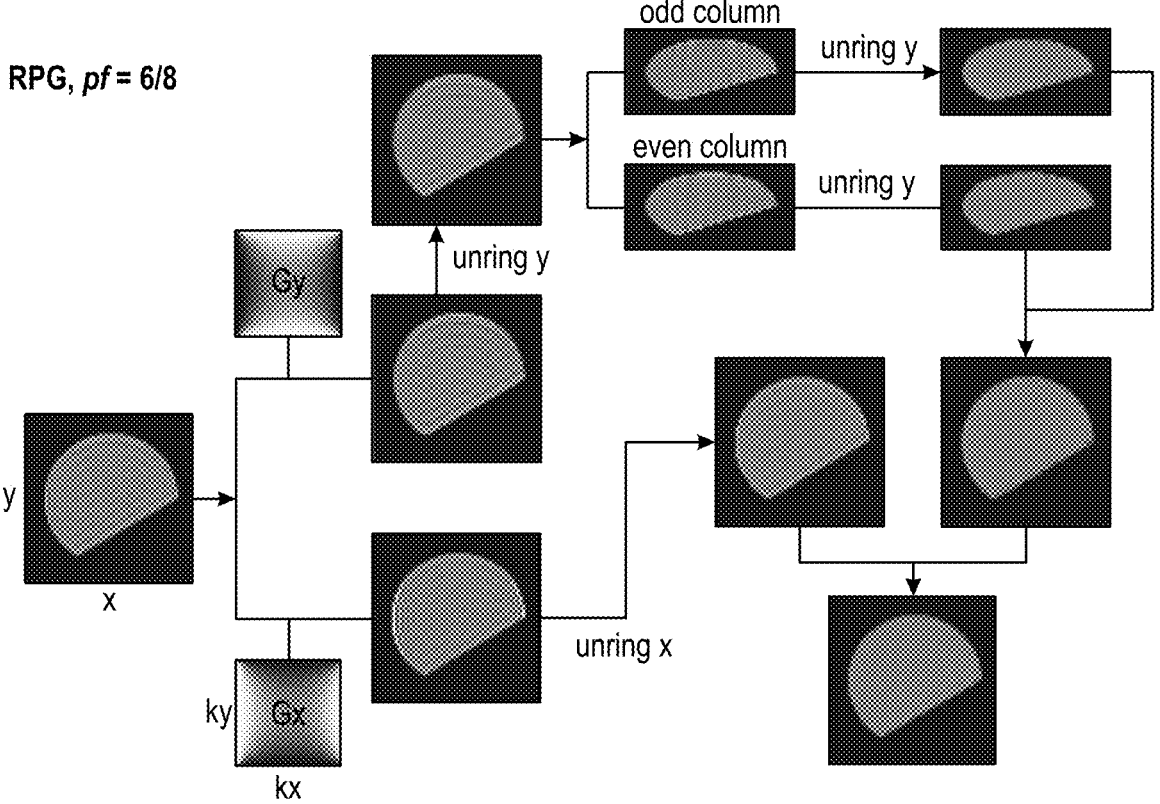
FIG. 14 is a diagram of a procedure illustrating an exemplary removal of PF-induced Gibbs-ringing (RPG) in 2D images with pf=⅝, according to an exemplary embodiment of the present disclosure.

For pf=⅝, the residual of PF-induced ringing after applying RPG (FIG. 16) mainly comes from the "unring x" pathway shown in FIG. 14, e.g., the route with the weighted filter $G_x$. It can be desirable to adapt the filter $G_y$ to suppress the ringing of intervals $\Delta y$ and $2\Delta y$ along the PF dimension (y-direction) in this pathway. However, it is difficult to create such modified $G_x$ since the constraint of $G_x+G_y=1$ needs to be satisfied at the same time, ensuring proper scaling of image intensity. Therefore, the optimization of weighted filters ($G_x$, $G_y$) for pf=⅝ is non-trivial and left to be solved in future study.

For pf=⅝, RPG ringing removal may lead to excessive image blurring due to the interaction between image phase map and complex PSF in Equation 19 (e.g., only its real part contribution in RPG pipeline was considered), as shown in numerical simulations. In the in vivo brain MRI, an unreasonable reduction of MK values in CC was noticed after applying RPG. The wide ringing interval $x_v=4\Delta x$ of pf=⅝ could break the assumption of smoothly varying phase over a length scale longer than the ringing interval. Previous work using MCNN (see, e.g., Muckley et al., n.d.) for Gibbs-ringing correction and noise removal also shows that it is practically impossible to correct the ringing artifacts for pf=⅝ without knowledge of the image phase map or k-space data. Therefore, it is not recommended to employ PF acquisition of pf=⅝ without using a dedicated PF reconstruction, such as Margosian or POCS methods (see, e.g., McGibney et al., 1993).

The PF-induced Gibbs-ringing in images of relatively high SNR~20 (e.g., non-DWI) can be reliably removed by the RPG pipeline. In contrast, the ringing artifact is minor in images of low SNR (e.g., DWI) (see, e.g., Perrone et al., 2015), and the ringing removal pipeline would only lead to slight image blurring due to the application of weighted filters. However, it is still not harmful to apply the RPG pipeline to images of low SNR except the limited blurring effect.

In exemplary systems, methods and computer arrangement according to the exemplary embodiments of the present disclosure, the RPG pipeline can be generalized for any PF factors of rational number. Practically, the RPG is particularly well-suited for removing ringings in PF acquired magnitude images of pf=⅝, because (1) for pf=⅞, the bias of additional ringings due to PF is relatively small, and (2) for pf=⅝, it is very difficult for any algorithm to remove ringings without knowing the phase map. Considering the balance between undersampling efficiency (e.g., to shorten TE in EPI sequence) and applicability of ringing removal in magnitude images, it may be desirable to perform PF acquisitions of pf=⅝, which is already adopted as the default in dMRI protocols of many large preclinical and clinical studies including the Human Connectome Project (see, e.g., Sotiropoulos et al., 2013), Adolescent Brain Cognitive Development study (Siemens protocol) (see, e.g., Casey et al., 2018), and UK Biobank (see, e.g., Alfaro-Almagro et al., 2018).

It is possible to fine-tune the RPG pipeline for an improved performance. For example, the implementation of the RPG pipeline can be based on any other ringing removal method targeting the ordinary Gibbs-ringing in fully sampled data. Furthermore, the exemplary image subsampling in RPG pipeline is currently performed in the image space (see FIG. 13), whereas it is possible to achieve higher-quality image subsampling in a wavelet domain. In addition, the blurring due to the application of weighted filter and/or the TV/TGV as the cost function can be further reduced by using the cost function or regularization in other domains, such as wavelet domain or manifolds in deep neural network. Optimizing each component in RPG pipeline can improve the results at extreme PF factors.

Compared with the previous study using MCNN (see. e.g., Muckley et al., n.d.) to remove PF induced Gibbs-ringings in magnitude images, the exemplary RPG pipeline can be a fast and straightforward method that may not require either training data or tuning parameters for the correction kernels. Extending the theoretical understanding of PF acquisition and the well-established local subvoxel-shifts method (see, e.g., Kellner et al., 2016), it is possible to remove these ringing artifacts in magnitude images. Even without applying any ringing removal pipelines, the knowledge of ringing patterns resulting from PF acquisitions and zero filling can be potentially valuable for radiologists to distinguish ringing artifacts from anatomical structures.

Exemplary Conclusion for RPG Pipeline

Exemplary Gibbs-ringing artifacts in magnitude images obtained by using PF acquisition and zero filling interpolation have been modeled, and a correction pipeline based on modifying the local subvoxel-shifts systems, methods and computer-accessible medium according to exemplary embodiments of the present disclosure is described herein. With the understanding of oscillating convolution kernels due to the PF acquisition, the ringings in magnitude images can be, e.g., robustly removed without the need of complicated models and/or tuning parameters trained with a non-trivial amount of data. The effects of ringings on diffusion metrics were compared to the original local subvoxel-shifts method and a magnitude-input CNN in numerical phantoms and in vivo diffusion data. The described RPG pipeline may not just remove most ringings in magnitude DWIs of PF factors pf=⅞ and ⅝, but also can stabilize estimations of diffusion metrics around anatomical boundaries.

FIG. 30 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 3005. Such processing/computing arrangement 3005 can be, for example entirely or a part of, or include, but not limited to, a computer/processor 3010 that can include, for example one or more microprocessors, and use instructions stored on a computer-accessible medium (e.g., RAM, ROM, hard drive, or other storage device).

As shown in FIG. 30, for example a computer-accessible medium 3015 (e.g., as described herein above, a storage device such as a hard disk, floppy disk, memory stick, CD-ROM, RAM, ROM, etc., or a collection thereof) can be provided (e.g., in communication with the processing arrangement 3005). The computer-accessible medium 3015 can contain executable instructions 3020 thereon. In addition or alternatively, a storage arrangement 3025 can be provided separately from the computer-accessible medium 3015, which can provide the instructions to the processing arrangement 3005 so as to configure the processing arrangement to execute certain exemplary procedures, processes, and methods, as described herein above, for example.

Further, the exemplary processing arrangement 3005 can be provided with or include an input/output ports 3035, which can include, for example a wired network, a wireless network, the internet, an intranet, a data collection probe, a sensor, etc. As shown in FIG. 30, the exemplary processing arrangement 3005 can be in communication with an exemplary display arrangement 3030, which, according to certain exemplary embodiments of the present disclosure, can be a touch-screen configured for inputting information to the processing arrangement in addition to outputting information from the processing arrangement, for example. Further, the exemplary display arrangement 3030 and/or a storage arrangement 3025 can be used to display and/or store data in a user-accessible format and/or user-readable format.

TABLE S1

Removal of PF induced Gibbs-ringing (PRG) of pf = 7/8.

Input: I : original 2D input image ($N_x \times N_y$ matrix), y : PF dimension
Output: J : corrected 2D output image 1:     procedure RPG (I, pf = 7/8)
2:          I ← up-sampling I by a factor of 3 along y-dimension
3:          for i := 1 to 4 do
4:               for n := 0 to $\lfloor 3N_x/4 \rfloor$ do
5:                   $J^{(i)}[0: N_x - 1][n] \leftarrow I[0: N_x - 1][4n + i - 1]$
6:               end for
7:               $J^{(i)}$ ← applying original 2D local subvoxel-shifts (SuShi) to $J^{(i)}$
8:               for n := 0 to $\lfloor 3N_x/4 \rfloor$ do
9:                   $J[0: N_x - 1][4n + i - 1] \leftarrow J^{(i)}[0: N_x - 1][n]$
10:             end for
11:         end for
12:         J ← down-sampling J by a factor of 3 along y-dimension
13:         J ← applying 1D local subvoxel-shifts along y-dimension (unring y) to J
14:     end procedure

TABLE S2

Removal of PF induced Gibbs-ringing (PRG) of pf = 6/8.

Input: I: original 2D input image ($N_x \times N_y$ matrix), y : PF dimension
Output: J: corrected 2D output image 1:    procedure RPG (I, pf = 6/8)
2:      $I_x \leftarrow FT^{-1}\{FT\{I\} \cdot G_x\}$
3:      $I_y \leftarrow FT^{-1}\{FT\{I\} \cdot G_y\}$
4:      $J_x$ ← applying 1D local subvoxel-shifts along x-dimension (unring x) to $I_x$
5:      $J_y$ ← applying 1D local subvoxel-shifts along y-dimension (unring y) to $I_y$
6:      for i := 1 to 2 do
7:         for n := 0 to $\lfloor N_x/2 \rfloor$ do
8:           $J_y^{(i)}, [0:N_x - 1][n] \leftarrow J_y[0:N_x - 1][2n + i - 1]$
9:         end for

TABLE S2-continued

Removal of PF induced Gibbs-ringing (PRG) of pf = 6/8.

10:      $J_y^{(i)}$ ← applying 1D local subvoxel-shifts along y-dimension (unring y) to $J_y^{(i)}$
11:      for n := 0 to $\lfloor N_x/2 \rfloor$ do
12:         $\bar{J}_y[0:N_x - 1][2n + i - 1] \leftarrow J_y^{(i)}[0:N_x - 1][n]$
13:         end for
14:      end for
15:    $J \leftarrow J_x + \bar{J}_y$
16:   end procedure

TABLE S3

Removal of PF induced Gibbs-ringing (PRG) of pf = 5/8.

Input: I : original 2D input image ($N_x \times N_y$ matrix), y : PF dimension

Output: J : corrected 2D output image

1:     procedure RPG (I, pf = 5/8)

2:        for i := 1 to 4 do

3:           for n := 0 to $\lfloor N_x/4 \rfloor$ do

4:              $J^{(i)}[0: N_x - 1][n] \leftarrow I[0: N_x - 1][4n + i - 1]$

5:           end for

6:           $J^{(i)}$ ← applying original 2D local subvoxel-shifts (SuShi) to $J^{(i)}$ 7:           for n := 0 to $\lfloor N_x/4 \rfloor$ do 8:              $J[0: N_x - 1][4n + i - 1] \leftarrow J^{(i)}[0: N_x - 1][n]$ 9:           end for 10:        end for 11:        J ← applying 1D local subvoxel-shifts along y-dimension (unring y) to J 12:     end procedure The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

REFERENCES

The following references are hereby incorporated by reference, in their entireties:

1. Jones D K. Diffusion MRI. Oxford University Press; 2010.
2. Novikov D S, Fieremans E, Jespersen S N, Kiselev V G. Quantifying brain microstructure with diffusion MRI: Theory and parameter estimation. NMR in Biomedicine 2019; 32:e3998.
3. Pierpaoli C, Basser P J. Toward a quantitative assessment of diffusion anisotropy. Magnetic resonance in Medicine 1996; 36:893-906.
4. Veraart J, Fieremans E, Novikov D S. Diffusion MRI noise mapping using random matrix theory. Magnetic Resonance in Medicine 2016; 76:1582-1593.
5. Veraart J, Novikov D S, Christiaens D, Ades-aron B, Sijbers J, Fieremans E. Denoising of diffusion MRI using random matrix theory. NeuroImage 2016; 142:394-406.
6. Marchenko V A, Pastur L A. Distribution of eigenvalues for some sets of random matrices. Matematicheskii Sbornik 1967; 114:507-536.
7. Does M D, Olesen J L, Harkins K D, et al. Evaluation of principal component analysis image denoising on multi-exponential MRI relaxometry. Magnetic resonance in medicine 2019; 81:3503-3514.
8. Ades-Aron B, Lemberskiy G, Veraart J, et al. Improved task-based functional MRI language mapping in patients with brain tumors through marchenko-pastur principal component analysis denoising. Radiology 2021; 298:365-373.
9. Vizioli L, Moeller S, Dowdle L, et al. Lowering the thermal noise barrier in functional brain mapping with magnetic resonance imaging. Nature Communications 2021; 12:5181 doi: 10.1038/s41467-021-25431-8.
10. Ades-Aron B, Veraart J, Kochunoy P, et al. Evaluation of the accuracy and precision of the diffusion parameter EStimation with Gibbs and NoisE removal pipeline. NeuroImage 2018; 183:532-543.
11. Pruessmann K P, Weiger M, Scheidegger M B, Boesiger P. SENSE: sensitivity encoding for fast MRI. Magnetic Resonance in Medicine: An Official Journal of the International Society for Magnetic Resonance in Medicine 1999; 42:952-962.
12. Pruessmann K P, Weiger M, Börnert P, Boesiger P. Advances in sensitivity encoding with arbitrary k-space trajectories. Magnetic Resonance in Medicine: An Official Journal of the International Society for Magnetic Resonance in Medicine 2001; 46:638-651.
13. Robson P M, Grant A K, Madhuranthakam A J, Lattanzi R, Sodickson D K, Mckenzie C A. Comprehensive quantification of signal-to-noise ratio and g-factor for image-based and k-space-based parallel imaging reconstructions. Magnetic Resonance in Medicine: An Official Journal of the International Society for Magnetic Resonance in Medicine 2008; 60:895-907.
14. Breuer F A, Kannengiesser S A R, Blaimer M, Seiberlich N, Jakob P M, Griswold M A. General formulation for quantitative G-factor calculation in GRAPPA reconstructions. Magnetic Resonance in Medicine: An Official Journal of the International Society for Magnetic Resonance in Medicine 2009; 62:739-746.
15. Moeller S, Pisharady P K, Ramanna S, et al. NOise Reduction with Distribution Corrected (NORDIC) PCA in dMRI with complex-valued parameter-free locally low-rank processing. NeuroImage 2021; 226:117539.
16. Aja-Fernández S, Vegas-Sánchez-Ferrero G, Tristán-Vega A. Noise estimation in parallel MRJ: GRAPPA and SENSE. Magnetic resonance imaging 2014; 32:281-290.
17. Cordero-Grande L, Christiaens D, Hutter J, Price A N, Hajnal J V. Complex diffusion-weighted image estimation via matrix recovery under general noise models. Neuroimage 2019; 200:391-404.
18. Lemberskiy G, Bacte S, Veraart J, Shepherd T M, Fieremans E, Novikov D S. Achieving sub-mm clinical diffusion mri resolution by removing noise during reconstruction using random matrix theory. In: ISMRM 27th annual meeting, Montreal, Canada, Proceedings of the ISMRM annual meeting. Vol. 27.; 2019. p. 0770.
19. Lemberskiy G, Veraart J, Ades-aron B, Fieremans E, Novikov D S. Marchenko-Pastur Virtual Coil Compression (MP-VCC). In: ISMRM 29th annual meeting, Proceedings of the ISMRM annual meeting. Vol. 29.; 2021. p. 1155.
20. Block K T, Chandarana H, Milla S. et al. Towards routine clinical use of radial stack-of-stars 3D gradient-echo sequences for reducing motion sensitivity. Journal of the Korean Society of Magnetic Resonance in Medicine 2014; 18:87-106.
21. Wilm B J, Hennel F, Roesler M B, Weiger M, Pruessmann K P. Minimizing the echo time in diffusion imaging using spiral readouts and a head gradient system. Magnetic Resonance in Medicine 2020; 84:3117-3127.
22. Feng L, Grimm R, Block K T, et al. Golden-angle radial sparse parallel MRI: combination of compressed sensing, parallel imaging, and golden-angle radial sampling for fast and flexible dynamic volumetric MRI. Magnetic resonance in medicine 2014; 72:707-717.
23. Roemer P B, Edelstein W A, Hayes C E, Souza S P, Mueller O M. The NMR phased array. Magnetic resonance in medicine 1990; 16:192-225.
24. Kellman P, Mcveigh E R. Image reconstruction in SNR units: a general method for SNR measurement. Magnetic resonance in medicine 2005; 54:1439-1447.
25. Jackson J I, Meyer C H, Nishimura D G, Macovski A. Selection of a convolution function for Fourier inversion using gridding (computerised tomography application). IEEE transactions on medical imaging 1991; 10:473-478.

26. Sengupta A M, Mitra P P. Distributions of singular values for some random matrices. Physical Review E 1999; 60:3389.

27. Gavish M, Donoho D L. Optimal shrinkage of singular values. IEEE Transactions on Information Theory 2017; 63:2137-2152.

28. Walsh D O, Gmitro A F, Marcellin M W. Adaptive reconstruction of phased array MR imagery. Magnetic Resonance in Medicine: An Official Journal of the International Society for Magnetic Resonance in Medicine 2000; 43:682-690.

29. Griswold M A, Walsh D, Heidemann R M, Haase A, Jakob P M. The use of an adaptive reconstruction for array coil sensitivity mapping and intensity normalization. Proceedings of the International Society for Magnetic Resonance in Medicine 2002:2410.

30. Fessler J A. On NUFFT-based gridding for non-Cartesian MRI. Journal of magnetic resonance 2007; 188:191-195.

31. Pauly J M, Conolly S I, Nishimura D, Macovski A. Slice-selective excitation for very short T2 species. In: SMRM 8th annual meeting. Amsterdam, Netherlands, Proceedings of the SMRM annual meeting. Vol. 8.; 1989, p. 28.

32. Jensen J H, Helpern J A, Ramani A, Lu H, Kaczynski K. Diffusional kurtosis imaging: the quantification of non-gaussian water diffusion by means of magnetic resonance imaging. Magnetic Resonance in Medicine: An Official Journal of the International Society for Magnetic Resonance in Medicine 2005; 53:1432-1440.

33. Veraart J, Sijbers J, Sunaert S, Leemans A, Jeurissen B. Weighted linear least squares estimation of diffusion MRI parameters: Strengths, limitations, and pitfalls. NeuroImage 2013; 81:335-346.

34. Altbach M I, Outwater E K, Trouard T P, et al. Radial fast spin-echo method for T2-weighted imaging and T2 mapping of the liver. Journal of Magnetic Resonance Imaging 2002; 16:179-189.

35. Weigel M. Extended phase graphs: dephasing, RF pulses, and echoes-pure and simple. Journal of Magnetic Resonance Imaging 2015; 41:266-295.

36. Lebel R M, Wilman A H. Transverse relaxometry with stimulated echo compensation. Magnetic resonance in medicine 2010; 64:1005-1014.

37. Koay C G, Basser P J. Analytically exact correction scheme for signal extraction from noisy magnitude MR signals. Journal of magnetic resonance 2006; 179:317-322.

38. Jelescu I O, Veraart J, Adisetiyo V, Milla S S, Novikov D S, Fieremans E. One diffusion acquisition and different white matter models: how does microstructure change in human early development based on WMTI and NODDI?. Neuroimage 2015; 107:242-256.

39. Novikov D S, Veraart J, Jelescu I O, Fieremans E. Rotationally-invariant mapping of scalar and orientational metrics of neuronal microstructure with diffusion MRI. NeuroImage 2018; 174:518-538.

40. Campbell-Washburn A E, Ramasawmy R, Restivo M C, et al. Opportunities in interventional and diagnostic imaging by using high-performance low-field-strength MRI, Radiology 2019; 293:384-393.

41. Seisompop K, Gagoski B A, Polimeni J R, Witzel T, Wedeen V J, Wald L L. Blipped-controlled aliasing in parallel imaging for simultaneous multislice echo planar imaging with reduced g-factor penalty. Magnetic resonance in medicine 2012; 67:1210-1224.

42. Dong Z, Wang F. Reese T G, et al. Tilted-CAIPI for highly accelerated distortion-free EPI with point spread function (PSF) encoding. Magnetic resonance in medicine 2019; 81:377-392.

43. Wang F, Dong Z, Reese T G, et al. Echo planar time-resolved imaging (EPTI). Magnetic resonance in medicine 2019; 81:3599-3615.

44. Wilbraham H. On a certain periodic function. The Cambridge and Dublin Mathematical Journal 1848; 3:198-201.

45. Gibbs J W. Fourier's series. Nature 1898; 59:200.

46. Jerri A J. Lanczos-like σ-factors for reducing the Gibbs phenomenon in general orthogonal expansions and other representations. Journal of Computational Analysis and Applications 2000; 2:111-127.

47. Archibald R, Gelb A. A method to reduce the Gibbs ringing artifact in MRI scans while keeping tissue boundary integrity. IEEE Transactions on Medical Imaging 2002; 21:305-319.

48. Sarra S A. Digital total variation filtering as postprocessing for Chebyshev pseudospectral methods for conservation laws. Numerical Algorithms 2006; 41:17-33.

49. Block K T, Uecker M, Frahm J. Suppression of MRI truncation artifacts using total variation constrained data extrapolation. International journal of biomedical imaging 2008; 2008.

50. Perrone D, Aelterman J, Pižurica A, Jeurissen B, Philips W, Leemans A. The effect of Gibbs ringing artifacts on measures derived from diffusion MRI. Neuroimage 2015; 120:441-455.

51. Veraart J, Fieremans E, Jelescu I O, Knoll F, Novikov D S. Gibbs ringing in diffusion MRI. Magnetic resonance in medicine 2016; 76:301-314.

52. Kellner E, Dhital B, Kiselev V G, Reisert M. Gibbs-ringing artifact removal based on local subvoxel-shifts. Magnetic resonance in medicine 2016; 76:1574-1581.

53. Du Y P, Parker D L, Davis W L, Cao G. Reduction of partial-volume artifacts with zero-filled interpolation in three-dimensional MR angiography. Journal of Magnetic Resonance Imaging 1994; 4:733-741.

54. Du Y P, Chu R, Tregellas J R. Enhancing the detection of BOLD signal in fMRI by reducing the partial volume effect. Computational and mathematical methods in medicine 2014; 2014.

55. Ferreira P, Gatehouse P, Kellman P. Bucciarelli-Ducci C, Firmin D. Variability of myocardial perfusion dark rim Gibbs artifacts due to sub-pixel shifts. Journal of Cardiovascular Magnetic Resonance 2009; 11:1-10.

56. Muckley M J, Ades-Aron B, Papaioannou A, et al. Training a neural network for Gibbs and noise removal in diffusion MRI. Magnetic Resonance in Medicine doi: 10.1002/mrm.28395.

57. Wang Y, Song Y, Xie H, Li W, Hu B, Yang G. Reduction of Gibbs artifacts in magnetic resonance imaging based on Convolutional Neural Network. In: 2017 10th international congress on image and signal processing, biomedical engineering and informatics (CISP-BMEI). IEEE; 2017. pp. 1-5.

58. Sotiropoulos S N, Jbabdi S, Xu J, et al. Advances in diffusion MRI acquisition and processing in the Human Connectome Project. Neuroimage 2013; 80:125-143.

59. McGibney G, Smith M R, Nichols S T, Crawley A. Quantitative evaluation of several partial Fourier reconstruction algorithms used in MRI. Magnetic resonance in medicine 1993; 30:51-59.

60. Bammer R, Holdsworth S J, Aksoy M, Skare S T. Phase errors in diffusion-weighted imaging. In: Jones D K, editor. Diffusion MRI. Oxford University Press; 2010. pp. 218-249.

61. Vu C T, Phan T D, Chandler D M. S3: A Spectral and Spatial Measure of Local Perceived Sharpness in Natural Images. IEEE transactions on image processing 2011; 21:934-945.

62. Casey B J, Cannonier T, Conley M I, et al. The adolescent brain cognitive development (ABCD) study: imaging acquisition across 21 sites. Developmental cognitive neuroscience 2018; 32:43-54.

63. Jensen J H, Helpern J A, Ramani A, Lu H, Kaczynski K. Diffusional kurtosis imaging: the quantification of non-gaussian water diffusion by means of magnetic resonance imaging. Magnetic Resonance in Medicine: An Official Journal of the International Society for Magnetic Resonance in Medicine 2005; 53:1432-1440.

64. Chiew M. Partial Fourier. https://users.fmrib.ax.ac.uk/~mchiew/docs/PartialFourier.html, 65. Ades-Aron B, Veraart J, Kochunoy P, McGuire S, Sherman P. Kellner E, Novikov D S, and Fieremans E. Evaluation of the accuracy and precision of the diffusion parameter estimation with gibbs and noise removal pipeline. NeuroImage, 183; 532-543, 2018.

66. Veraart J, Novikov D S, Christiaens D, Ades-aron B, Sijbers J, Fieremans E. Denoising of diffusion MRI using random matrix theory. NeuroImage 2016; 142:394-406.

67. Andersson J L R, Skare S, Ashburner J. How to correct susceptibility distortions in spin-echo echo-planar images: application to diffusion tensor imaging. Neuroimage 2003; 20:870-888.

68. Andersson J L R, Sotiropoulos S N. An integrated approach to correction for off-resonance effects and subject movement in diffusion MR imaging. Neuroimage 2016; 125:1063-1078.

69. Koay C G, Basser P J. Analytically exact correction scheme for signal extraction from noisy magnitude MR signals. Journal of magnetic resonance 2006; 179:317-322.

70. Veraart J, Sijbers J, Sunaert S, Leemans A, Jeurissen B. Weighted linear least squares estimation of diffusion MRI parameters: Strengths, limitations, and pitfalls. NeuroImage 2013; 81:335-346.

71. Basser P J, Mattiello J, LeBihan D. MR diffusion tensor spectroscopy and imaging. Biophysical journal 1994; 66:259-267.

72. Jenkinson M, Smith S. A global optimisation method for robust affine registration of brain images. Medical image analysis 2001; 5:143-156.

73. Andersson J L R, Jenkinson M, Smith S, others. Non-linear registration aka Spatial normalisation FMRIB Technical Report TR07JA2. FMRIB Analysis Group of the University of Oxford 2007.

74. Mori S, Wakana S, Zijl P C M van, Nagae-Poetscher L M. MRI Atlas of Human White Matter. Elsevier Science; 2005.

75. Alfaro-Almagro F, Jenkinson M, Bangerter N K, et al. Image processing and Quality Control for the first 10,000 brain imaging datasets from UK Biobank Neuroimage 2018; 166:400-424.

What is claimed is:

1. A non-transitory computer-accessible medium having stored thereon computer-executable instructions for removing Gibbs ringing data from at least one image, wherein, when a computer arrangement executes the instructions, the computer arrangement is configured to perform procedures comprising:

receiving information related to the at least one image; and detecting an oscillation pattern from at least one edge of a measured portion of k-space associated with the information; and removing the Gibbs ringing data from the information based on the detected oscillation pattern.

2. The computer-accessible medium of claim 1, wherein the at least one image is a magnetic resonance ("MR") image.

3. The computer-accessible medium of claim 1, wherein the oscillation pattern is acquired using a k-space under-sampling asymmetric procedure with respect to a center of the k-space.

4. The computer-accessible medium of claim 1, wherein the oscillation pattern is acquired using a partial Fourier ("PF") acquisition.

5. The computer-accessible medium of claim 3, wherein the Gibbs ringing data is removed by applying a Gibbs-ringing correction more than once.

6. The computer-accessible medium of claim 3, wherein the removing of the Gibbs ringing data is performed on a sub-sampled image, and wherein a sub-sampling rate of the removal is determined based on a subsampling factor of a partial Fourier ("PF") acquisition.

7. The computer-accessible medium of claim 3, wherein the computer arrangement is further configured to sub-sample the at least one image in an image domain or an image-frequency hybrid domain.

8. The computer-accessible medium of claim 3, wherein the computer arrangement is further configured to remove a PF Gibbs pattern from the at least one image by:

transforming the at least one image into a set of sub-sampled images, applying a Gibbs-ringing correction procedure to sub-sampled images, and recombining the Gibbs-corrected sub-sampled images.

9. The computer-accessible medium of claim 8, where the Gibbs ringing correction is performed based on performing sub-voxel shifts.

10. The computer-accessible medium of claim 8, wherein the computer arrangement is further configured to remove the Gibbs ringing pattern of a fully-sampled part of the k-space by applying the Gibbs ringing correction to the recombined images.

11. The computer-accessible medium of claim 8, wherein the computer arrangement is configured to swap an order of the Gibbs-ringing corrections.

12. The computer-accessible medium of claim 11, wherein the computer arrangement performs the swapping by, after applying a full Gibbs-ringing correction to the at least one image, transforming the at least one image of the removing procedure into the sub-sampled images, applying the Gibbs ringing correction to the sub-sampled images, and combining the sub-sampled images after the transformation.

13. The computer-accessible medium of claim 3, wherein the computer arrangement is further configured to apply one or more combinations of subsampling and Gibbs-ringing correction.

14. The computer-accessible medium of claim 13, wherein the one or more combinations are applied at least one of (i) iteratively, or (ii) in different order.

15. A method for removing Gibbs ringing data from at least one image comprising:

receiving information related to the at least one image;

detecting an oscillation pattern from at least one edge of a measured portion of k-space associated with the information; and removing the Gibbs ringing data from the information based on the detected oscillation pattern.

16. The method of claim 15, wherein the removing of the Gibbs ringing data is performed by applying a Gibbs-ringing correction more than once.

17. The method of claim 15, further comprising swapping an order of the Gibbs-ringing corrections.

18. A system for removing Gibbs ringing data from at least one image comprising:

a processor and a memory, wherein the processor is configured to:

receive information related to the at least one image;

detect an oscillation pattern from at least one edge of a measured portion of k-space associated with the information; and remove the Gibbs ringing data from the information based on the detected oscillation pattern.

19. The system of claim 18, wherein the process is configured to remove the Gibbs ringing data by applying a Gibbs-ringing correction more than once.

20. The system of claim 18, wherein the processor is configured to swap an order of the Gibbs-ringing corrections.

\* \* \* \* \*